(12) United States Patent
Xie et al.

(10) Patent No.: US 12,478,692 B2
(45) Date of Patent: Nov. 25, 2025

(54) GENE THERAPY FOR SPINAL MUSCULAR ATROPHY

(71) Applicant: University of Massachusetts, Westborough, MA (US)

(72) Inventors: Jun Xie, Worcester, MA (US); Guangping Gao, Worcester, MA (US); Qing Xie, Worcester, MA (US); Hong Ma, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 0 days.

(21) Appl. No.: 18/827,471

(22) Filed: Sep. 6, 2024

(65) Prior Publication Data
US 2024/0424144 A1 Dec. 26, 2024

Related U.S. Application Data

(63) Continuation of application No. 18/712,273, filed as application No. PCT/US2022/080315 on Nov. 22, 2022.

(60) Provisional application No. 63/341,650, filed on May 13, 2022, provisional application No. 63/282,246, filed on Nov. 23, 2021.

(51) Int. Cl.
*A61K 48/00* (2006.01)
*A61P 21/00* (2006.01)
*A61P 25/00* (2006.01)
*C12N 15/86* (2006.01)

(52) U.S. Cl.
CPC .......... *A61K 48/0058* (2013.01); *A61P 21/00* (2018.01); *A61P 25/00* (2018.01); *C12N 15/86* (2013.01); *A61K 48/00* (2013.01); *C12N 2750/14122* (2013.01); *C12N 2750/14143* (2013.01); *C12N 2750/14171* (2013.01); *C12N 2830/50* (2013.01)

(58) Field of Classification Search
CPC .......... A61P 21/00; A61P 25/00; C12N 15/86; A61K 48/0058
See application file for complete search history.

(56) References Cited

U.S. PATENT DOCUMENTS

| | | |
|---|---|---|
| 5,399,363 A | 3/1995 | Liversidge et al. |
| 5,478,745 A | 12/1995 | Samulski et al. |
| 5,543,158 A | 8/1996 | Gref et al. |
| 5,552,157 A | 9/1996 | Yagi et al. |
| 5,565,213 A | 10/1996 | Nakamori et al. |
| 5,567,434 A | 10/1996 | Szoka, Jr. |
| 5,641,515 A | 6/1997 | Ramtoola |
| 5,656,016 A | 8/1997 | Ogden |
| 5,697,899 A | 12/1997 | Hillman et al. |
| 5,738,868 A | 4/1998 | Shinkarenko |
| 5,770,219 A | 6/1998 | Chiang et al. |
| 5,779,708 A | 7/1998 | Wu |
| 5,783,208 A | 7/1998 | Venkateshwaran et al. |
| 5,795,587 A | 8/1998 | Gao et al. |
| 6,001,650 A | 12/1999 | Colosi |
| 6,156,303 A | 12/2000 | Russell et al. |
| 6,177,403 B1 | 1/2001 | Stedman |
| 8,283,116 B1 | 10/2012 | Bhattacharyya et al. |
| 2003/0138772 A1 | 7/2003 | Gao et al. |
| 2013/0323759 A1 | 12/2013 | Melki et al. |
| 2018/0066279 A9 | 3/2018 | Gao et al. |
| 2019/0241633 A1 | 8/2019 | Fotin-Mleczek et al. |
| 2025/0011812 A1 | 1/2025 | Xie et al. |

FOREIGN PATENT DOCUMENTS

| | | |
|---|---|---|
| WO | WO 98/10088 A1 | 3/1998 |
| WO | WO 2020/127813 A1 | 6/2020 |
| WO | WO 2021/076656 A1 | 4/2021 |

OTHER PUBLICATIONS

Qiao, C et al. "Liver-specific microRNA-122 target sequences incorporated in AAV vectors efficiently inhibits transgene expression in the liver." Gene therapy vol. 18,4 (2011): 403-10. doi:10.1038/gt.2010.157 (Year: 2011).*

Invitation to Pay Additional Fees for Application No. PCT/US2024/024748, mailed Sep. 30, 2024.

International Search Report and Written Opinion for Application No. PCT/US2024/024748, mailed Jan. 13, 2025.

Monani et al., Promoter analysis of the human centromeric and telomeric survival motor neuron genes (SMNC and SMNT). Biochim Biophys Acta. Jun. 9, 1999;1445(3):330-6. doi: 10.1016/s0167-4781(99)00060-3.

Shin, 2023 26th American Society of Gene and Cell Therapy (ASGCT) Conference Attendance Report. BRIC View 2023-C13. Published Jul. 14, 2023. Retrieved from the Internet: URL: https://www.ibric.org/bric/trend/bio-report.do?mode=view&articleNo=8693802. [retrieved Nov. 18, 2024].

Invitation to Pay Additional Fees for Application No. PCT/US2022/080315, mailed Feb. 10, 2023.

International Search Report and Written Opinion for Application No. PCT/US2022/080315, mailed May 8, 2023.

International Preliminary Report on Patentability for Application No. PCT/US2022/080315, mailed Jun. 6, 2024.

(Continued)

*Primary Examiner* — Teresa E Knight
*Assistant Examiner* — Kodye Lee Abbott
(74) *Attorney, Agent, or Firm* — Wolf, Greenfield & Sacks, P.C.

(57) ABSTRACT

Aspects of the disclosure relate to compositions and methods for treating spinal muscular atrophy (SMA). The disclosure is based, in part, on isolated nucleic acids and vectors (e.g., viral vectors, such as rAAV vectors) encoding SMN1. In some embodiments, the expression of SMN1 is driven by a native SMN1 promoter or a variant thereof. In some embodiments, isolated nucleic acids and vectors of the disclosure have reduced toxicity and/or increased transgene expression relative to previously described SMN-encoding vectors.

13 Claims, 21 Drawing Sheets

Specification includes a Sequence Listing.

(56) References Cited

OTHER PUBLICATIONS

No Author Listed, Genbank Submission; NCBI, Accession No. AF092925.1; *Homo sapiens* survival of motor neuron (SMN) gene, promoter region and partial cos. Jul. 26, 2016. Retrieved from the internet: https://www.ncbi.nlm.nih.gov/nuccore/AF092925. [Last accessed: Mar. 28, 2023].

No Author Listed, Genbank Submission; NCBI, Accession No. NM_000344.4; *Homo sapiens* survival of motor neuron 1, telomeric (SMN1), transcript variant d, mRNA; Nov. 14, 2021. Retrieved from the internet: https://www.ncbi.nlm.nih.gov/nuccore/NM_000344.4. [Last accessed: Sep. 25, 2024].

No Author Listed, Genbank Submission; NCBI, Accession No. NM_022874.2; *Homo sapiens* survival of motor neuron 1, telomeric (SMN1), transcript variant b, mRNA; Nov. 21, 2021. Retrieved from the internet: https://www.ncbi.nlm.nih.gov/nuccore/NM_022874.2. [Last accessed: Sep. 25, 2024].

No Author Listed, Genbank Submission; NCBI, Accession No. NM_001297715.1; *Homo sapiens* survival of motor neuron 1, telomeric (SMN1), transcript variant a, mRNA; Nov. 14, 2021. Retrieved from the internet: https://www.ncbi.nlm.nih.gov/nuccore/NM_001297715.1. [Last accessed: Sep. 25, 2024].

No Author Listed, Genbank Submission; NCBI, Accession No. NP_059107.1; survival motor neuron protein isoform d [*Homo sapiens*]; Oct. 26, 2021. Retrieved from the internet: https://www.ncbi.nlm.nih.gov/protein/NP_059107.1. [Last accessed: Sep. 25, 2024].

No Author Listed, Genbank Submission; NCBI, Accession No. NP_075013.1; survival motor neuron protein isoform a [*Homo sapiens*]; Oct. 26, 2021. Retrieved from the internet: https://www.ncbi.nlm.nih.gov/protein/NP_075013.1 [Last accessed: Sep. 25, 2024].

No Author Listed, Genbank Submission; NCBI, Accession No. NP_075014.1; survival motor neuron protein isoform b [*Homo sapiens*]; Oct. 26, 2021. Retrieved from the internet: https://www.ncbi.nlm.nih.gov/protein/NP_075014.1. [Last accessed: Sep. 25, 2024].

No Author Listed, Genbank Submission; NCBI, Accession No. NP_075015.1; survival motor neuron protein isoform c [*Homo sapiens*]; Oct. 26, 2021. Retrieved from the internet: https://www.ncbi.nlm.nih.gov/protein/NP_075015.1. [Last accessed: Sep. 25, 2024].

No Author Listed, Genbank Submission; NCBI, Accession No. NP_000335.1; survival motor neuron protein isoform d [*Homo sapiens*]; Nov. 14, 2021. Retrieved from the internet: https://www.ncbi.nlm.nih.gov/protein/NP_000335.1. [Last accessed: Sep. 25, 2024].

Chand et al., Hepatotoxicity following administration of onasemnogene abeparvovec (AVXS-101) for the treatment of spinal muscular atrophy. J Hepatol. Mar. 2021;74(3):560-566. doi: 10.1016/j.jhep.2020.11.001. Epub Nov. 10, 2020.

Echaniz-Laguna et al., The promoters of the survival motor neuron gene (SMN) and its copy (SMNc) share common regulatory elements. Am J Hum Genet. May 1999;64(5):1365-70. doi: 10.1086/302372.

Foust et al., Rescue of the spinal muscular atrophy phenotype in a mouse model by early postnatal delivery of SMN. Nat Biotechnol. Author manuscript; available in PMC Sep. 1, 2010. Published in final edited form as: Nat Biotechnol. Mar. 2010; 28(3): 271-274. Published online Feb. 28, 2010. doi: 10.1038/nbt.1610.

Hinderer et al., Severe Toxicity in Nonhuman Primates and Piglets Following High-Dose Intravenous Administration of an Adeno-Associated Virus Vector Expressing Human SMN. Hum Gene Ther. Mar. 2018;29(3):285-298. doi: 10.1089/hum.2018.015. Epub Feb. 12, 2018.

Hordeaux et al., MicroRNA-mediated inhibition of transgene expression reduces dorsal root ganglion toxicity by AAV vectors in primates. Sci Transl Med. Nov. 11, 2020;12(569):eaba9188. doi: 10.1126/scitranslmed.aba9188.

Mccarty, Self-complementary AAV vectors; advances and applications. Mol Ther. Oct. 2008;16(10):1648-56. doi: 10.1038/mt.2008.171. Epub Aug. 5, 2008.

Mendell et al., Single-Dose Gene-Replacement Therapy for Spinal Muscular Atrophy. N Engl J Med. Nov. 2, 2017;377(18):1713-1722. doi: 10.1056/NEJMoa1706198.

Naveed et al., Onasemnogene Abeparvovec (AVXS-101) for the Treatment of Spinal Muscular Atrophy. J Pediatr Pharmacol Ther. 2021;26(5):437-444. doi: 10.5863/1551-6776-26.5.437. Epub Jun. 28, 2021.

Sumner et al., Two breakthrough gene-targeted treatments for spinal muscular atrophy: challenges remain. J Clin Invest. Aug. 1, 2018;128(8):3219-3227. doi: 10.1172/JCI121658. Epub Jul. 9, 2018.

Van Alstyne et al., Gain of toxic function by long-term AAV9-mediated SMN overexpression in the sensorimotor circuit. Nat Neurosci. Jul. 2021;24(7):930-940. doi: 10.1038/s41593-021-00827-3. Epub Apr. 1, 2021.

Wirth, An update of the mutation spectrum of the survival motor neuron gene (SMN1) in autosomal recessive spinal muscular atrophy (SMA). Hum Mutat. 2000;15(3):228-37. doi: 10.1002/(SICI)1098-1004(200003)15:3<228::AID-HUMU3>3.0.CO;2-9.

\* cited by examiner

□ Normal liver ■ Liver toxicity

SEQUENCE LISTING

```
Sequence total quantity: 11
SEQ ID NO: 1              moltype = DNA   length = 885
FEATURE                   Location/Qualifiers
source                    1..885
                          mol_type = other DNA
                          organism = synthetic construct
SEQUENCE: 1
atggccatga gcagcggcgg cagtggcggc ggcgtgcccg agcaggagga ttctgtgctg     60
ttccggagag gaacaggcca gagcgatgac tccgatatct gggacgacac agcccttatc    120
aaggcctacg acaaggccgt ggccagcttt aagcacgccc tgaagaatgg cgatatctgc    180
gagacaagcg gaaagcctaa gaccaccccct aaaagaaagc ccgccaagaa aaacaagtcc    240
cagaaaaaaa acaccgccgc tagcctgcag cagtggaagg tgggcgacaa atgcagcgcc    300
atctggtccg aggacggctg catctaccct gctaccatcg ccagcatcga cttcaagcgg    360
gaaacctgcg tggtggtcta cacaggctat ggcaataggg aggaacaaaa tctctctgat    420
ctgctgtctc ctatttgtga agtggctaac aacatcgagc agaacgccca ggaaaatgag    480
```

```
aacgaaagcc aagtgtccac cgacgagagc gagaacagca gaagccctgg aaacaagtct   540
gacaacatca agcccaagtc tgcccccttgg aacagcttcc tgcccccctcc tcctccaatg  600
cctggcccca gactgggccc cggcaagcct ggcctgaagt tcaacggccc tcctccaccc   660
cctcctcctc cacctcccca tctgctgagc tgctggctgc ctccttttcc cagcggcccc   720
cctatcatcc ccccaccacc tcctatctgt cccgacagcc tggacgacgc cgatgctctg   780
ggatccatgc tgatcagctg gtacatgtct ggctaccaca ccggctacta catgggcttc   840
cggcagaacc agaaggaagg aagatgcagc cacagcctga actga                   885

SEQ ID NO: 2           moltype = DNA  length = 885
FEATURE                Location/Qualifiers
source                 1..885
                       mol_type = other DNA
                       organism = Homo sapiens
SEQUENCE: 2
atggcgatga gcagcggcgg cagtggtggc ggcgtcccgg agcaggagga ttccgtgctg   60
ttccggcgcg gcacaggcca gagcgatgat tctgacattt gggatgatac agcactgata   120
aaagcatatg ataaagctgt ggcttcattt aagcatgctc taaagaatgg tgacatttgt   180
gaaacttcgg gtaaaccaaa aaccacacct aaaagaaaac ttcgtaagaa gaataaaagc   240
caaaagaaga atactgcagc ttccttacaa cagtggaaag ttggggacaa atgttctgcc   300
attttggtcag aagacggttg catttaccca gctaccattg cttcaattga ttttaagaga   360
gaaacctgtg ttgtggttta cactggatat ggaaatagag aggagcaaaa tctgtccgat   420
ctactttccc caatctgtga agtagctaat aatatagaac agaatgctca agagaatgaa   480
aatgaaagcc aagtttcaac agatgaaagt gagaactcca ggtctcctgg aaataaatca   540
gataacatca agcccaaatc tgctccatgg aactctttc tccctccacc acccccccatg   600
ccagggccaa gactgggacc aggaaagcca ggtctaaaat tcaatggccc accaccgcca   660
ccgccaccac cacccccca cttactatca tgctggctgc ctccatttcc ttctggacca   720
ccaataattc ccccaccacc tcccatatgt ccagattctc ttgatgatgc tgatgctttg   780
ggaagtatgt taatttcatg gtacatgagt ggctatcata ctggctatta tatgggttt   840
agacaaaatc aaaagaagg aaggtgctca cattccttaa attaa                     885

SEQ ID NO: 3           moltype = AA  length = 294
FEATURE                Location/Qualifiers
source                 1..294
                       mol_type = protein
                       organism = Homo sapiens
SEQUENCE: 3
MAMSSGGSGG GVPEQEDSVL FRRGTGQSDD SDIWDDTALI KAYDKAVASF KHALKNGDIC    60
ETSGKPKTTP KRKPAKKNKS QKKNTAASLQ QWKVGDKCSA IWSEDGCIYP ATIASIDFKR   120
ETCVVVYTGY GNREEQNLSD LLSPICEVAN NIEQNAQENE NESQVSTDES ENSRSPGNKS   180
DNIKPKSAPW NSFLPPPPPM PGPRLGPGKP GLKFNGPPPP PPPPPPHLLS CWLPPFPSGP   240
PIIPPPPPIC PDSLDDADAL GSMLISWYMS GYHTGYYMGF RQNQKEGRCS HSLN         294

SEQ ID NO: 4           moltype = DNA  length = 2050
FEATURE                Location/Qualifiers
source                 1..2050
                       mol_type = genomic DNA
                       organism = Homo sapiens
SEQUENCE: 4
tcgaagcttt ataaaacat acttttttt ttactttttt tttttttct gagacacagc       60
ctcactctgt cgcccaggct ggagtgcagg ttttcatgtt tatctgtgag atgtaccttt   120
ggcacattac tttcctgaca tgagatttaa atttttttt ttatcttgtg acaatttaac    180
tttttgaca cataaaaatt gtacatattt atttgtttga gatggagtcg cactctgtca   240
ctcaggctgg agtgcagtgg cgtgatcttg gctcactgca acctccgcct cccgagttca   300
agtgattctc ctgcctcagc ctcccaagca gctgtcatta caggcctgca ccaccacacc   360
cggctgattt tgtatttta ggagaaacag ggtttcacca tgttgggcca ggctggtctt   420
gaagtcctga cctcaagtga tccacccacc ttggcctccc aaagtgctgg gattataggc   480
atgagccacc gtaccagacc cctaaaaatt gtatatattt aaggtgtacc atttgatgtt   540
tagatataca ttgtgaaatg attacattcc acatattacc tctacagagt taccatttt    600
gtacacttgg tcaacatcat cccattctcc ccttcctcca cagatatttc ttgtatacta   660
tatagaagcc aagggtattt tgggggaaga gctcaaagtt cctttcgtgg agttaaaaat   720
atatatatac tatgtacata taagccattt agcaacccta gatgcttaat aaagaatact   780
ggaggcccgg tgtggtggct cacacctgta atcccagcac tttgggaggc cgaggcggtc   840
ggattacgag gtcaggagtt caagaccagc ctggccaaca tggtgaaacc ccatctttac   900
taaaaataca aaaattagcc gggtgtggtg gtgggcgcct gtaatcccag ctactcgggg   960
ggctgaggca gaattgcttg aacctgggag gcagaggttg cagtgagctg agatcacgcc  1020
actgcattcc agcctgggtg acagagcaat ttctgtcgc aaaaaaaaaa agaatactgg   1080
aggctgggcg aggtggctca cacctgtaat cccagcattt gggatgcca gaggcgggcg   1140
gaatntcttg agctcaggag ttcgagacca gcctacacaa tatgctccaa acgccgcttn  1200
tacaaaacat acagaaacta ccccgggtgtg tggcgnncc cctgtggtcc tagatacttg   1260
ggaggttgag gcgggaggat cgcttgagct cgggaggtcg aggctgcaat gagccgagat  1320
ggtgccactg cattctgacg acagagcgag attccgtttc aaaacaaaca acaaataagg  1380
ttgggggatc aaatatcttc tagtgtttaa ggatctgcct tccttcctgc ccccatgttt  1440
gtctttcctt gtttgtcttt atatagatca agcaggtttt aaattcctag taggagctta  1500
catttacttt tccaagggg agggggaata aatatctaca cacacacaca cacacacaca  1560
cacacacaca cacacacaca cacacacaca ccacactgga gttcgagacg aggcctaagc  1620
aacatgccga aacccgtctc tactaaaata caaaaaatag ctgagcttgg tggcgcacgc  1680
ctatagtcct agctactggg gaggctgagg tgggaggatc gcttgagccc aagagtcga   1740
ggctgcagtg agccgagatc gcgccgctgc actccagcct gagcgacagg gcgaggtct   1800
gtctcaaaac aaacaaacaa aaaaaaaaag gaaaggaaat ataacacagt gaaatgaaag  1860
```

```
gattgagaga aatgaaaaat atacacgcca caaatgtggg agggcgataa ccactcgtag  1920
aaagcgtgag aagttactac aagcggtcct cccgggcacc gtactgttcc gctcccagaa  1980
gccccgggcg ccggaagtcg tcactcttaa gaagggacgg ggcccacgc tgcgcacccg   2040
cgggtttgct                                                         2050

SEQ ID NO: 5            moltype = DNA   length = 928
FEATURE                 Location/Qualifiers
source                  1..928
                        mol_type = genomic DNA
                        organism = Homo sapiens
SEQUENCE: 5
ggatgccaga ggcgggcgga atatcttgag ctcaggagtt cgagaccagc ctacacaata  60
tgctccaaac gccgcttcta caaaacatac agaaactacc cgggtgtggt ggcgtgcccc  120
tgtggtccta gatacttggg aggttgaggc gggaggatcg cttgagctcg ggaggtcgag  180
gctgcaatga gccgagatgg tgccactgca ttctgacgac agagcgagat tccgtttcaa  240
aacaaacaac aaataaggtt gggggatcaa atatcttcta gtgtttaagg atctgccttc  300
cttcctgccc ccatgtttgt cttttccttgt ttgtctttat atagatcaag caggttttaa  360
attcctagta ggagcttaca tttacttttc caagggggag ggggaataaa tatctacaca  420
cacacacaca cacacacaca cacacacaca cacacacaca cacacacacc acactggagt  480
tcgagacgag gcctaagcaa catgccgaaa ccccgtctct actaaataca aaaaatagct  540
gagcttggtg gcgcacgcct atagtcctag ctactgggga ggctgaggtg gaggatcgc   600
ttgagcccaa gaagtcgagg ctgcagtgag ccgagatcga gccgctgcac tccagcctgg  660
gcgacagggc gaggctctgt ctcaaaacaa acaaacaaaa aaaaaaagga aggaaatat   720
aacacagtga aatgaaagga ttgagagaaa tgaaaaatat acacgccaca aatgtgggag  780
ggcgataacc actcgtagaa aagcgtgaga agttactaca gcggtcctcc gggcaccgt   840
actgttccgc tcccagaagc cccgggcgcc ggaagtcgtc actcttaaga agggacgggg  900
ccccacgctg cgcacccgcg ggtttgct                                     928

SEQ ID NO: 6            moltype = DNA   length = 6286
FEATURE                 Location/Qualifiers
source                  1..6286
                        mol_type = other DNA
                        organism = synthetic construct
SEQUENCE: 6
gctgcgcgct cgctcgctca ctgaggccgc ccgggcaaag cccggggcgtc gggcgacctt  60
tggtcgcccg gcctcagtga gcgagcgagc gcgcagagag ggagtggcca actccatcac  120
taggggttcc ttgtagttaa tgattaaccc gccatgctac ttatctacca gggtaatggg  180
gatcctctag aactatagct agtcgacatt gattattgac tagttcgaag ctttataaaa  240
acatactttt ttttttactt tttttttttt tctgagaca cagcctcact ctgtcgccca  300
ggctggagtg caggttttca tgtttatctg tgagatgtac ctttggcaca ttactttcct  360
gacatgagat ttaaattttt ttttttatct tgtgacaatt taactttttt gacacataaa  420
aattgtacat atttatttgt ttgagatgga gtcgcactct gtcactcagg ctggagtgca  480
gtggcgtgat cttggctcac tgcaacctcc gcctcccgag ttcaagtgat tctcctggtt  540
cagcctccca gcagctgtc attacaggcc tgcaccacca cacccggctg attttgtatt   600
tttaggagaa acagggtttc accatgttgg gccaggctgg tcttgaagtc ctgacctcaa  660
gtgatccacc caccttggcc tcccaaagtg ctgggattat aggcatgagc caccgtacca  720
gacccctaaa aattgtatat atttaaggtg taccatttga tgtttagata tacattgtga  780
aatgattaca ttccacatat tacctctaca gagttaccat ttttgtacac ttggtcaaca  840
tcatcccatt ctccccttcc tccacagata tttcttgtat actatataga agccaagggt  900
attttggggg aagagctcaa agttcctttc gtggagttaa aaatatatat atactatgta  960
catataagcc atttagcaac cctagatgct taataaagaa tactggaggc ccggtgtggt  1020
ggctcacacc tgtaatccca gcactttggg aggccgaggc ggtcggatta cgaggtcagg  1080
agttcaagac cagcctggcc aacatggtga accccatct ttactaaaaa tacaaaaatt   1140
agccgggtgt ggtggtgggc gcctgtaatc cagctactc gggggctgaa ggcagaattg   1200
cttgaacctg ggaggcagag gttgcagtga gctgagatca cgccactgca ttccagcctg  1260
ggtgacagag caatattctg tcgcaaaaaa aaaaagaata ctgaggctg gcgcaggtg   1320
ctcacacctg taatcccagc attttgggat gccagaggcg gcggaatat cttgagctca   1380
ggagttcgag accagcctac acaatatgct ccaaacgccg cttctacaaa acatacagaa  1440
actacccggg tgtggtggcg tgcccctgtc cctagata cttgggaggt tgaggcggga    1500
ggatcgcttg agctcgggag gtcgaggctg caatgagccg agatggtgcc actgcattct  1560
gacgacagag cgagattccg tttcaaaaca acaacaaat aaggttgggg gatcaaatat   1620
cttcagtgt ttaaggatct gccttccttc ctgccccat gtttgtcttt ccttgtttgt    1680
ctttatatag atcaagcagg ttttaaattc ctagtaggag cttacattta cttttccaag  1740
gggggagggg aataaatatc tacacacaca cacacacaca cacacacaca cacacacaca  1800
cacacacaca cacaccacac tggagttcga gacgaggcct aagcaacatg ccgaaacccc  1860
gtctctacta aatacaaaaa atagctgagc ttggtggcgc acgcctatag tcctagctac  1920
tggggaggct gaggtgggag gatcgcttga gcccaagaag tcgaggctgc agtgagccga  1980
gatcgcgccg ctgcactcca gcctgagcga cagggcgagg ctctgtctca aacaaaacaa  2040
acaaaaaaaa aaaggaaatg aaagattga gagaaatgaa  2100
aaatatacac gccacaaatg tgggagggcg ataaccactc gtagaaagcg tgagaagtta  2160
ctacaagcgg tcctccgggc accgtactg ttccgctccc agaagcccg ggcgccggaa    2220
gtcgtcactc ttaagaaggg acggggcccc acgctgcgca cccgcgggtt tgctatggcc  2280
atgagcagcg cggcagtgg cggcggcgtg ccgagcagg aggattctgt gctgttccgg    2340
agaggaacga gcagcagcga tgactccgat atctgatgcaa acacaaggccct tatcaaggcc  2400
tacgacaagg ccgtggccag ctttaagcac gccctgaaga atggcgatat ctgcgagaca  2460
agcggaaagc ctaagaccac ccctaaaaga aagccctgca agaaaacaa gtcccagaaa  2520
aaaaacaccg ccgctagcct gcagcagtgg aaggtgggcg acaaatgcag cgccatctgt  2580
tccgaggacg gctgcatcta ccctgctacc atcgccagca tcgacttcaa gcgggaaacc  2640
tgcgtggtgg tctacacagg ctatggcaat agggaggaac aaaatctctc tgatctgctg  2700
```

```
tctcctattt gtgaagtggc taacaacatc gagcagaacg cccaggaaaa tgagaacgaa    2760
agccaagtgt ccaccgacga gagcgagaac agcagaagcc ctggaaacaa gtctgacaac    2820
atcaagccca agtctgcccc ttggaacagc ttcctgcccc ctcctcctcc aatgcctggc    2880
cccagactgg gccccggcaa gcctggcctg aagttcaacg ccctcctcc accccctcct    2940
cctccacctc cccatctgct gagctgctgg ctgcctcctt ttcccagcgg cccccctatc    3000
atcccccac cacctcctat ctgtcccgac agcctggacg acgccgatgc tctgggatcc    3060
atgctgatca gctggtacat gtctggctac cacaccggct actacatggg cttccggcag    3120
aaccagaagg aaggaagatg cagccacagc ctgaactgag cggccgcaag cttcctgagg    3180
atccgatctt tttccctctg ccaaaaatta tggggacatc atgaagcccc ttgagcatct    3240
gacttctggc taataaagga aatttatttt cattgcaata gtgtgttgga attttttgtg    3300
tctctcactc ggaagcaatt cgttgatctg aatttcgacc acccataata cccattaccc    3360
tggtagataa gtagcatggc gggttaatca ttaactacaa ggaaccccta gtgatggagt    3420
tggccactcc ctctctgcgc gctcgctcgc tcactgaggc cgggcgacca aaggtcgccc    3480
gacgcccggg ctttgcccgg gcggcctcag tgagcgagcg agcgcgcagc cttaattaac    3540
ctaattcact ggccgtcgtt ttacaacgtc gtgactggga aaaccctggc gttacccaac    3600
ttaatcgcct tgcagcacat ccccctttcg ccagctggcg taatagcgaa gaggcccgca    3660
ccgatcgccc ttcccaacag ttgcgcagcc tgaatggcga atgggacgcg ccctgtagcg    3720
gcgcattaag cgcggcgggt gtggtggtta cgcgcagcgt gaccgctaca cttgccagcg    3780
ccctagcgcc cgctcctttc gctttcttcc cttcctttct cgccacgttc gccggctttc    3840
cccgtcaagc tctaaatcgg gggctccctt tagggttccg atttagtgct ttacggcacc    3900
tcgacccca aaaacttgat tagggtgatg gttcacgtag tgggccatcg ccctgataga    3960
cggttttcg ccctttgacg ttggagtcca cgttctttaa tagtggactc ttgttccaaa    4020
ctggaacaac actcaaccct atctcggtct attctttga tttataaggg attttgccga    4080
tttcggccta ttggttaaaa aatgagctga tttaacaaaa atttaacgcg aattttaaca    4140
aaatattaac gcttacaatt taggtggcac ttttcgggga aatgtgcgcg gaaccccctat    4200
ttgtttattt ttctaaatac attcaaatat gtatccgctc atgagacaat aaccctgata    4260
aatgcttcaa taatattgaa aaaggaagag tatgattgaa caagatggat tgcacgcagg    4320
ttctccggcc gcttgggtgg agaggctatt cggctatgac tgggcacaac agacaatcgg    4380
ctgctctgat gccgccgtgt tccggctgtc agcgcagggg cgcccggttc ttttgtcaa    4440
gaccgacctg tccggtgccc tgaatgaact gcaagacgag gcagcgcggc tatcgtggct    4500
ggccacgacg ggcgttcctt gcgcagctgt gctcgacgtt gtcactgaag cgggaaggga    4560
ctggctgcta ttgggcgaag tgccggggca ggatctcctg tcatctcacc ttgctcctgc    4620
cgagaaagta tccatcatgg ctgatgcaat gcggcggctg catacgcttg atccggctac    4680
ctgcccattc gaccaccaag cgaaacatcg catcgagcga gcacgtactc ggatggaagc    4740
cggtcttgtc gatcaggatg atctggacga agagcatcag gggctcgcgc cagccgaact    4800
gttcgccagg ctcaaggcga gcatgcccga cggcgaggat ctcgtcgtga cccatggcga    4860
tgcctgcttg ccgaatatca tggtggaaaa tggccgcttt tctggattca tcgactgtgg    4920
ccggctgggt gtggcggacc gctatcagga catagcgttg gctaccgtg atattgctga    4980
agagcttggc ggcgaatggg ctgaccgctt cctcgtgctt tacggtatcg ccgctcccga    5040
ttcgcagcgc atcgccttct atcgccttct tgacgagttc ttctgataac tgtcagacca    5100
agtttactca tatatacttt agattgattt aaaacttcat ttttaattta aaaggatcta    5160
ggtgaagatc cttttttgata atctcatgac caaaatccct aacgtgagt tttcgttcca    5220
ctgagcgtca gacccgtag aaaagatcaa aggatcttct tgagatcctt ttttctgcg    5280
cgtaatctgc tgcttgcaaa caaaaaaacc accgctacca gcggtggttt gtttgccgga    5340
tcaagagcta ccaactcttt ttccgaaggt aactggcttc agcagagcgc agataccaaa    5400
tactgttctt ctagtgtagc cgtagttagg ccaccacttc aagaactctg tagcaccgcc    5460
tacatacctc gctctgctaa tcctgttacc agtggctgct gccagtggcg ataagtcgtg    5520
tcttaccggg ttggactcaa gacgatagtt accggataag gcgcagcggt cgggctgaac    5580
ggggggttcg tgcacacagc ccagcttgga gcgaacgacc tacaccgaac tgagatacct    5640
acagcgtgag ctatgagaaa gcgccacgct tcccgaaggg agaaaggcgg acaggtatcc    5700
ggtaagcgga agggtcggaa caggagagcg cacgagggag cttccagggg gaaacgcctg    5760
gtatctttat agtcctgtcg ggtttcgcca cctctgactt gagcgtcgat ttttgtgatg    5820
ctcgtcaggg gggcggagcc tatggaaaaa cgccagcaac gcggcctttt tacgttcct    5880
ggccttttgc tggccttttg ctcacatgtt ctttcctgcg ttatcccctg attctgtgga    5940
taaccgtatt accgcctttg agtgagctga taccgctcgc cgcagccgaa cgaccgagcg    6000
cagcgagtca gtgagcgagg aagcggaaga gcgcccaata cgcaaaccgc ctctccccgc    6060
gcgttggccg attcattaat gcagctggca cgacaggttt cccgactgga aagcgggcag    6120
tgagcgcaac gcaattaatg tgagttagct cactcattag gcaccccagg ctttacactt    6180
tatgcttccg gctcgtatgt tgtgtggaat tgtgagcgga taacaatttc acacaggaaa    6240
cagctatgac catgattacg ccagatttaa ttaaggcctt aattag                  6286
```

SEQ ID NO: 7    moltype = DNA   length = 5198
FEATURE      Location/Qualifiers
source       1..5198
          mol_type = other DNA
          organism = synthetic construct
SEQUENCE: 7

```
ctgcgcgctc gctcgctcac tgaggccgcc cggggcaaagc ccgggcgtcg ggcgaccttt    60
ggtcgcccgg cctcagtgag cgagcgagcg cgcagagagg gagtgtagcc atgctctagg   120
aagatcaatt cggtacaatt cacgcgtgga tgccagaggc gggcggaata tcttgagctc   180
aggagttcga gaccagccta cacaatatgc tccaaacgcc gcttctacaa acatacaga   240
aactacccgg gtgtggtggc gtgccccctgt ggtcctagat acttgggagg ttgaggcggg   300
aggatcgctt gagctcggga ggtcgaggct gcaatgagcc gagatggtgc cactgcattc   360
tgacgacaga gcgagattcc gtttcaaaac aaacaacaaa taaggttggg ggatcaaata   420
tcttctagtg tttaaggatc tgccttcctt cctgccccca tgtttgtctt tccttgtttg   480
tcttatata gatcaagcag gttttaaatt cctagtagga gcttacattt acttttccaa   540
gggggagggg gaataaatat ctacacacac acacacacac acacacacac acacacacac   600
acacacacac acacaccaca ctggagttcg agacgaggca taagcaacat gccgaaaccc   660
cgtctctact aaatacaaaa aatagctgag cttggtggcg cacgcctata gtcctagcta   720
```

```
ctggggaggc tgaggtggga ggatcgcttg agcccaagaa gtcgaggctg cagtgagccg    780
agatcgcgcc gctgcactcc agcctgagcg acagggcgag gctctgtctc aaaacaaaca    840
aacaaaaaaa aaaaggaaag gaaatataac acagtgaaat gaaaggattg agagaaatga    900
aaaatataca cgccacaaat gtgggagggc gataaccact cgtagaaagc gtgagaagtt    960
actacagcg gtcctcccgg gcaccgtact gttccgctcc cagaagcccc gggcgccgga   1020
agtcgtcact cttaagaagg gacgggcccc cacgctgcgc acccgcgggt ttgctatggc   1080
catgagcagc ggcggcagtg gcggcggcgt gcccgagcag gaggattctg tgctgttccg   1140
gagaggaaca ggccagagcg atgactccga tatctgggac gacacagccc ttatcaaggc   1200
ctacgacaag gccgtggcca gctttaagca cgccctgaag aatggcgata tctgcgagac   1260
aagcggaaag cctaagacca cccctaaaag aaagcccgcc aagaaaaaca agtcccagaa   1320
aaaaaacacc gccgctagcc tgcagcagtg gaaggtgggc gacaaatgca gcgccatctg   1380
gtccgaggac ggctgcatct accctgctac catcgccagc atcgacttca agcgggaaac   1440
ctgcgtggtg gtctacacag gctatggcaa tagggaggaa caaaatctct ctgatctgct   1500
gtctcctatt tgtgaagtgg ctaacaacat cgagcagaac gcccaggaaa atgagaacga   1560
aagccaagtg tccaccgacg agagcgagaa cagcagaagc cctggaaaca agtctgacaa   1620
catcaagccc aagtctgccc cttggaacag cttcctgccc cctcctcctc caatgcctgg   1680
ccccagactg ggcccggca agcctggcct gaagttcaac ggcctcctc cacccccctcc   1740
tcctccacct ccccatctgc tgagctgctg gctgcctcct tttcccagcg gcccccctat   1800
catcccccca ccacctccta tctgtcccga cagcctggac gacgccgatg ctctgggatc   1860
catgctgatc agctggtaca tgtctggcta ccacaccggc tactacatgg gcttccggca   1920
gaaccagaag gaaggaagat gcagccacag cctgaactga gcgccgcaa gcttatcgat   1980
accgtcgact agagctcgct gatcagcctc gactgtgcct tctagttgcc agccatctgt   2040
tgtttgcccc tccccgtgc cttcttgac cctggaaggt gccactccca ctgtcctttc   2100
ctaataaaat gaggaaattg catcgcattg tctgagtagg tgtcattcta ttctgggggg   2160
tggggtgggg caggacagca aggggagga ttggaagac aatagcctag gtagataagt   2220
agcatggcgg gttaatcatt aactacaagg aaccctagt gatggagttg gccactccct   2280
ctctgcgcgc tcgctcgctc actgaggccg ggcgaccaaa ggtcgcccga cgcccgggct   2340
ttgcccgggc ggcctcagtg agcgagcgag cgcgcagcct taattaacct aattcactgg   2400
ccgtcgtttt acaacgtcgt gactgggaaa accctggcgt tacccaactt aatcgccttg   2460
cagcacatcc cccttttcgcc agctggcgta atagcgaaga ggcccgcacc gatcgcccttt  2520
cccaacagtt gcgcagcctg aatggcgaat gggacgcgcc ctgtagcggc gcattaagcg   2580
cggcgggtgt ggtggttacg cgcagcgtga ccgctacact gccagcgcc ctagcgcccg   2640
ctcctttcgc tttcttccct tcctttctcg ccacgttcgc cggctttccc cgtcaagctc   2700
taaatcgggg gctcccttta gggttccgat ttagtgcttt acggcacctc gaccccaaaa   2760
aacttgatta gggtgatggt tcacgtagtg gccatcgcc ctgatagacg gtttttcgcc   2820
ctttgacgtt ggagtccacg ttctttaata gtggactctt gttccaaact ggaacaacac   2880
tcaaccctat ctcggtctat tcttttgatt tataagggat tttgccgatt tcggcctatt   2940
ggttaaaaaa tgagctgatt taacaaaaat ttaacgcgaa ttttaacaaa atattaacgc   3000
ttacaattta ggtggcactt ttcggggaaa tgtgcgcgga acccctattt gtttatttt   3060
ctaaatacat tcaaatatgt atccgctcat gagacaataa ccctgataaa tgcttcaata   3120
atattgaaaa aggaagagta tgagtattca acatttccgt gtcgcccta ttccctttt    3180
tgcggcattt tgccttcctg ttttgctca cccagaaacg ctggtgaaag taaaagatgc   3240
tgaagatcag ttgggtgcac gagtgggtta catcgaactg gatctcaaca gcggtaagat   3300
ccttgagagt tttcgcccg aagaacgttt tccaatgatg agcactttta aagttctgct   3360
atgtggcgcg gtattatccc gtattgacgc cgggcaagag caactcggtc gccgcataca   3420
ctattctcag aatgacttgg ttgagtactc accagtcaca gaaaagcatc ttacggatgg   3480
catgacagta agagaattat gcagtgctgc cataaccatg agtgataaca ctgcggccaa   3540
cttacttctg acaacgatcg gaggaccgaa ggagctaacc gctttttgc acaacatggg   3600
ggatcatgta actcgcttg atcgttggga accggagctg aatgaagcca taccaaacga   3660
cgagcgtgac accacgatgc ctgtagcaat ggcaacaacg ttgcgcaaac tattaactgg   3720
cgaactactt actctagctt cccggcaaca attaatagac tggatggagg cggataaagt   3780
tgcaggacca cttctgcgct cggcccttcc ggctggctgg tttattgctg ataaatctgg   3840
agccggtgag cgtgggtctc gcggtatcat tgcagcactg gggccagatg gtaagccctc   3900
ccgtatcgta gttatctaca cgacggggag tcaggcaact atggatgaac gaaatagaca   3960
gatcgctgag ataggtgcct cactgattaa gcattggtaa ctgtcagacc aagtttactc   4020
atatatactt tagattgatt taaaacttca ttttaattt aaaaggatct aggtgaagat   4080
ccttttgat aatctcatga ccaaaatccc ttaacgtgag ttttcgttcc actgagcgtc   4140
agacccgta gaaaagatca aaggatcttc ttgagatcct ttttttctgc gcgtaatctg   4200
ctgcttgcaa acaaaaaaac caccgctacc agcggtggtt tgtttgccgg atcaagagct   4260
accaactctt tttccgaagg taactggctt cagcagagcg cagataccaa atactgttct   4320
tctagtgtag ccgtagttag gccaccactt caagaactct gtagcaccgc ctacatacct   4380
cgctctgcta atcctgttac cagtggctgc tgccagtggc gataagtcgt gtcttaccgg   4440
gttggactca agacgatagt taccggataa ggcgcagcgg tcgggctgaa cggggggttc   4500
gtgcacacag cccagcttgg agcgaacgac ctacaccgaa ctgagatacc tacagcgtga   4560
gctatgagaa agcgccacgc ttcccgaagg gagaaaggcg gacaggtatc cggtaagcgg   4620
cagggtcgga acaggagagc gcacgaggga gcttccaggg ggaaacgcct ggtatcttta   4680
tagtcctgtc gggtttcgcc acctctgact tgagcgtcga ttttgtgat gctcgtcagg   4740
ggggcggagc ctatggaaaa acgccagcaa gcggcctttt tacggttcc tggccttttg   4800
ctggcctttt gctcacatgt tctttcctgc gttatcccct gattctgtgg ataaccgtat   4860
taccgccttt gagtgagctg ataccgctcg ccgcagccga acgaccgagc gcagcgagtc   4920
agtgagcgag gaagcggaag agcgcccaat acgcaaaccg cctctccccg cgcgttggcc   4980
gattcattaa tgcagctggc acgacaggtt cccgactgg aaagcgggca gtgagcgcaa   5040
cgcaattaat gtgagttagc tcactcatta ggcaccccag gctttacact ttatgcttcc   5100
ggctcgtatg ttgtgtggaa ttgtgagcgg ataacaattt cacacaggaa acagctatga   5160
ccatgattac gccagtttta ttaaggcctt aattagg                            5198

SEQ ID NO: 8        moltype = DNA   length = 4855
FEATURE             Location/Qualifiers
source              1..4855
```

```
                mol_type   = other DNA
                organism   = synthetic construct
SEQUENCE: 8
ctgcgcgctc gctcgctcac tgaggccgcc cgggcaaagc ccgggcgtcg ggcgaccttt   60
ggtcgcccgg cctcagtgag cgagcgagcg cgcagagagg gagtgtagcc atgctctagg  120
aagatcaatt caattcacgc gtcgacattg attattgact agttattaat agtaatcaat  180
tacgggtca ttagttcata gcccatatat ggagttccgc gttacataac ttacggtaaa  240
tggcccgcct ggctgaccgc ccaacgaccc ccgcccattg acgtcaataa tgacgtatgt  300
tcccatagta acgccaatag ggactttcca ttgacgtcaa tgggtggagt atttacggta  360
aactgcccac ttggcagtac atcaagtgta tcatatgcca agtacgcccc ctattgacgt  420
caatgacggt aaatggcccg cctggcatta tgcccagtac atgaccttat gggactttcc  480
tacttggcag tacatctacg tattagtcat cgctattacc atgtcgaggc cacgttctgc  540
ttcactctcc ccatctcccc cccctcccca cccccaattt tgtatttatt tattttttaa  600
ttattttgtg cagcgatggg ggcgggggggg ggggcgcgc gccaggcggg gcggggcggg  660
gcgaggggcg gggcggggcg aggcggagag gtgcggcggc agccaatcag agcggcgcgc  720
tccgaaagtt tccttttatg gcgaggcggc ggcggcggcg gccctataaa aagcgaagcg  780
cgcggcgggc gggagcaagc tctagcctcg agaattcacc ggtgccacca tggccatgag  840
cagcggcggc agtggcggcg gcgtgcccga gcaggaggat tctgtgctgt tccggagagg  900
aacaggccag agcgatgact ccgatatctg ggacgacaca gcccttatca aggcctacga  960
caaggccgtg gccagcttta agcacgccct gaagaatggc gatatctgcg agacaagcgg 1020
aaagcctaag accaccccta aaagaaagcc cgccaagaaa acaagtccc agaaaaaaaa 1080
caccgccgct agcctgcagc agtggaaggt gggcgacaaa tgcagcgcca tctggtccga 1140
ggacggctgc atctaccctg ctaccatcgc cagcatcgac ttcaagcggg aaacctgcgt 1200
ggtgtctac acaggctatg caatagggga ggaacaaaat ctctctgatc tgctgtctcc 1260
tatttgtgaa gtggctaaca acatcgagca gaacgcccag gaaatgaga acgaaagcca 1320
agtgtccacc gacgagagcg agaacagcag aagccctgga aacaagtctg acaacatcaa 1380
gcccaagtct gccccttgga acagcttcct gccccctcct cctccaatgc ctggcccag 1440
actgggcccc ggcaagcctg gcctgaagtt caacggccct cctccacccc ctcctcctcc 1500
acctcccat ctgctgagct gctggctgcc tccttttccc agcggccccc ctatcatccc 1560
cccaccacct cctatctgtc ccgacagcct ggacgacgcc gatgctctgg gatccatgct 1620
gatcagctgg tacatgtctg gctaccacac cggctactac atgggcttcc ggcagaacca 1680
gaaggaagga agatgcagcc acagcctgaa ctgagccaag cttcctgagg atccgatctt 1740
tttccctctg ccaaaaatta tggggacatc atgaagcccc ttgagcatct gacttctggc 1800
taataaagga aatttatttt cattgcaata gtgtgttgga attttttgtg tctctcactc 1860
ggcctaggta gataagtagc atggcgggtt aatcattaac tacaaggaac ccctagtgat 1920
ggagttggcc actccctctc tgcgcgctcg ctcgctcact gaggccgggc gaccaaaggt 1980
cgcccgacgc ccgggctttg cccggcggc ctcagtgagc gagcgagcgc gcagccttaa 2040
ttaacctaat tcactggccg tcgttttaca acgtcgtgac tgggaaaacc ctggcgttac 2100
ccaacttaat cgccttgcag cacatccccc tttcgccagc tggcgtaata gcgaagaggc 2160
ccgcaccgat cgcccttccc aacagttgcg cagcctgaat ggcgaatggg acgcgcctg  2220
tagcggcgca ttaagcgcgg cgggtgtggt ggttacgcgc agcgtgaccg ctacacttgc 2280
cagcgcccta gcgcccgctc ctttcgcttt cttcccttcc tttctcgcca cgttcgccgg 2340
ctttccccgt caagctctaa atcggggggct ccctttaggg ttccgattta gtgctttacg 2400
gcacctcgac cccaaaaaac ttgattaggg tgatggttca cgtagtgggc catcgccctg 2460
atagacggtt tttcgccctt tgacgttgga gtccacgttc tttaatagtg gactcttgtt 2520
ccaaactgga acaacactca accctatctc ggtctattct tttgatttat aagggatttt 2580
gccgatttcg gcctattggt taaaaaatga gctgatttaa caaaaattta acgcgaattt 2640
taacaaaata ttaacgctta caatttaggt ggcactttc ggggaaatgt gcgcggaacc 2700
cctatttgtt tatttttcta aatacattca aatatgtatc cgctcatgag acaataaccc 2760
tgataaatgc ttcaataata ttgaaaaagg aagagtatga gtattcaaca tttccgtgtc 2820
gcccttattc cctttttgc ggcatttttgc tttcctgttt ttgctcaccc agaaacgctg 2880
gtgaaagtaa aagatgctga agatcagttg ggtgcacgag tgggttacat cgaactggat 2940
ctcaacagcg gtaagatcct tgagagtttt cgccccgaag aacgttttcc aatgatgagc 3000
acttttaaag ttctgctatg tggcgcggta ttatcccgta ttgacgccgg gcaagagcaa 3060
ctcggtcgcc gcatacacta ttctcagaat gacttggttg agtactcacc agtcacagaa 3120
aagcatctta cggatggcat gacagtaaga gaattatgca gtgctgccat aaccatgagt 3180
gataacactg cggccaactt acttctgaca acgatcggag gaccgaagga gctaaccgct 3240
ttttttgcaca acatggggga tcatgtaact cgccttgatc gttgggaacc ggagctgaat 3300
gaagccatac caaacgacga gcgtgacacc acgatgcctg tagcaatggc aacaacgttg 3360
cgcaaactat taactggcga actacttact ctagcttccc ggcaacaatt aatagactgg 3420
atggaggcgg ataaagttgc aggaccactt ctgcgctcgg cccttccggc tggctggttt 3480
attgctgata aatctggagc cggtgagcgt gggtctcgcg gtatcattgc agcactgggg 3540
ccagatggta agccctcccg tatcgtagtt atctacacga cggggagtca ggcaactatg 3600
gatgaacgaa atagacagat cgctgagata ggtgcctcac tgattaagca ttggtaactg 3660
tcagaccaag tttactcata tatactttag attgatttaa aacttcattt ttaatttaaa 3720
aggatctagg tgaagatcct ttttgataat ctcatgacca aaatccctta acgtgagttt 3780
tcgttccact gagcgtcaga ccccgtagaa aagatcaaag gatcttcttg agatcctttt 3840
tttctgcgcg taatctgctg cttgcaaaca aaaaaaccaa cgctaccagc ggtggtttgt 3900
ttgccggatc aagagctacc aactcttttt ccgaaggtaa ctggcttcag cagagcgcag 3960
ataccaaata ctgttcttct agtgtagccg tagttaggcc accacttcaa gaactctgta 4020
gcaccgccta catacctcgc tctgctaatc ctgttaccag tggctgctgc cagtggcgat 4080
aagtcgtgtc ttaccgggtt ggactcaaga cgatagttac cggataaggc gcagcggtcg 4140
ggctgaacgg ggggttcgtg cacacagccc agcttggagc gaacgaccta ccgaactg 4200
agatacctac agcgtgagct atgagaaagc gccacgcttc ccgaagggag aaaggcggac 4260
aggtatccgg taagcggcag ggtcggaaca ggagagcgca cgagggagct tccaggggga 4320
aacgcctggt atctttatag tcctgtcggg tttcgccacc tctgacttga gcgtcgattt 4380
ttgtgatgct cgtcaggggg gcggagccta tggaaaaacg ccagcaacgc ggcctttta  4440
cggttcctgg ccttttgctg gccttttgct cacatgttct ttcctgcgtt atcccctgat 4500
tctgtggata accgtattac cgcctttgag tgagctgata ccgctcgccg cagccgaacg 4560
```

```
accgagcgca gcgagtcagt gagcgaggaa gcggaagagc gcccaatacg caaaccgcct   4620
ctccccgcgc gttggccgat tcattaatgc agctggcacg acaggtttcc cgactgaaaa   4680
gcgggcagtg agcgcaacgc aattaatgtg agttagctca ctcattaggc acccaggct    4740
ttacacttta tgcttccggc tcgtatgttg tgtggaattg tgagcggata caatttcac    4800
acaggaaaca gctatgacca tgattacgcc agatttaatt aaggccttaa ttagg        4855

SEQ ID NO: 9           moltype = DNA   length = 4926
FEATURE                Location/Qualifiers
source                 1..4926
                       mol_type = other DNA
                       organism = synthetic construct
SEQUENCE: 9
ctgcgcgctc gctcgctcac tgaggccgcc cgggcaaagc ccgggcgtcg ggcgaccttt    60
ggtcgcccgg cctcagtgag cgagcgagcg cgcagagagg gagtgtagcc atgctctagg   120
aagatcaatt caattcacgc gtcgacattg attattgact agttattaat agtaatcaat   180
tacgggtca ttagttcata gcccatatat ggagttccgc gttacataac ttacggtaaa    240
tggcccgcct ggctgaccgc ccaacgaccc cgcccattg acgtcaataa tgacgtatgt    300
tcccatagta acgccaatag ggactttcca ttgacgtcaa tgggtggagt atttacggta   360
aactgcccac ttggcagtac atcaagtgta tcatatgcca agtacgcccc ctattgacgt   420
caatgacggt aaatggcccg cctggcatta tgcccagtac atgaccttat gggactttcc   480
tacttggcag tacatctacg tattagtcat cgctattacc atgtcgaggc cacgttctgc   540
ttcactctcc ccatctcccc ccctcccca ccccaattt tgtatttatt tatttttaa     600
ttattttgtg cagcgatggg ggcgggggg ggggcgcgc gccaggcggg gcggggcggg   660
gcgaggggcg gggcggggcg aggcggagag gtgcggcggc agccaatcag agcggcgcgc   720
tccgaaagtt tccttttatg gcgaggcggc ggcggcggcg gccctataaa aagcgaagcg   780
cgcggcgggc gggagcaagc tctagcctcg agaattcacc ggtgccacca tggccatgag   840
cagcggcggc agtggcggcg gcgtgccga gcaggaggat tctgtgctgt tccgagagg    900
aacaggccag agcgatgact ccgatatctg ggacgcacca gccctatca aggcctacga   960
caaggccgtg gccagcttta agcacgccct gaagaatggc gatatctgcg agacaagcgg  1020
aaagcctaag accaccccta aaagaaagcc cgccaagaaa aacaagtccc agaaaaaaa    1080
caccgccgct agcctgcagc agtggaaggt gggcgacaaa tgcagcgcca tctggtccga  1140
ggacggctgc atctaccctg ctaccatcgc cagcatcgac ttcaagcggg aaacctgcgt  1200
ggtggtctac acaggctatg caatagggca ggaacaaaat ctctctgatc tgctgtctcc  1260
tatttgtgaa gtggctaaca acatcgagca gaacgccgaa gaaaatgaga acgaaagcca  1320
agtgtccacc gacgagagcg agaacagcag aagccctgga aacaagtctg acaacatcaa  1380
gcccaagtct gccccttgga acagcttcct gccccctcct cctccaatgc ctggcccag   1440
actgggcccc ggcaagcctg gcctgaagtt caacggccct cctccacccc ctcctcctcc  1500
acctccccat ctgctgagct gctggctgcc tccttttccc agcggccccc ctatcatccc  1560
cccaccacct cctatctgtc ccgacaccct ggacgacgcc gatgctctgg gatccatgct  1620
gatcagctgg tacatgtctg gctaccacac cggctactac atgggcttcc ggcagaacca  1680
gaaggaagga agatgcagcc acagcctgaa ctgagcggcc acaaaacacca ttgtcacact 1740
ccaacaaaca ccattgtcac actccaacaa acaccattgt cacactccaa gcttcctgag  1800
gatccgatct ttttccctct gccaaaaatt atgggacat catgaagccc cttgagcatc   1860
tgacttctgg ctaataaagg aaattttatt tcattgcaat agtgtgttgg aattttttgt   1920
gtctctcact cggcctaggt agataagtag catggcggt taatcattaa ctacaaggaa  1980
cccctagtga tggagttggc cactccctct ctgcgcgctc gctcgctcac tgaggccggg  2040
cgaccaaaagg tcgcccgacg cccgggcttt gcccgggcgg cctcagtgag cgagcgagcg  2100
cgcagcctta attaacctaa ttcactggcc gtcgttttac aacgtcgtga ctgggaaaac   2160
cctggcgtta cccaacttaa tcgccttgca gcacatcccc ctttcgccag ctggcgtaat   2220
agcgaagagg cccgcaccga tcgcccttcc caacagttgc gcagcctgaa tggcgaatgg   2280
gacgcgccct gtagcggcgc attaagcgcg gcgggtgtgg tggttacgcg cagcgtgacc   2340
gctacacttg ccagcgccct agcgcccgct cctttcgctt tcttcccttc ctttctcgcc   2400
acgttcgccg gctttccccg tcaagctcta aatcgggggc tcccctttagg gttccgattt   2460
agtgctttac ggcacctcga ccccaaaaaa cttgattagg gtgatggttc acgtagtggg   2520
ccatcgccct gatagacggt ttttcgccct ttgacgttgg agtccacgtt ctttaatagt   2580
ggactcttgt tccaaactgg aacaacactc aaccctatct cggtctattc ttttgattta   2640
taagggattt tgccgatttc ggcctattgg ttaaaaaatg agctgattta caaaaatt     2700
aacgcgaatt ttaacaaaat attaacgctt acaatttagg tggcacttt cggggaaatg   2760
tgcgcggaac ccctatttgt ttatttttct aaatacattc aaatatgtat ccgctcatga   2820
gacataacc ctgataaatg cttcaataat attgaaaaag gaagagtatg agtattcaac    2880
atttccgtgt cgcccttatt cccttttttg cggcattttg ccttcctgtt tttgctcacc   2940
cagaaacgct ggtgaaagta aaagatgctg aagatcagtt gggtgcacga gtgggttaca   3000
tcgaactgga tctcaacagc ggtaagatcc ttgagagttt tcgccccgaa gaacgttttc   3060
caatgatgag cacttttaaa gttctgctat gtggcgcggt attatcccgt attgacgccg   3120
ggcaagagca actcggtcgc cgcatacact attctcagaa tgacttggtt gagtactcac   3180
cagtcacaga aaagcatctt acggatggca tgacagtaag agaattatgc agtgctgcca   3240
taaccatgag tgataacact gcggccaact tacttctgac aacgatcgga ggaccgaagg   3300
agctaaccgc ttttttgcac aacatggggg atcatgtaac tcgccttgat cgttgggaac   3360
cggagctgaa tgaagccata ccaaacgacg agcgtgacac cacgatgcct gtagcaatgg   3420
caacaacgtt gcgcaaacta ttaactggcg aactacttac tctagcttcc cggcaacaat   3480
taatagactg gatggaggcg gataaagttg caggaccact tctgcgctcg gcccttccgg   3540
ctggctggtt tattgctgat aaatctggag ccggtgagcg tgggtctcgc ggtatcattg   3600
cagcactggg gccagatggt aagccctccc gtatcgtagt tatctacacg acggggagtc   3660
aggcaactat ggatgaacga atagacaga tcgctgagat aggtgcctca ctgattaagc    3720
attggtaact gtcagaccaa gtttactcat atatacttta gattgattta aaacttcatt   3780
tttaatttaa aaggatctag gtgaagatcc tttttgataa tctcatgacc aaaatccctt   3840
aacgtgagtt ttcgttccac tgagcgtcag accccgtaga aaagatcaaa ggatcttctt   3900
gagatccttt ttttctgcgc gtaatctgct gcttgcaaac aaaaaaacca ccgctaccag   3960
cggtggtttg tttgccggat caagagctac caactctttt tccgaaggta actggcttca   4020
```

```
gcagagcgca gataccaaat actgttcttc tagtgtagcc gtagttaggc caccacttca  4080
agaactctgt agcaccgcct acatacctcg ctctgctaat cctgttacca gtggctgctg  4140
ccagtggcga taagtcgtgt cttaccgggt tggactcaag acgatagtta ccggataagg  4200
cgcagcggtc gggctgaacg gggggttcgt gcacacagcc cagcttggag cgaacgacct  4260
acaccgaact gagataccta cagcgtgagc tatgagaaag cgccacgctt cccgaaggga  4320
gaaaggcgga caggtatccg gtaagcggca gggtcggaac aggagagcgc acgagggagc  4380
ttccaggggg aaacgcctgg tatctttata gtcctgtcgg gtttcgccac ctctgacttg  4440
agcgtcgatt tttgtgatgc tcgtcagggg ggcggagcct atggaaaaac gccagcaacg  4500
cggccttttt acggttcctg gccttttgct ggcctttttgc tcacatgttc tttcctgcgt  4560
tatccctga ttctgtggat aaccgtatta ccgcctttga gtgagctgat accgctcgcc  4620
gcagccgaac gaccgagcgc agcgagtcag tgagcgagga agcggaagag cgcccaatac  4680
gcaaaccgcc tctccccgcg cgttggccga ttcattaatg cagctggcac gacaggtttc  4740
ccgactggaa agcgggcagt gagcgcaacg caattaatgt gagttagctc actcattagg  4800
caccccaggc tttacacttt atgcttccgg ctcgtatgtt gtgtggaatt gtgagcggat  4860
aacaatttca cacaggaaac agctatgacc atgattacgc cagatttaat taaggcctta  4920
attagg                                                             4926

SEQ ID NO: 10          moltype = DNA   length = 6352
FEATURE                Location/Qualifiers
source                 1..6352
                       mol_type = other DNA
                       organism = synthetic construct
SEQUENCE: 10
gctgcgcgct cgctcgctca ctgaggccgc ccgggcaaag cccggggcgtc gggcgacctt  60
tggtcgcccg gcctcagtga gcgagcgagc gcgcagagag ggagtggcca actccatcac  120
tagggggttcc ttgtagttaa tgattaaccc gccatgctac ttatctacca gggtaattgg  180
gatcctctag aactatagct agtcgacatt gattattgac tagttcgaag ctttataaaa  240
acatactttt ttttttactt tttttttttt ttctgagaca cagcctcact ctgtcgccca  300
ggctggagtg caggttttca tgtttatctg tgagatgtac ctttggcaca ttactttcct  360
gacatgagat ttaaatttt tttttatct tgtgacaatt taacttttt gacacataaa  420
aattgtacat atttatttgt ttgagatgga gtcgcactct gtcactcagg ctggagtgca  480
gtggcgtgat cttggctcac tgcaacctcc gcctcccgag ttcaagtgat tctcctggct  540
cagcctccca agcagctgtc attacaggcc tgcaccacca cacccggctg atttgtatt  600
tttaggagaa acagggtttc accatgttgg gccaggctgg tcttgaagtc ctgacctcaa  660
gtgatccacc caccttggcc tcccaaagtg ctgggattat aggcatgagc caccgtacca  720
gacccctaaa aattgtatat atttaaggtg taccatttga tgtttagata tacattgtga  780
aatgattaca ttccacatat tacctctaca gagttaccat ttttgtacac ttggtcaaca  840
tcatccccatt ctccccttcc tccacagata tttcttgtat actatataga agccaagggt  900
atttttgggg aagagctcaa agttcctttc gtggagttaa aaatatatat atactatgta  960
catataagcc atttagcaac cctagatgct taataaagaa tactggaggc ccggtgtggt  1020
ggctcacacc tgtaatccca gcactttggg aggccgaggc ggtcggatta cgaggtcagg  1080
agttcaagac cagcctggcc aacatggtga accccatctt tactaaaaaa tacaaaaatt  1140
agccggggtgt ggtggtgggc gcctgtaatc ccagctactc gggaggcaga attg  1200
cttgaacctg ggaggcagag gttgcagtga gctgagatca cgccactgca ttccagcctg  1260
ggtgacagag caatattctg tcgcaaaaaa aaaagaata ctggaggctg ggcgaggtgg  1320
ctcacacctg taatcccagc attttgggat gccagaggcg ggcggaatat cttgagctca  1380
ggagttcgag accagcctac acaatatgct ccaaacgccc cttctacaaa acatacagaa  1440
actacccggg tgtggtggcg tgcccctgtg gtcctagata cttgggaggt tgaggcggga  1500
ggatcgcttg agctcgggag gtcgaggctg caatgagccg agatggtgcc actgcattct  1560
gacgacagag cgagattccg tttcaaaaca aacaacaaat aaggttgggg gatcaaatat  1620
cttctagtgt ttaaggatct gccttccttc ctgcccccat gtttgtcttt ccttgtttgt  1680
ctttatatag atcaagcagg ttttaaattc ctagtaggag cttacattta cttttccaag  1740
ggggagggg aataaaatatc tacacacaca cacacacaca cacacacaca cacacacaca  1800
cacacacaca cacaccacac tggagttcga gacgaggcct aagcaacatg ccgaaacccc  1860
gtctctacta aatacaaaaa atagctgagc ttggtggcgc agcctatag tcctagctac  1920
tggggaggct gaggtgggag gatcgcttga gcccaagaag tcgaggctgc agtgagccga  1980
gatcgcgccg ctgcactcca gcctgagcga cagggcgagg ctctgtctca aaacaaacaa  2040
acaaaaaaaa aaaggaaagg aaatataaca cagtgaaatg aaaggattga gagaaatgaa  2100
aaatatacac gccacaaatg tgggagggcg ataaccactc gtagaaagcg tgagaagtta  2160
ctacaagcgg tcctcccggg caccgtactg ttccgctccc agaagccccg gggcgccggaa  2220
gtcgtcactc ttaagaaggg acggggcccc acgctgcgca cccgcggggtt tgctatggcc  2280
atgagcagcg gcggcagtgg cggcggcgtg cccgagcagg aggattctgt gctgttccgg  2340
agaggaacag gccagagcga tgactccgat atctgggacg acacagccct tatcaaggcc  2400
tacgacaagg ccgtggccag cttttaagcac gccctgaaga atggcgatat ctgcgagaca  2460
agcgaaagc ctaagaccac ccctaaaaga aagcccgcca agaaaaacaa gtcccagaaa  2520
aaaaacaccg ccgctagcct gcagcagtgg aagtgggcg acaaatgcag cgccatctgg  2580
tccgaggacg gctgcatcta ccctgctacc atcgccagca tcgacttcaa gcgggaaacc  2640
tgcgtggtgg tctacacagg ctatggcaat agggaggaac aaaatctctc tgatctgctg  2700
tctcctattt gtgaagtggc taacaatatc gagcagaagg cccaggaaaa tgagaacgaa  2760
agccaagtgt ccaccgacga gagcgagaac agcagaagcc ctggaaacaa gtctgacaac  2820
atcaagccca gtctgcccc ttggaacagc ttcctgcccc ctcctcctcc aatgcctggc  2880
cccagactgg gccccggcaa gccttggctg aagttcaacg gccctcctcc acccctcct  2940
cctcacctc ccatctgct gagctgctgg ctgcctcctt ttcccagcgg ccccctatc  3000
atccccccac cacctcctat ctgtcccgac agcctggacg atgatcctga gtcgggatca  3060
atgctgatca gctggtacat gtctggctac cacaccggct actacatggg cttccggcag  3120
aaccagaagg aaggaagatg cagccacagc ctgaactgag cggccacaaa caccattgtc  3180
acactccaac aaaccattt gtcacactcc aacaaacacc attgtcacac tccaagcttc  3240
ctgaggatcc gatctttttc cctctgccaa aaattatggg gacatcatga gcccccttga  3300
gcatctgact tctggctaat aaaggaaatt tattttcatt gcaatagtgt gttggaattt  3360
```

```
tttgtgtctc tcactcggaa gcaattcgtt gatctgaatt tcgaccaccc ataatacccca 3420
ttaccctggt agataagtag catgcgcggt taatcattaa ctacaaggaa cccctagtga 3480
tggagttggc cactccctct ctgcgcgctc gctcgctcac tgaggccggg cgaccaaagg 3540
tcgcccgacg cccgggcttt gcccgggcgg cctcagtgag cgagcgagcg cgcagcctta 3600
attaacctaa ttcactggcc gtcgttttac aacgtcgtga ctgggaaaac cctggcgtta 3660
cccaacttaa tcgccttgca gcacatcccc ctttcgccag ctggcgtaat agcgaagagg 3720
cccgcaccga tcgcccttcc caacagttgc gcagcctgaa tggcgaatgg gacgcgccct 3780
gtagcggcgc attaagcgcg gcgggtgtgg tggttacgcg cagcgtgacc gctacacttg 3840
ccagcgccct agcgcccgct cctttcgctt tcttcccttc ctttctcgcc acgttcgcg 3900
gctttccccg tcaagctcta aatcgggggc tccctttagg gttccgattt agtgctttac 3960
ggcacctcga ccccaaaaaa cttgattagg gtgatggttc acgtagtggg ccatcgccct 4020
gatagacggt ttttcgccct tgacgttgg agtccacgtt ctttaatagt ggactcttgt 4080
tccaaactgg aacaacactc aaccctatct cggtctattc ttttgattta aagggatttt 4140
tgccgatttc ggcctattgg ttaaaaaatg agctgattta acaaaaattt aacgcgaatt 4200
ttaacaaaat attaacgctt acaatttagg tggcactttt cggggaaatg tgcgcggaac 4260
ccctatttgt ttatttttct aaatacattc aaatatgtat ccgctcatga caataaacc 4320
ctgataaatg cttcaataat attgaaaaag gaagagtatg attgaacaag atggattgca 4380
cgcaggttct ccggccgctt gggtggagag gctattcggc tatgactggg cacaacagac 4440
aatcggctgc tctgatgccg ccgtgttccg gctgtcagcg caggggcgcc cggttctttt 4500
tgtcaagacc gacctgtccg gtgccctgaa tgaactgcaa gacgaggcag cgcggctatc 4560
gtggctggcc acgacgggcg ttccttgcgc agctgtgctc gacgttgtca ctgaagcggg 4620
aagggactgg ctgctattgg gcgaagtgcc ggggcaggat ctcctgtcat ctcaccttgc 4680
tcctgccgag aaagtatcca tcatggctga tgcaatgcgg cggctgcata cgcttgatcc 4740
ggctacctgc ccattcgacc accaagcgaa acatcgcatc gagcgagcac gtactcggat 4800
ggaagccggt cttgtcgatc aggatgatct ggacgaagag catcagggc tcgcgccagc 4860
cgaactgttc gccaggctca aggcgagcat gcccgacggc gaggatctcg tcgtgaccca 4920
tggcgatgcc tgcttgccga atatcatggt ggaaaatggc cgcttttctg gattcatcga 4980
ctgtggccgg ctgggtgtgg cggaccgcta tcaggacata gcgttggcta cccgtgatat 5040
tgctgaagag cttggcggcg aatgggctga ccgcttcctc gtgctttacg gtatcgccgc 5100
tcccgattcg cagcgcatcg ccttctatcg ccttcttgac gagttcttct gataactgcc 5160
agaccaagtt tactcatata tactttagat tgatttaaaa cttcattttt aatttaaaag 5220
gatctaggtg aagatccttt ttgataatct catgaccaaa atcccttaac gtgagttttc 5280
gttccactga gcgtcagacc ccgtagaaaa gatcaaagga tcttcttgag atccttttttt 5340
tctgcgcgta atctgctgct tgcaaacaaa aaaaccaccg ctaccagcgg tggtttgttt 5400
gccggatcaa gagctaccaa ctctttttcc gaaggtaact ggcttcagca gagcgcagat 5460
accaaatact gttcttctag tgtagccgta gttaggccac cacttcaaga actctgtagc 5520
accgcctaca tacctcgctc tgctaatcct gttaccagtg gctgctgcca gtggcgataa 5580
gtcgtgtctt accgggttgg actcaagacg atagttaccg gataaggcgc agcggtcggg 5640
ctgaacgggg ggttcgtgca cacagcccag cttggagcga acgacctaca ccgaactgag 5700
atacctacag cgtgagctat gagaaagcgc cacgcttccc gaaggagaa aggcggacag 5760
gtatccggta agcggcaggg tcggaacagg agagcgcacg agggagcttc caggggggaaa 5820
cgcctggtat ctttatagtc ctgtcgggtt tcgccacctc tgacttgagc gtcgattttt 5880
gtgatgctcg tcagggggc ggagcctatg gaaaaacgcc agcaacgcgg cctttttacg 5940
gttcctggcc ttttgctggc cttttgctca catgttcttt cctgcgttat ccctgattc 6000
tgtgataac cgtattaccg cctttgagtg agctgatacc gctcgccgca gccgaacgac 6060
cgagcgcagc gagtcagtga gcgaggaagc ggaagagcgc ccaatacgca aaccgcctct 6120
ccccgcgcgt tggccgattc attaatgcag ctggcacgac aggtttcccg actggaaagc 6180
gggcagtgag cgcaacgcaa ttaatgtgag ttagctcact cattaggcac cccaggcttt 6240
acactttatg cttccggctc gtatgttgtg tggaattgtg agcggataac aatttcacac 6300
aggaaacagc tatgaccatg attacgccag atttaattaa ggccttaatt ag 6352

SEQ ID NO: 11           moltype = DNA   length = 5264
FEATURE                 Location/Qualifiers
source                  1..5264
                        mol_type = other DNA
                        organism = synthetic construct
SEQUENCE: 11
ctgcgcgctc gctcgctcac tgaggccgcc cgggcaaagc ccgggcgtcg ggcgaccttt     60
ggtcgcccgg cctcagtgag cgagcgagcg cgcagagagg gagtgtagcc atgctctagg    120
aagatcaatt cggtacaatt cacgcgtgga tgccagagtg gggcggaata tcttcgagcg    180
aggagttcga gaccagccta cacaatatgc tccaaacgcc gcttctacaa aacatacaga    240
aactacccgc gtgtggtggc gtgcccctgt ggtcctagat acttgggagg ttgaggcggg    300
aggatcgctt gagctcggga ggtcgaggct gcaatgagcc gagatggtgc cactgcattc    360
tgacgacaga gcgagattcc gttctcaaaaac aaacaacaaa taaggttggg ggatcaaata    420
tcttctagtg tttaaggatc tgccttcctt cctgccccca tgtttgtctt tccttgtttt    480
tctttatata gatcaagcag gttttaaatt cctagtagga gcttacattt acttttccaa    540
gggggagggg gaataaatat ctacacacac acacacacac acacacacac acacacacac    600
acacacacac acacaccaca ctggagttcg agacgaggcc taagcaacat gccgaaaccc    660
cgtctctact aaatacaaaa aatagctgag cttggtggcg cacgcctata gtcctagcta    720
ctggggaggc tgaggtggga ggatcgcttg agcccaagaa gtcgaggctg cagtgagccg    780
agatcgcgcc gctgcactcc agcctgagcg cagggcgag gctctgtctc aaaacaaaca    840
aacaaaaaaa aaaggaaag gaaatataac acagtgaaat gaaaggattg agagaaatga    900
aaaatataca cgccacaaat gtgggagggc gataaccact cgtagaaagc gtgagaagtt    960
actacagtgc gtcccccgg gcaccgtact gttccgtcc cagaagcgcc gggcgccgca   1020
agtcgtcact cttaagaagg gacgggcccc cacgctgcgc acccgcgggt ttgctatggc   1080
catgagcagc ggcggcagtg gcggcggcgt gcccgagcag gaggattctg tgctgttccg   1140
gagaggaaca ggcagagcg atgactccga tatctgggac gacacagccc ttatcaaggc   1200
ctacgacaag gccgtggcca gctttaagca cgccctgaag aatggcgata tctgcgagac   1260
aagcggaaag cctaagacca cccctaaaag aaagcccgcc aagaaaaaca gtcccgaaa   1320
```

```
aaaaaacacc gccgctagcc tgcagcagtg gaaggtgggc gacaaatgca gcgccatctg  1380
gtccgaggac ggctgcatct accctgctac catcgccagc atcgacttca agcgggaaac  1440
ctgcgtggtg gtctacacag gctatggcaa tagggaggaa caaatctct ctgatctgct   1500
gtctcctatt tgtgaagtgg ctaacaacat cgagcagaac gcccaggaaa atgagaacga  1560
aagccaagtg tccaccgacg agagcgagaa cagcagaagc cctggaaaca agtctgacaa  1620
catcaagccc aagtctgccc cttggaacag cttcctgccc cctcctcctc caatgcctgg  1680
ccccagactg ggcccggca agcctggcct gaagttcaac ggccctcctc caccccctcc   1740
tcctccacct cccatctgc tgagctgctg gctgcctcct tttcccagcg gccccctat    1800
catcccccca ccacctccta tctgtcccga cagcctggac gacgccgatg ctctgggatc  1860
catgctgatc agctggtaca tgtctggcta ccacaccggc tactacatgg gcttccggca  1920
gaaccagaag gaaggaagat gcagccacag cctgaactga gcggccacaa acaccattgt  1980
cacactccaa caaacaccat tgtcacactc caacaaacac cattgtcaca ctccaagctt  2040
atcgataccg tcgactagag ctcgctgatc agcctcgact gtgccttcta gttgccagcc  2100
atctgttgtt tgcccctccc ccgtgccttc cttgaccctg gaaggtgcca ctcccactgt  2160
cctttcctaa taaatgagg aaattgcatc gcattgtctg agtaggtgtc attctattct    2220
gggggtggg gtgggcagg acagcaaggg ggaggattgg gaagacaata gcctaggtag    2280
ataagtagca tggcgggtta atcattaact acaaggaacc cctagtgatg gagttggcca   2340
ctccctctct gcgcgctcgc tcgctcactg aggccgggcg accaaaggtc gcccgacgcc   2400
cgggcttgc ccgggcggcc tcagtgagcg agcgagcgcg cagccttaat taacctaatt    2460
cactggccgt cgttttacaa cgtcgtgact gggaaaaccc tggcgttacc caacttaatc   2520
gccttgcagc acatccccct ttcgccagct ggcgtaatag cgaagaggcc cgcaccgatc   2580
gcccttccca acagttgcgc agcctgaatg gcgaatggga cgcgccctgt agcggcgcat   2640
taagcgcggc gggtgtggtg gttacgcgca gcgtgaccgc tacacttgcc agcgccctag  2700
cgcccgctcc tttcgctttc ttcccttcct ttctcgccac gttcgccggc tttccccgtc   2760
aagctctaaa tcggggctc cctttagggt tccgatttag tgctttacgg cacctcgacc    2820
ccaaaaaact tgattagggt gatggttcac gtagtgggcc atcgccctga tagacggttt   2880
ttcgcccttt gacgttggag tccacgttct ttaatagtgg actcttgttc caaactggaa   2940
caacactcaa ccctatctcg gtctattctt ttgatttata agggattttg ccgatttcgg   3000
cctattggtt aaaaaatgag ctgatttaac aaaaatttaa cgcgaatttt aacaaaatat   3060
taacgcttac aatttaggtg cacttttcg gggaaatgtg cgcggaaccc ctatttgttt    3120
attttttctaa atacattcaa atatgtatcc gctcatgaga caataaccct gataaatgct   3180
tcaataatat tgaaaaagga agagtatgag tattcaacat ttccgtgtcg cccttattcc   3240
ctttttgcg gcattttgcc ttcctgtttt tgctcaccca gaaacgctgg tgaaagtaaa    3300
agatgctgaa gatcagttgg gtgcacgagt gggttacatc gaactggatc tcaacagcgg  3360
taagatcctt gagagttttc gccccgaaga acgttttcca atgatgagca ctttaaagt   3420
tctgctatgt ggcgcggtat tatcccgtat tgacgccggg caagagcaac tcggtcgccg  3480
catacactat tctcagaatg acttggttga gtactcacca gtcacagaaa agcatcttac  3540
ggatggcatg acagtaagag aattatgcag tgctgccata accatgagtg ataacactgc  3600
ggccaactta cttctgacaa cgatcggagg accgaaggag ctaaccgctt ttttgcacaa   3660
catgggggat catgtaactc gccttgatcg ttgggaaccg gagctgaatg aagccatacc   3720
aaacgacgag cgtgacacca cgatgcctgt agcaatggca acaacgttgc gcaaactatt   3780
aactggcgaa ctacttactc tagcttcccg gcaacaatta atagactgga tggaggcgga   3840
taaagttgca ggaccacttc tgcgctcggc ccttccggct ggctggttta ttgctgataa   3900
atctggagcc ggtgagcgtg gtctcgcgg tatcattgca gcactgggc cagatggtaa    3960
gccctcccgt atcgtagtta tctacacgac ggggagtcag gcaactatgg atgaacgaaa   4020
tagacagatc gctgagatag gtgcctcact gattaagcat tggtaactgt cagaccaagt   4080
ttactcatat atactttaga ttgatttaaa acttcattt taatttaaaa ggatctaggt    4140
gaagatcctt tttgataatc tcatgaccaa aatcccttaa cgtgagtttt cgttccactg   4200
agcgtcagac cccgtagaaa agatcaaagg atcttcttga tccttttttt ttctgcgcgt   4260
aatctgctgc ttgcaaacaa aaaaaccacc gctaccagcg gtggtttgtt tgccggatca   4320
agagctacca actcttttc cgaaggtaac tggcttcagc agagcgcaga taccaaatac    4380
tgttcttcta gtgtagccgt agttaggcca ccacttcaag aactctgtag caccgcctac   4440
atacctcgct ctgctaatcc tgttaccagt ggctgctgcc agtggcgata agtcgtgtct   4500
taccgggttg gactcaagac gatagttacc ggataaggcg cagcggtcgg gctgaacggg   4560
gggttcgtgc acacagccca gcttggagcg aacgacctac accgaactga gatacctaca   4620
gcgtgagcta tgagaaagcg ccacgcttcc cgaaggagaa aaggcggaca ggtatccggt   4680
aagcggcagg gtcggaacag gagagcgcac gagggagctt ccagggggaa acgcctggta   4740
tctttatagt cctgtcgggt ttcgccacct ctgacttgag cgtcgatttt tgtgatgctc   4800
gtcagggggg cggagcctat ggaaaaacgc cagcaacgcg gcctttttac ggttcctggc   4860
cttttgctgg cctttttgctc acatgttctt tcctgcgtta tcccctgatt ctgtggataa   4920
ccgtattacc gcctttgagt gagctgatac cgctcgccgc agccgaacga ccgagcgcag   4980
cgagtcagtg agcgaggaag cggaagagcg cccaatacgc aaaccgcctc tccccgcgcg   5040
ttggccgatt cattaatgca gctggcacga caggtttccc gactggaaag cgggcagtga   5100
gcgcaacgca attaatgtga gttagctcac tcattaggca cccaggcttt tacactttat    5160
gcttccggct cgtatgttgt gtggaattgt gagcggataa caatttcaca caggaaacag   5220
ctatgaccat gattacgcca gatttaatta aggccttaat tagg                    5264
```

GENE THERAPY FOR SPINAL MUSCULAR ATROPHY

RELATED APPLICATION

This application is a continuation under 35 U.S.C. § 120 of U.S. application Ser. No. 18/712,273, filed May 22, 2024, which is a national stage filing under 35 U.S.C. § 371 of international PCT application PCT/US2022/080315, filed Nov. 22, 2022, which claims priority under 35 U.S.C. § 119(e) to U.S. provisional patent application, U.S. Ser. No. 63/341,650, filed May 13, 2022 and U.S. provisional patent application, U.S. Ser. No. 63/282,246, filed Nov. 23, 2021, the entire contents of each of which are incorporated by reference herein.

REFERENCE TO AN ELECTRONIC SEQUENCE LISTING

The contents of the electronic sequence listing (U012070171US03-SEQ-LJG.xml; size: 48,436 bytes; and date of creation: Sep. 5, 2024) is herein incorporated by reference in its entirety.

BACKGROUND

Spinal muscular atrophy (SMA) is a neuromuscular disease caused by loss-of-function of survival of motor neuron 1 (SMN1) gene and characterized by the degeneration of motor neurons and progressive muscle weakness. SMA affects approximately 1 in 11,000 newborns and remains the leading genetic cause of infantile death. In the past decade, two major breakthroughs have been made to treat this devasting diseases by increasing SMN protein in human patients. The first is antisense oligonucleotides (ASOs), Nusinersen and risdiplam, which modify the splicing of existing SMN2 pre-mRNAs. The second is Zolgensma, a self-complementary adeno-associated virus 9 (scAAV9) mediated SMN1 gene replacement.

SUMMARY

Aspects of the disclosure relate to compositions and methods for treating spinal muscular atrophy (SMA). The disclosure is based, in part, on isolated nucleic acids and vectors (e.g., viral vectors, such as rAAV vectors) encoding SMN1. In some embodiments, the expression of SMN1 is driven by a native SMN1 promoter or a variant thereof. In some embodiments, isolated nucleic acids and vectors of the disclosure have reduced toxicity and/or increased transgene expression relative to previously described SMN-encoding vectors.

Accordingly, in some aspects, the disclosure provides a recombinant adeno-associated virus (rAAV) vector comprising a transgene comprising an endogenous SMN1 promoter operably linked to a codon-optimized nucleic acid sequence encoding human SMN1, flanked by adeno-associated virus (AAV) inverted terminal repeats (ITRs). In some embodiments, a codon-optimized nucleic acid sequence comprises a nucleic acid sequence that is at least 70%, 80%, 90%, 95%, or 99% identical to the nucleic acid sequence set forth in SEQ ID NO: 1. In some embodiments, a codon-optimized nucleic acid sequence comprises or consists of the sequence set forth in SEQ ID NO: 1. In some embodiments, a codon-optimized nucleic acid sequence does not comprise the nucleic acid sequence set forth in SEQ ID NO: 2. In some embodiments, a human SMN1 comprises the amino acid sequence set forth in SEQ ID NO: 3.

In some embodiments, an endogenous SMN1 promoter is a human SMN1 promoter. In some embodiments, an endogenous SMN1 promoter comprises a nucleic acid sequence that is at least 70%, 80%, 90%, 95%, or 99% identical to the nucleic acid sequence set forth in SEQ ID NO: 4 or 5. In some embodiments, an endogenous SMN1 promoter comprises or consists of the nucleic acid sequence set forth in SEQ ID NO: 4. In some embodiments, an endogenous SMN1 promoter comprises or consists of the nucleic acid sequence set forth in SEQ ID NO: 5.

In some embodiments, the recombinant adeno-associated virus (rAAV) vector comprising a transgene comprising a promoter operably linked to a codon-optimized nucleic acid sequence encoding human SMN1, flanked by adeno-associated virus (AAV) inverted terminal repeats (ITRs), wherein the promoter is a constitutive promoter. In some embodiments, the promoter is a CB6 promoter. In some embodiments, the rAAV vector further comprising a CMV enhancer.

In some embodiments, the rAAV vector further comprising one or more miR-122 binding sites. In some embodiments, the one or more miR-122 binding sites are placed between the codon-optimized nucleic acid sequence encoding human SMN1 and the 3' ITR. In some embodiments, the rAAV vector comprises a nucleic acid sequence at least 60%, at least 70%, at least 80%, at least 90%, at least 91%, at least 92%, at least 93%, at least 94%, at least 95%, at least 96%, at least 97%, at least 98%, at least 99%, or 100% identical to SEQ ID NO: 9-11.

In some embodiments, at least one AAV ITR is an AAV2 ITR. In some embodiments, at least one AAV ITR is a mutant ITR (mTR).

In some aspects, the disclosure provides a vector comprising an rAAV vector as described herein. In some embodiments, a vector is a plasmid or a baculovirus vector.

In some aspects, the disclosure provides a cell comprising an rAAV vector as described herein or a vector as described herein. In some embodiments, the cell is a prokaryotic cell or a eukaryotic cell. In some embodiments, the cell is a mammalian cell, bacterial cell, or insect cell (e.g., SF9 cell).

In some aspects, the disclosure provides an isolated nucleic acid comprising the nucleic acid sequence set forth in any one of SEQ ID NO: 1, SEQ ID NO: 6, or SEQ ID NO: 7.

In some embodiments, an isolated nucleic acid further comprises an endogenous SMN1 promoter operably linked to the nucleic acid sequence. In some embodiments, an endogenous SMN1 promoter is a human SMN1 promoter. In some embodiments, an endogenous SMN1 promoter comprises or consists of the nucleic acid sequence set forth in SEQ ID NO: 4 or 5.

In some aspects, the disclosure provides a recombinant adeno-associated virus (rAAV) comprising a recombinant adeno-associated virus (rAAV) vector comprising a transgene comprising an endogenous SMN1 promoter operably linked to a codon-optimized nucleic acid sequence encoding human SMN1, flanked by adeno-associated virus (AAV) inverted terminal repeats (ITRs); and at least one AAV capsid protein.

In some embodiments, a codon-optimized nucleic acid sequence comprises a nucleic acid sequence that is at least 70%, 80%, 90%, 95%, or 99% identical to the nucleic acid sequence set forth in SEQ ID NO: 1. In some embodiments, a codon-optimized nucleic acid sequence comprises or consists of the sequence set forth in SEQ ID NO: 1. In some embodiments, a codon-optimized nucleic acid sequence does not comprise the nucleic acid sequence set forth in SEQ ID NO: 2. In some embodiments, a human SMN1 comprises the amino acid sequence set forth in SEQ ID NO: 3.

In some embodiments, an endogenous SMN1 promoter is a human SMN1 promoter. In some embodiments, an endogenous SMN1 promoter comprises a nucleic acid sequence that is at least 70%, 80%, 90%, 95%, or 99% identical to the nucleic acid sequence set forth in SEQ ID NO: 4 or 5. In some embodiments, an endogenous SMN1 promoter comprises or consists of the nucleic acid sequence set forth in SEQ ID NO: 4. In some embodiments, an endogenous SMN1 promoter comprises or consists of the nucleic acid sequence set forth in SEQ ID NO: 5.

In some embodiments, the recombinant adeno-associated virus (rAAV) vector comprising a transgene comprising a promoter operably linked to a codon-optimized nucleic acid sequence encoding human SMN1, flanked by adeno-associated virus (AAV) inverted terminal repeats (ITRs), wherein the promoter is a constitutive promoter. In some embodiments, the promoter is a CB6 promoter. In some embodiments, the rAAV vector further comprising a CMV enhancer.

In some embodiments, the rAAV vector further comprising one or more miR-122 binding sites. In some embodiments, the one or more miR-122 binding sites are placed between the codon-optimized nucleic acid sequence encoding human SMN1 and the 3' ITR. In some embodiments, the rAAV vector comprises a nucleic acid sequence at least 60%, at least 70%, at least 80%, at least 90%, at least 91%, at least 92%, at least 93%, at least 94%, at least 95%, at least 96%, at least 97%, at least 98%, at least 99%, or 100% identical to SEQ ID NO: 9-11. In some embodiments, at least one AAV ITR is an AAV2 ITR. In some embodiments, at least one AAV ITR is a mutant ITR (mTR). In some embodiments, an rAAV is a self-complementary AAV (scAAV).

In some embodiments, at least one AAV capsid protein is an AAV2, AAV3, AAV4, AAV5, AAV6, AAV7, AAV8, or AAV9 capsid protein, or a variant thereof. In some embodiments, at least one AAV capsid protein is an AAV9 capsid protein.

In some aspects, the present disclosure provides a recombinant adeno-associated virus (rAAV) comprising: (a) a self-complementary rAAV genome comprising: (i) a 5' ITR; (ii) a human short SMN promoter comprising the nucleotide sequence of SEQ ID NO: 5; (iii) a codon optimized nucleic acid sequence encoding SMN1 as set forth in SEQ ID NO: 1; (iv) a poly A tail; and (v) a 3' ITR; and (b) a AAV9 capsid protein. In some embodiments, the poly A tail is a rabbit globin poly A or a BGH poly A tail. In some embodiments, the rAAV further comprises one or more miR-122 binding sites.

In some aspects, the disclosure provides a pharmaceutical composition comprising an rAAV vector or rAAV as described herein, and a pharmaceutically acceptable excipient.

In some aspects, the disclosure provides a method for delivering a transgene to a cell, the method comprising administering an rAAV vector, rAAV, or pharmaceutical composition as described herein to a cell.

In some embodiments, a cell is a mammalian cell. In some embodiments, a cell is a human cell. In some embodiments, a cell is in a subject. In some embodiments, a subject has or is suspected of having spinal muscular atrophy (SMA).

In some aspects, the disclosure provides a method for preventing or treating spinal muscular atrophy (SMA) in a subject, the method comprising administering an rAAV vector, rAAV, or pharmaceutical composition as described herein to the subject.

In some embodiments, the subject is a mammal. In some embodiments, a subject is a human. In some embodiments, a subject has one or more mutations in a SMN1 gene.

In some embodiments, administering comprises systemic injection or local injection. In some embodiments, systemic injection comprises intravenous injection. In some embodiments, administering comprises injection to the central nervous system (CNS) of a subject.

In some embodiments, administration results in a reduced amount of dorsal root ganglion (DRG) toxicity in a subject relative to administration of a wild-type SMN1-encoding rAAV to the subject. In some embodiments, the administration results in a reduced amount of dorsal root ganglion (DRG) toxicity in the subject relative to administration of an rAAV comprising a constative promoter operably linked to a wild-type SMN1-coding sequence to the subject.

In some embodiments, the administration results in reduced liver toxicity in the subject relative to administration of an AAV vector comprising a constitutive promoter operably linked to a nucleic acid encoding human SMN1 to the subject.

In some embodiments, the administration results in reduced complication associated with SMA. In some embodiments, the complication of SMA comprises pulmonary infections, spinal deformities (e.g., scoliosis, hip subluxations/dislocations), joint contractures, or respiratory failure.

In some embodiments, the administration results in improved survival in the subject relative to administration of an AAV vector comprising a constitutive promoter operably linked to a nucleic acid encoding human SMN1 to the subject.

BRIEF DESCRIPTION OF DRAWINGS

FIG. 2A shows a survival curve of SMNΔ7 mice treated with Zolgensma (2×E14 genome copies (GCs)/kg) or SMNp-SMN1 rAAV at three doses (2×E14 genome copies (GCs)/kg; 6.8×E13 GCs/kg, or 3.4×E13 GCs/kg); ssAAV9.opt-SMN1 treated at the same or ⅓ doses have better survival than mice treated with Zolgensma. FIGS. 2B and 2C show representative data indicating that ssAAV9.opt-SMN1 treated mice show similar body weight gain compared to Zolgensma treated mice. FIG. 2D shows a survival curve for scAAV9.opt-SMN1 and Zolgensma in SMNΔ7 mice; scAAV9.opt-SMN1 treated at the same or ⅓ doses have better survival than mice treated with Zolgensma. FIGS. 2E and 2F show representative data indicating that ssAAV9.opt-SMN1 treated mice show similar body weight gain compared to Zolgensma treated mice.

FIG. 3A shows scAAV9.opt-SMN1 treated animals can right themselves from day 5 post-administration. FIG. 3B shows representative data indicating that all treated animals have functional muscle, as measured by rotarod test.

FIG. 4A shows histological data indicating that high levels of SMN1 overexpression are toxic to liver cells. Briefly, 5E+11 GC/mouse of AAV vectors were injected into animals at P0 via facial vein. Liver was collected at day 8 post injection. Liver damage was observed in AAVsc-CB6-PI-SMN1 (6/6 animals), and Zolgensma (4/7 animals) vector treated groups but not control empty AAV9 (0/8 animals) or ssAAV9-opt-SMN1 (0/8) vector treated groups. FIG. 4B shows representative alanine aminotransferase (ALT) assay test results.

FIG. 6A shows a survival curve of SMNΔ7 mice treated with Zolgensma (5×E11 genome copies (GC)) or SMNp-SMN1 rAAV at two doses (5×E11 GC or 1.67× E11 GC). FIG. 6B shows body weight growth of SMNΔ7 mice treated with Zolgensma (5×E11 GC) or SMNp-SMN1 rAAV at two doses (5×E11 GC or 1.67×E11 GC). FIG. 6C shows a survival curve of SMNΔ7 mice treated with Zolgensma (5×E11 GC) or SMNsp-SMN1 rAAV at three doses (5×E11 GC, 1.67×E11 GC, or 0.8×E11 GC). FIG. 6D shows body weight growth of SMNΔ7 mice treated with Zolgensma (5×E11 GC) or SMNsp-SMN1 rAAV at two doses (5×E11 GC or 1.67×E11 GC). Untreated control animals are also shown in each figure.

FIG. 7A shows that mice received rAAV9sc-CMVen/CB-co-hSMN1 treatment via facial vein injection showed yellow skin. FIG. 7B shows that liver toxicity was observed in mice received rAAV9sc-CMVen/CB-co-hSMN1 by liver histology. FIG. 7C shows the number of animals that had liver toxicity after rAAV9sc-CMVen/CB-co-hSMN treatment compared to a reference vector and untreated control (UC). FIG. 7D shows SMN1 expression in liver from mice treated with rAAV9sc-CMVen/CB-co-hSMN, the reference vector, or the untreated control.

FIG. 8A shows the AAV vector with or without miR-122 binding sites. FIG. 8B shows that incorporation of miR-122 binding sites in CMVen/CB-co-hSMN vector (CB6-PI-opt hSMN1-miR-122 BS) abrogated SMN1 expression in the liver. FIG. 8C shows that mice treated with scAAV9-CB6-PI-opt hSMN1-miR-122 BS) had no liver toxicity compared to the mice treated with rAAV9sc-CMVen/CB-co-hSMN1.

FIG. 9A shows that AAVsc-SMNp-co-hSMN1 resulted in higher expression efficiency in Neuro-2a cells compared to rAAV9sc-CMVen/CB-co-hSMN1. FIG. 9B shows the experimental design of treating mice using AAVsc-SMNp-co-hSMN1 via facial vein injection, Mice were monitored daily after treatment. FIG. 9C shows that the mice treated with AAVsc-SMNsp-co-hSMN1 gained more body weight than the reference vector group. FIG. 9D shows that the administration with AAVsc-SMNsp-co-hSMN1 vector significantly improved the life span of the SMA mice. FIG. 9E shows that the AAVsc-SMNsp-co-hSMN1 treated SMA mice were healthy at 5 months old. FIG. 9F shows that the SMA mice treated with AAVsc-SMNsp-co-hSMN1 were able to righting themselves earlier than the reference ones. FIG. 9G are representative images from transverse abdominis (TVA) shows the treatment effect on the restoration of innervation in neuromuscular junctions (NMJs). FIG. 9H shows that the structures of neuromuscular junctions in the AAVsc-SMNsp-co-hSMN1-treated mice were restored close to that of wild-type mice, better than those of reference-treated SMA mice. FIG. 9I shows the difference stages of ear necrosis as one of the complications in SMA mice. FIG. 9J shows that treatment with AAVsc-SMNsp-co-hSMN1 alleviated complication (e.g., ear necrosis) in SMA mice. FIGS. 9K-9L show immunoblot assay indicating that the AAVsc-SMNsp-co-hSMN1 preferentially express in central nervous system other than peripheral tissues. The expression pattern of this vector is close to the nature distribution of SMN as in healthy control animals.

DETAILED DESCRIPTION

Figure 1:
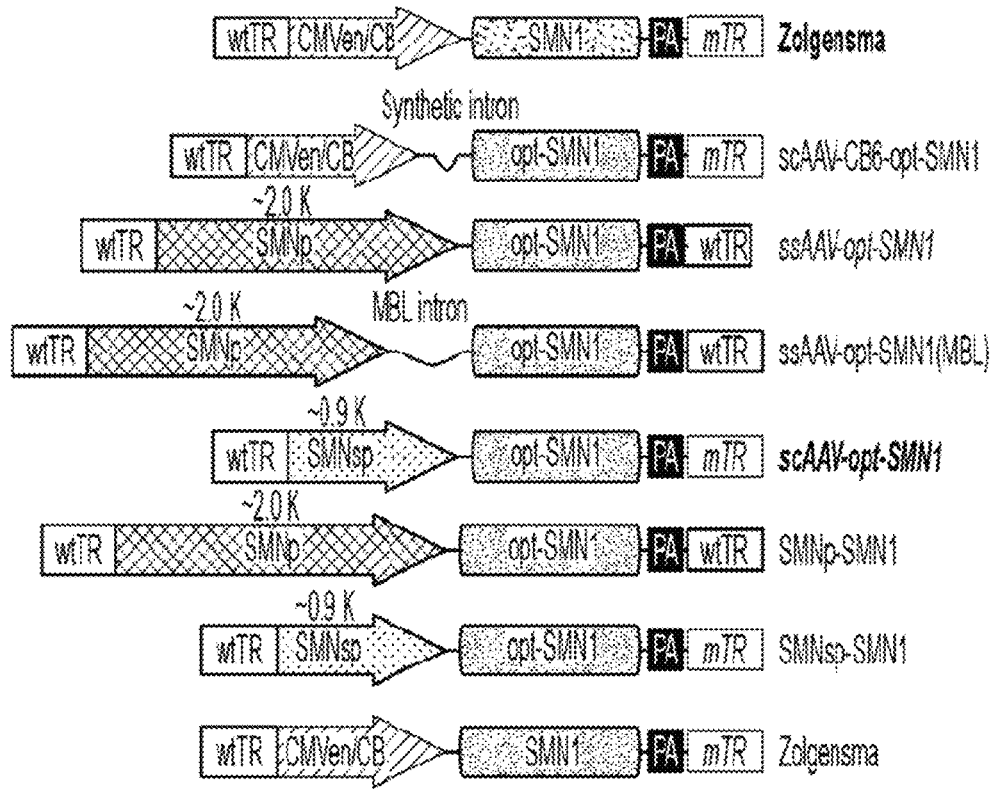
FIG. 1 shows a schematic representation of SMN1-encoding vectors of the disclosure. "scAAV-CB6-opt-SMN1" is a self-complementary AAV (scAAV) vector with a CB6 promoter and a codon-optimized SMN1 coding sequence. "SMN1p-SMN1" is a single-stranded AAV genome with a 2.0 kb endogenous human SMN1 promoter and a codon-optimized SMN1 coding sequence (CDS). "ssAAV-opt-SMN1(MBL)" is a single-stranded AAV genome with a 2.0 kb endogenous human SMN1 promoter, a synthetic MBL intron, and a codon-optimized SMN1 coding sequence (CDS). "SMNsp-SMN1" is a self-complementary AAV vector with a 0.9 kb endogenous human SMN1 promoter and a codon-optimized SMN1 CDS. "Zolgensma" is a self-complementary AAV vector with a CMV enhancer/chicken beta-actin promoter and a wild-type human SMN1 CDS.

Aspects of the disclosure relate to compositions and methods for treating spinal muscular atrophy (SMA). The disclosure is based, in part, on isolated nucleic acids and vectors (e.g., viral vectors, such as rAAV vectors) encoding SMN1. In some embodiments, the expression of SMN1 is driven by a native SMN1 promoter or a variant thereof. In some embodiments, isolated nucleic acids and vectors of the disclosure have reduced toxicity and/or increased transgene expression and/or reduced off-target tissue expression, relative to previously described SMN-encoding vectors.

Survival of Motor Neuron 1 (SMN1)

Aspects of the disclosure relate to compositions (e.g., isolated nucleic acids, vectors such as rAAV vectors, rAAVs, etc.) that encode a survival of motor neuron 1 (SMN1) protein. SMN1 protein is a component of a complex that catalyzes the assembly of small nuclear ribonucleoproteins (snRNPs) and plays an important role in the splicing of cellular pre-mRNAs. Mutations in SMN1 and SMN2 are associated with a Spinal Muscular Atrophy (SMA), a severe neuromuscular disorder that results in the loss of motor neurons and progressive muscle wasting. Spinal muscular atrophy (SMA) is a rare neuromuscular disorder that results in the loss of motor neurons and progressive muscle wasting. It is usually diagnosed in infancy or early childhood and if left untreated it is the most common genetic cause of infant death. It may also appear later in life and then have a milder course of the disease. The common feature is progressive weakness of voluntary muscles, with arm, leg and respiratory muscles being affected first. Patients with SMA could also develop complications associated problems may include poor head control, difficulties swallowing, pulmonary infections, spinal deformities (e.g., scoliosis, hip sub-luxations/dislocations), joint contractures, and respiratory failure.

The age of onset and the severity of symptoms form the basis of the traditional classification of spinal muscular atrophy into a number of types.

Spinal muscular atrophy is due to an abnormality (mutation) in the SMN1 gene which encodes SMN, a protein necessary for survival of motor neurons. Loss of these neurons in the spinal cord prevents signaling between the brain and skeletal muscles. Another gene, SMN2, is considered a disease modifying gene, since usually the more the SMN2 copies, the milder is the disease course. The diagnosis of SMA is based on symptoms and confirmed by genetic testing.

Outcomes in the natural course of the disease vary from death within a few weeks after birth in the most acute cases to normal life expectancy in the protracted SMA forms.

Medications that target the genetic cause of the disease include nusinersen, risdiplam, and the gene therapy medication onasemnogene abeparvovec. Supportive care includes physical therapy, occupational therapy, respiratory support, nutritional support, orthopaedic interventions, and mobility support.

In humans, SMN1 is encoded by a SMN1 gene, for example as set forth in NCBI Reference Sequence Nos. NM_000344, NM_001297715, and NM_022874. In some embodiments, a SMN1 protein comprises the amino acid sequence set forth in any one of NCBI Reference Sequence Nos. NP_059107, NP_075013, NP_075014, NP_075015, NP_000335. In some embodiments, a SMN1 protein comprises the amino acid sequence set forth in SEQ ID NO: 3. In some embodiments, a SMN1 protein comprises an amino acid sequence that is at least 50%, 60%, 70%, 75%, 80%, 90%, 95%, or 99% identical to the amino acid sequence set forth in SEQ ID NO: 3.

In some aspects, the disclosure relates to isolated nucleic acids comprising a codon-optimized (e.g., optimized to increase expression in human cells, reduce toxicity, reduce immunogenicity, etc.) nucleic acid sequence that encodes a SMN1 protein. In some embodiments, an isolated nucleic acid encoding a SMN1 protein comprises a nucleic acid sequence that is at least 70%, 75%, 80%, 90%, 95%, or 99% identical to the nucleic acid sequence set forth in SEQ ID NO: 1. In some embodiments, an isolated nucleic acid encoding a SMN1 protein comprises the nucleic acid sequence set forth in SEQ ID NO: 1. In some embodiments, an isolated nucleic acid encoding a SMN1 protein consists of the nucleic acid sequence set forth in SEQ ID NO: 1.

In some embodiments, an isolated nucleic acid encoding a SMN1 protein comprises at least one (e.g., 1, 2, 3, 4, 5, 10, 15, 20, 25, 50, 100, 150, 200, 250, or more) nucleotide substitutions, insertions, deletions, or any combination thereof, relative to a wild-type SMN1-encoding nucleic acid sequence, for example the nucleic acid sequence set forth in SEQ ID NO: 2.

A "nucleic acid" sequence refers to a DNA or RNA sequence. In some embodiments, proteins and nucleic acids of the disclosure are isolated. As used herein, the term "isolated" means artificially produced. As used herein, with respect to nucleic acids, the term "isolated" means: (i) amplified in vitro by, for example, polymerase chain reaction (PCR); (ii) recombinantly produced by cloning; (iii) purified, as by cleavage and gel separation; or (iv) synthesized by, for example, chemical synthesis. An isolated nucleic acid is one which is readily manipulable by recombinant DNA techniques well known in the art. Thus, a nucleotide sequence contained in a vector in which 5' and 3' restriction sites are known or for which polymerase chain reaction (PCR) primer sequences have been disclosed is considered isolated but a nucleic acid sequence existing in its native state in its natural host is not. An isolated nucleic acid may be substantially purified, but need not be. For example, a nucleic acid that is isolated within a cloning or expression vector is not pure in that it may comprise only a tiny percentage of the material in the cell in which it resides. Such a nucleic acid is isolated, however, as the term is used herein because it is readily manipulable by standard techniques known to those of ordinary skill in the art. As used herein with respect to proteins or peptides, the term "isolated" refers to a protein or peptide that has been isolated from its natural environment or artificially produced (e.g., by chemical synthesis, by recombinant DNA technology, etc.).

The isolated nucleic acids of the disclosure may be recombinant adeno-associated virus (AAV) vectors (rAAV vectors). In some embodiments, an isolated nucleic acid as described by the disclosure comprises a region (e.g., a first region) comprising a first adeno-associated virus (AAV) inverted terminal repeat (ITR), or a variant thereof. The isolated nucleic acid (e.g., the recombinant AAV vector) may be packaged into a capsid protein and administered to a subject and/or delivered to a selected target cell. "Recombinant AAV (rAAV) vectors" are typically composed of, at a minimum, a transgene and its regulatory sequences, and 5' and 3' AAV inverted terminal repeats (ITRs). The transgene may comprise a region encoding, for example, a protein and/or an expression control sequence (e.g., a poly-A tail), as described elsewhere in the disclosure.

Generally, ITR sequences are about 145 bp in length. Preferably, substantially the entire sequences encoding the ITRs are used in the molecule, although some degree of minor modification of these sequences is permissible. The ability to modify these ITR sequences is within the skill of the art. (See, e.g., texts such as Sambrook et al., "Molecular Cloning. A Laboratory Manual", 2d ed., Cold Spring Harbor Laboratory, New York (1989); and K. Fisher et al., J Virol., 70:520 532 (1996)). An example of such a molecule employed in the disclosure is a "cis-acting" plasmid containing the transgene, in which the selected transgene sequence and associated regulatory elements are flanked by the 5' and 3' AAV ITR sequences. The AAV ITR sequences may be obtained from any known AAV, including presently identified mammalian AAV types. In some embodiments, the isolated nucleic acid further comprises a region (e.g., a second region, a third region, a fourth region, etc.) comprising a second AAV ITR. In some embodiments, an isolated nucleic acid encoding a transgene is flanked by AAV ITRs (e.g., in the orientation 5'-ITR-transgene-ITR-3'). In some embodiments, the AAV ITRs are AAV2 ITRs. In some embodiments, at least one AAV ITR is a truncated AAV ITR (e.g., a mutant ITR, also referred to as an mTR), for example a ΔITR as described, for example by McCarty (2008) *Molecular Therapy* 16(10): 1648-1656.

In addition to the major elements identified above for the recombinant AAV vector, the vector also includes conventional control elements which are operably linked with elements of the transgene in a manner that permits its transcription, translation and/or expression in a cell transfected with the vector or infected with the virus produced by the disclosure. As used herein, "operably linked" sequences include both expression control sequences that are contiguous with the gene of interest and expression control sequences that act in trans or at a distance to control the gene of interest. Expression control sequences include appropriate transcription initiation, termination, promoter and enhancer sequences; efficient RNA processing signals such as splicing and polyadenylation (polyA) signals; sequences that stabilize cytoplasmic mRNA; sequences that enhance translation efficiency (e.g., Kozak consensus sequence);

sequences that enhance protein stability; and when desired, sequences that enhance secretion of the encoded product. A number of expression control sequences, including promoters which are native, constitutive, inducible and/or tissue-specific, are known in the art and may be utilized.

As used herein, a nucleic acid sequence (e.g., coding sequence) and regulatory sequences are said to be operably linked when they are covalently linked in such a way as to place the expression or transcription of the nucleic acid sequence under the influence or control of the regulatory sequences. If it is desired that the nucleic acid sequences be translated into a functional protein, two DNA sequences are said to be operably linked if induction of a promoter in the 5' regulatory sequences results in the transcription of the coding sequence and if the nature of the linkage between the two DNA sequences does not (1) result in the introduction of a frame-shift mutation, (2) interfere with the ability of the promoter region to direct the transcription of the coding sequences, or (3) interfere with the ability of the corresponding RNA transcript to be translated into a protein. Thus, a promoter region would be operably linked to a nucleic acid sequence if the promoter region were capable of effecting transcription of that DNA sequence such that the resulting transcript might be translated into the desired protein or polypeptide. Similarly, two or more coding regions are operably linked when they are linked in such a way that their transcription from a common promoter results in the expression of two or more proteins having been translated in frame. In some embodiments, operably linked coding sequences yield a fusion protein.

A region comprising a transgene (e.g., a transgene encoding a SMN1 protein, etc.) may be positioned at any suitable location of the isolated nucleic acid that will enable expression of the at least one transgene, the selectable marker protein, or reporter protein.

It should be appreciated that in cases where a transgene encodes more than one gene product (e.g., a SMN1 protein and another protein or interfering nucleic acid), each gene product may be positioned in any suitable location within the transgene. For example, a nucleic acid encoding a first polypeptide may be positioned in an intron of the transgene and a nucleic acid sequence encoding a second polypeptide may be positioned in another untranslated region (e.g., between the last codon of a protein coding sequence and the first base of the poly-A signal of the transgene).

A "promoter" refers to a DNA sequence recognized by the synthetic machinery of the cell, or introduced synthetic machinery, required to initiate the specific transcription of a gene. The phrases "operatively linked," "operatively positioned," "under control" or "under transcriptional control" means that the promoter is in the correct location and orientation in relation to the nucleic acid to control RNA polymerase initiation and expression of the gene.

For nucleic acids encoding proteins, a polyadenylation sequence generally is inserted following the transgene sequences and before the 3' AAV ITR sequence. A rAAV construct useful in the disclosure may also contain an intron, desirably located between the promoter/enhancer sequence and the transgene. One possible intron sequence is derived from SV-40, and is referred to as the SV-40 T intron sequence. In some embodiments, an intron is a non-native intron or synthetic intron (e.g., a MBL intron). Another vector element that may be used is an internal ribosome entry site (IRES). An IRES sequence is used to produce more than one polypeptide from a single gene transcript. An IRES sequence would be used to produce a protein that contain more than one polypeptide chains. Selection of these and other common vector elements are conventional, and many such sequences are available [see, e.g., Sambrook et al., and references cited therein at, for example, pages 3.18 3.26 and 16.17 16.27 and Ausubel et al., Current Protocols in Molecular Biology, John Wiley & Sons, New York, 1989]. In some embodiments, a Foot and Mouth Disease Virus 2A sequence is included in polyprotein; this is a small peptide (approximately 18 amino acids in length) that has been shown to mediate the cleavage of polyproteins (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459). The cleavage activity of the 2A sequence has previously been demonstrated in artificial systems including plasmids and gene therapy vectors (AAV and retroviruses) (Ryan, M D et al., EMBO, 1994; 4: 928-933; Mattion, N M et al., J Virology, November 1996; p. 8124-8127; Furler, S et al., Gene Therapy, 2001; 8: 864-873; and Halpin, C et al., The Plant Journal, 1999; 4: 453-459; de Felipe, P et al., Gene Therapy, 1999; 6: 198-208; de Felipe, P et al., Human Gene Therapy, 2000; 11: 1921-1931.; and Klump, H et al., Gene Therapy, 2001; 8: 811-817).

Examples of constitutive promoters include, without limitation, the retroviral Rous sarcoma virus (RSV) LTR promoter (optionally with the RSV enhancer), the cytomegalovirus (CMV) promoter (optionally with the CMV enhancer) [see, e.g., Boshart et al., Cell, 41:521-530 (1985)], the SV40 promoter, the dihydrofolate reductase promoter, the β-actin promoter, the phosphoglycerol kinase (PGK) promoter, and the EF1α promoter [Invitrogen]. In some embodiments, a promoter is an RNA pol II promoter. In some embodiments, a promoter is an RNA pol III promoter, such as U6 or Hi. In some embodiments, a promoter is an RNA pol II promoter. In some embodiments, a promoter is a chicken β-actin (CBA) promoter. In some embodiments, a promoter comprises a Ula promoter.

Inducible promoters allow regulation of gene expression and can be regulated by exogenously supplied compounds, environmental factors such as temperature, or the presence of a specific physiological state, e.g., acute phase, a particular differentiation state of the cell, or in replicating cells only. Inducible promoters and inducible systems are available from a variety of commercial sources, including, without limitation, Invitrogen, Clontech and Ariad. Many other systems have been described and can be readily selected by one of skill in the art. Examples of inducible promoters regulated by exogenously supplied promoters include the zinc-inducible sheep metallothionine (MT) promoter, the dexamethasone (Dex)-inducible mouse mammary tumor virus (MMTV) promoter, the T7 polymerase promoter system (WO 98/10088); the ecdysone insect promoter (No et al., Proc. Natl. Acad. Sci. USA, 93:3346-3351 (1996)), the tetracycline-repressible system (Gossen et al., Proc. Natl. Acad. Sci. USA, 89:5547-5551 (1992)), the tetracycline-inducible system (Gossen et al., Science, 268:1766-1769 (1995), see also Harvey et al., Curr. Opin. Chem. Biol., 2:512-518 (1998)), the RU486-inducible system (Wang et al., Nat. Biotech., 15:239-243 (1997) and Wang et al., Gene Ther., 4:432-441 (1997)) and the rapamycin-inducible system (Magari et al., J. Clin. Invest., 100:2865-2872 (1997)). Still other types of inducible promoters which may be useful in this context are those which are regulated by a specific physiological state, e.g., temperature, acute phase, a particular differentiation state of the cell, or in replicating cells only.

Aspects of the disclosure relate to isolated nucleic acids and rAAV vectors comprising a nucleic acid sequence encoding SMN1 (e.g., a codon-optimized nucleic acid sequence encoding SMN1) operably linked to a native promoter. In some embodiments a native promoter comprises a human SMN1 promoter, or a variant thereof. In some embodiments, a human SMN1 promoter comprises the nucleic acid sequence set forth in SEQ ID NO: 4. In some embodiments, a promoter comprises a portion of a human SMN1 promoter which comprises the nucleic acid sequence set forth in SEQ ID NO: 5 (i.e., short hSMN1 promoter). In some embodiments, a human SMN1 promoter or variant thereof comprises a nucleic acid sequence that is at least 50%, at least 60%, at least 70%, at least 80%, at least 90%, at least 91%, at least 92%, at least 93%, at least 94%, at least 95%, at least 96%, at least 97%, at least 98%, at least 99%, or 100% identical to the nucleic acid sequence set forth in SEQ ID NO: 4 or SEQ ID NO: 5. Human SMN1 promoters are generally known in the art, for example as described by Echaniz-Laguna et al., *Am. J. Hum. Genet.* 64:1365-1370, 1999. The native promoter may be preferred when it is desired that expression of the transgene should mimic the native expression (e.g., express physiological levels of hSMN1 expression in the appropriate cell types). The native promoter may be used when expression of the transgene must be regulated temporally or developmentally, or in a tissue-specific manner, or in response to specific transcriptional stimuli. Without wishing to be bound by any theory, use of a human SMN1 promoter in isolated nucleic acids and rAAV vectors described herein regulates expression of human SMN1 protein from the vectors, and reduces toxicity, for example dorsal root ganglion (DRG) toxicity or hepatotoxicity, in a subject relative to expression of human SMN1 protein from isolated nucleic acids and rAAV vectors comprising other promoters, for example CMV promoter, chicken-beta actin (CBA) promoter, CB6 promoter, etc. In a further embodiment, other native expression control elements, such as enhancer elements, polyadenylation sites, and/or Kozak consensus sequences may also be used to mimic the native expression.

In some embodiments, the regulatory sequences impart tissue-specific gene expression capabilities. In some cases, the tissue-specific regulatory sequences bind tissue-specific transcription factors that induce transcription in a tissue specific manner. Such tissue-specific regulatory sequences (e.g., promoters, enhancers, etc.) are well known in the art. Exemplary tissue-specific regulatory sequences include, but are not limited to the following tissue specific promoters: retinoschisin proximal promoter, interphotoreceptor retinoid-binding protein enhancer (RS/IRBPa), rhodopsin kinase (RK), liver-specific thyroxin binding globulin (TBG) promoter, an insulin promoter, a glucagon promoter, a somatostatin promoter, a pancreatic polypeptide (PPY) promoter, a synapsin-1 (Syn) promoter, a creatine kinase (MCK) promoter, a mammalian desmin (DES) promoter, a α-myosin heavy chain (α-MHC) promoter, or a cardiac Troponin T (cTnT) promoter. Other exemplary promoters include Beta-actin promoter, hepatitis B virus core promoter, Sandig et al., Gene Ther., 3:1002-9 (1996); alpha-fetoprotein (AFP) promoter, Arbuthnot et al., Hum. Gene Ther., 7:1503-14 (1996)), bone osteocalcin promoter (Stein et al., Mol. Biol. Rep., 24:185-96 (1997)); bone sialoprotein promoter (Chen et al., J. Bone Miner. Res., 11:654-64 (1996)), CD2 promoter (Hansal et al., J. Immunol., 161:1063-8 (1998); immunoglobulin heavy chain promoter; T cell receptor α-chain promoter, neuronal such as neuron-specific enolase (NSE) promoter (Andersen et al., Cell. Mol. Neurobiol., 13:503-15 (1993)), neurofilament light-chain gene promoter (Piccioli et al., Proc. Natl. Acad. Sci. USA, 88:5611-5 (1991)), and the neuron-specific vgf gene promoter (Piccioli et al., Neuron, 15:373-84 (1995)), among others which will be apparent to the skilled artisan.

In some embodiments, the promoter preferentially drives transgene expression in certain tissues. In some embodiments, the disclosure provides a nucleic acid comprising a tissue-specific promoter operably linked to a transgene. As used herein, "tissue-specific promoter" refers to a promoter that preferentially regulates (e.g., drives or up-regulates) gene expression in a particular cell type relative to other cell types. A cell-type-specific promoter can be specific for any cell type, such as central nervous system (CNS) cells, liver cells (e.g., hepatocytes), heart cells, muscle cells, etc. In some embodiments, a tissue-specific promoter is a muscle tissue or cell-specific promoter. Examples of CNS-specific promoters include but are not limited to synapsin (Syn), GFAP, Ca 2+/calmodulin-dependent protein kinase II (hCAMKII), etc.

In some aspects, the disclosure relates to isolated nucleic acids comprising a transgene encoding one or more miRNA binding sites. Without wishing to be bound by any particular theory, incorporation of miRNA binding sites into gene expression constructs allows for regulation of transgene expression (e.g., inhibition of transgene expression) in cells and tissues where the corresponding miRNA is expressed. In some embodiments, incorporation of one or more miRNA binding sites into a transgene allows for de-targeting of transgene expression in a cell-type specific manner. In some embodiments, one or more miRNA binding sites are positioned in a 3' untranslated region (3' UTR) of a transgene, for example between the last codon of a nucleic acid sequence encoding one or more complement control proteins as described herein, and a poly A sequence.

In some embodiments, the rAAV vector described herein comprises a nucleic acid sequence at least 60%, at least 70%, at least 80%, at least 90%, at least 91%, at least 92%, at least 93%, at least 94%, at least 95%, at least 96%, at least 97%, at least 98%, at least 99%, or 100% identical to SEQ ID NO: 6-8.

In some embodiments, transgene expression causes overexpression of the transgene in the liver, resulting in liver toxicity (see, e.g., Hinderer et al., Severe Toxicity in Non-human Primates and Piglets Following High-Dose Intravenous Administration of an Adeno-Associated Virus Vector Expressing Human SMN, Volume: 29 Issue 3, 285-298: Mar. 1, 2018. In some embodiments, in order to reduce liver toxicity, the AAV vector comprises a transgene comprises one or more (e.g., 1, 2, 3, 4, 5, or more) miRNA binding sites that de-target expression of a transgene from liver cells. For example, in some embodiments, a transgene comprises one or more miR-122 binding sites. In some embodiments, the rAAV vectors described herein comprises one or more miR-122 binding sites. In some embodiments, the rAAV vectors comprising miR-122 binding sites comprises a nucleic acid sequence at least 60%, at least 70%, at least 80%, at least 90%, at least 91%, at least 92%, at least 93%, at least 94%, at least 95%, at least 96%, at least 97%, at least 98%, at least 99%, or 100% identical to SEQ ID NO: 9-11.

In some embodiments, a transgene comprises one or more (e.g., 1, 2, 3, 4, 5, or more) miRNA binding sites that de-target expression of a transgene from immune cells (e.g., antigen presenting cells (APCs), such as macrophages, dendrites, etc.). Incorporation of miRNA binding sites for immune-associated miRNAs may de-target transgene (e.g., one or more inhibitory nucleic acids) expression from antigen presenting cells and thus reduce or eliminate immune responses (cellular and/or humoral) produced in the subject against products of the transgene, for example as described in US 2018/0066279, the entire contents of which are incorporated herein by reference.

As used herein an "immune-associated miRNA" is an miRNA preferentially expressed in a cell of the immune system, such as an antigen presenting cell (APC). In some embodiments, an immune-associated miRNA is an miRNA expressed in immune cells that exhibits at least a 2-fold, 3-fold, 4-fold, 5-fold, 6-fold, 7-fold, 8-fold, 9-fold, 10-fold higher level of expression in an immune cell compared with a non-immune cell (e.g., a control cell, such as a HeLa cell, HEK293 cell, mesenchymal cell, etc.). In some embodiments, the cell of the immune system (immune cell) in which the immune-associated miRNA is expressed is a B cell, T cell, Killer T cell, Helper T cell, 76 T cell, dendritic cell, macrophage, monocyte, vascular endothelial cell, or other immune cell. In some embodiments, the cell of the immune system is a B cell expressing one or more of the following markers: B220, BLAST-2 (EBVCS), Bu-1, CD19, CD20 (L26), CD22, CD24, CD27, CD57, CD72, CD79a, CD79b, CD86, chB6, D8/17, FMC7, L26, M17, MUM-1, Pax-5 (BSAP), and PC47H. In some embodiments, the cell of the immune system is a T cell expressing one or more of the following markers: ART2, CD1a, CD1d, CD11b (Mac-1), CD134 (OX40), CD150, CD2, CD25 (interleukin 2 receptor alpha), CD3, CD38, CD4, CD45RO, CD5, CD7, CD72, CD8, CRTAM, FOXP3, FT2, GPCA, HLA-DR, HML-1, HT23A, Leu-22, Ly-2, Ly-m22, MICG, MRC OX 8, MRC OX-22, OX40, PD-1 (Programmed death-1), RT6, TCR (T cell receptor), Thy-1 (CD90), and TSA-2 (Thymic shared Ag-2). In some embodiments, the immune-associated miRNA is selected from: miR-15a, miR-16-1, miR-17, miR-18a, miR-19a, miR-19b-1, miR-20a, miR-21, miR-29a/b/c, miR-30b, miR-31, miR-34a, miR-92a-1, miR-106a, miR-125a/b, miR-142-3p, miR-146a, miR-150, miR-155, miR-181a, miR-223 and miR-424, miR-221, miR-222, let-7i, miR-148, and miR-152. In some embodiments, a transgene described herein comprises one or more binding sites for miR-142.

Recombinant Adeno-Associated Viruses (rAAVs)

In some aspects, the disclosure provides isolated adeno-associated viruses (AAVs). As used herein with respect to AAVs, the term "isolated" refers to an AAV that has been artificially produced or obtained. Isolated AAVs may be produced using recombinant methods. Such AAVs are referred to herein as "recombinant AAVs". Recombinant AAVs (rAAVs) preferably have tissue-specific targeting capabilities, such that a transgene of the rAAV will be delivered specifically to one or more predetermined tissue(s) (e.g., muscle tissues, ocular tissues, neurons, etc.). The AAV capsid is an important element in determining these tissue-specific targeting capabilities (e.g., tissue tropism). Thus, an rAAV having a capsid appropriate for the tissue being targeted can be selected.

In some embodiments, rAAVs of the disclosure comprise a nucleotide sequence as set forth in SEQ ID NO: 1, 6 or 7, or encode a protein having an amino acid sequence as set forth in SEQ ID NO: 3. In some embodiments, rAAVs of the disclosure comprise a nucleotide sequence that is 99% identical, 95% identical, 90% identical, 85% identical, 80% identical, 75% identical, 70% identical, 65% identical, 60% identical, 55% identical, or 50% identical to a nucleotide sequence as set forth in SEQ ID NO: 1, 6-11.

In some aspects, the present disclosure provides a recombinant adeno-associated virus (rAAV) comprising: (a) a self-complementary rAAV genome comprising: (i) a 5' ITR; (ii) a human short SMN promoter comprising the nucleotide sequence of SEQ ID NO: 5; (iii) a codon optimized nucleic acid sequence encoding SMN1 as set forth in SEQ ID NO: 1; (iv) a poly A tail; and (v) a 3' ITR; and (b) a AAV9 capsid protein. In some embodiments, the poly A tail is a rabbit globin poly A or a BGH poly A tail. In some embodiments, the rAAV further comprises one or more miR-122 binding sites.

Methods for obtaining recombinant AAVs having a desired capsid protein are well known in the art. (See, for example, US 2003/0138772), the contents of which are incorporated herein by reference in their entirety). Typically the methods involve culturing a host cell which contains a nucleic acid sequence encoding an AAV capsid protein; a functional rep gene; a recombinant AAV vector composed of AAV inverted terminal repeats (ITRs) and a transgene; and sufficient helper functions to permit packaging of the recombinant AAV vector into the AAV capsid proteins. In some embodiments, capsid proteins are structural proteins encoded by the cap gene of an AAV. AAVs comprise three capsid proteins, virion proteins 1 to 3 (named VP1, VP2 and VP3), all of which are transcribed from a single cap gene via alternative splicing. In some embodiments, the molecular weights of VP1, VP2 and VP3 are respectively about 87 kDa, about 72 kDa and about 62 kDa. In some embodiments, upon translation, capsid proteins form a spherical 60-mer protein shell around the viral genome. In some embodiments, the functions of the capsid proteins are to protect the viral genome, deliver the genome and interact with the host. In some aspects, capsid proteins deliver the viral genome to a host in a tissue specific manner.

In some embodiments, an AAV capsid protein has a tropism for central nervous system (CNS) tissues. In some embodiments, an AAV capsid protein targets neuronal cell types, astrocytes, oligodendrocytes, glial cells, etc. In some embodiments, an AAV capsid protein is of an AAV serotype selected from the group consisting of AAV1, AAV2, AAV3, AAV4, AAV5, AAV6, AAV7, AAV8, AAVrh8, AAV9, AAV10, AAVrh10, AAV.PHP-eB, AAVrh39, AAVrh43, and variants of any of the foregoing. In some embodiments, the rAAV comprises an AAV9 capsid protein.

In some embodiments, an rAAV vector or rAAV particle comprises a mutant ITR that lacks a functional terminal resolution site (TRS). The term "lacking a terminal resolution site" can refer to an AAV ITR that comprises a mutation (e.g., a sense mutation such as a non-synonymous mutation, or missense mutation) that abrogates the function of the terminal resolution site (TRS) of the ITR, or to a truncated AAV ITR that lacks a nucleic acid sequence encoding a functional TRS (e.g., a ATRS ITR). Without wishing to be bound by any particular theory, a rAAV vector comprising an ITR lacking a functional TRS produces a self-complementary rAAV vector (scAAV or scrAAV vector), for example as described by McCarthy (2008) *Molecular Therapy* 16(10):1648-1656.

The components to be cultured in the host cell to package a rAAV vector in an AAV capsid may be provided to the host cell in trans. Alternatively, any one or more of the required components (e.g., recombinant AAV vector, rep sequences, cap sequences, and/or helper functions) may be provided by a stable host cell which has been engineered to contain one or more of the required components using methods known to those of skill in the art. Most suitably, such a stable host cell will contain the required component(s) under the control of an inducible promoter. However, the required component(s) may be under the control of a constitutive promoter. Examples of suitable inducible and constitutive promoters are provided herein, in the discussion of regulatory elements suitable for use with the transgene. In still another alternative, a selected stable host cell may contain selected component(s) under the control of a constitutive promoter and other selected component(s) under the control of one or more inducible promoters. For example, a stable host cell may be generated which is derived from 293 cells (which contain E1 helper functions under the control of a constitutive promoter), but which contain the rep and/or cap proteins under the control of inducible promoters. Still other stable host cells may be generated by one of skill in the art.

In some embodiments, the disclosure relates to a host cell containing a nucleic acid that comprises a codon-optimized coding sequence encoding a transgene (e.g., SMN1). A "host cell" refers to any cell that harbors, or is capable of harboring, a substance of interest. Often a host cell is a mammalian cell. In some embodiments, a host cell is a neuron. A host cell may be used as a recipient of an AAV helper construct, an AAV minigene plasmid, an accessory function vector, or other transfer DNA associated with the production of recombinant AAVs. The term includes the progeny of the original cell which has been transfected. Thus, a "host cell" as used herein may refer to a cell which has been transfected with an exogenous DNA sequence. It is understood that the progeny of a single parental cell may not necessarily be completely identical in morphology or in genomic or total DNA complement as the original parent, due to natural, accidental, or deliberate mutation. In some embodiments, the host cell is a mammalian cell, a yeast cell, a bacterial cell, an insect cell, a plant cell, or a fungal cell. In some embodiments, the host cell is a central nervous system cell, for example a neuron or a glial cell.

The recombinant AAV vector, rep sequences, cap sequences, and helper functions required for producing the rAAV of the disclosure may be delivered to the packaging host cell using any appropriate genetic element (vector). The selected genetic element may be delivered by any suitable method, including those described herein. The methods used to construct any embodiment of this disclosure are known to those with skill in nucleic acid manipulation and include genetic engineering, recombinant engineering, and synthetic techniques. See, e.g., Sambrook et al., Molecular Cloning: A Laboratory Manual, Cold Spring Harbor Press, Cold Spring Harbor, N.Y. Similarly, methods of generating rAAV virions are well known and the selection of a suitable method is not a limitation on the disclosure. See, e.g., K. Fisher et al., J. Virol., 70:520-532 (1993) and U.S. Pat. No. 5,478,745.

In some embodiments, recombinant AAVs may be produced using the triple transfection method (described in detail in U.S. Pat. No. 6,001,650). Typically, the recombinant AAVs are produced by transfecting a host cell with an AAV vector (comprising a transgene flanked by ITR elements) to be packaged into AAV particles, an AAV helper function vector, and an accessory function vector. An AAV helper function vector encodes the "AAV helper function" sequences (e.g., rep and cap), which function in trans for productive AAV replication and encapsidation. Preferably, the AAV helper function vector supports efficient AAV vector production without generating any detectable wild-type AAV virions (e.g., AAV virions containing functional rep and cap genes). Non-limiting examples of vectors suitable for use with the disclosure include pHLP19, described in U.S. Pat. No. 6,001,650 and pRep6cap6 vector, described in U.S. Pat. No. 6,156,303, the entirety of both incorporated by reference herein. The accessory function vector encodes nucleotide sequences for non-AAV derived viral and/or cellular functions upon which AAV is dependent for replication (e.g., "accessory functions"). The accessory functions include those functions required for AAV replication, including, without limitation, those moieties involved in activation of AAV gene transcription, stage specific AAV mRNA splicing, AAV DNA replication, synthesis of cap expression products, and AAV capsid assembly. Viral-based accessory functions can be derived from any of the known helper viruses such as adenovirus, herpes virus (other than herpes simplex virus type-1), and vaccinia virus.

In some aspects, the disclosure provides transfected host cells. The term "transfection" is used to refer to the uptake of foreign DNA by a cell, and a cell has been "transfected" when exogenous DNA has been introduced inside the cell membrane. A number of transfection techniques are generally known in the art. See, e.g., Graham et al. (1973) Virology, 52:456, Sambrook et al. (1989) Molecular Cloning, a laboratory manual, Cold Spring Harbor Laboratories, New York, Davis et al. (1986) Basic Methods in Molecular Biology, Elsevier, and Chu et al. (1981) Gene 13:197. Such techniques can be used to introduce one or more exogenous nucleic acids, such as a nucleotide integration vector and other nucleic acid molecules, into suitable host cells.

As used herein, the terms "recombinant cell" refers to a cell into which an exogenous DNA segment, such as DNA segment that leads to the transcription of a biologically-active polypeptide or production of a biologically active nucleic acid such as an RNA, has been introduced.

As used herein, the term "vector" includes any genetic element, such as a plasmid, phage, transposon, cosmid, chromosome, artificial chromosome, virus, virion, etc., which is capable of replication when associated with the proper control elements and which can transfer gene sequences between cells. In some embodiments, a vector is a viral vector, such as an rAAV vector, a lentiviral vector, an adenoviral vector, a retroviral vector, etc. Thus, the term includes cloning and expression vehicles, as well as viral vectors. In some embodiments a vector comprises a baculovirus vector, which are useful for producing viral particles in certain insect cells (e.g., SF9 cells). In some embodiments, useful vectors are contemplated to be those vectors in which the nucleic acid segment to be transcribed is positioned under the transcriptional control of a promoter.

Delivery of a Transgene to Tissue

The isolated nucleic acids, rAAVs, and compositions of the disclosure may be delivered to a subject in compositions according to any appropriate methods known in the art. For example, an rAAV, preferably suspended in a physiologically compatible carrier (e.g., in a composition), may be administered to a subject, i.e. host animal, such as a human, mouse, rat, cat, dog, sheep, rabbit, horse, cow, goat, pig, guinea pig, hamster, chicken, turkey, or a non-human primate (e.g., Macaque). In some embodiments a host animal does not include a human. In some embodiments, a subject is human.

Delivery of the rAAVs may be by, for example intramuscular injection or infusion into the muscle tissue or cells of a subject. As used herein, "muscle tissues" refers to any tissue derived from or contained in skeletal muscle, smooth muscle, or cardiac muscle of a subject. Non-limiting examples of muscle tissues include skeletal muscle, smooth muscle, cardiac muscle, myocytes, sarcomeres, myofibrils, etc.

Administration into the bloodstream may be by injection into a vein, an artery, or any other vascular conduit. In some embodiments, the rAAVs are administered into the bloodstream by way of isolated limb perfusion, a technique well known in the surgical arts, the method essentially enabling the artisan to isolate a limb from the systemic circulation prior to administration of the rAAV virions. A variant of the isolated limb perfusion technique, described in U.S. Pat. No. 6,177,403, can also be employed by the skilled artisan to administer the virions into the vasculature of an isolated limb to potentially enhance transduction into muscle cells or tissue.

Aspects of the instant disclosure relate to compositions comprising a recombinant AAV comprising a capsid protein and a nucleic acid encoding a transgene, wherein the transgene comprises a codon-optimized nucleic acid sequence encoding a SMN1 protein. In some embodiments, the nucleic acid further comprises AAV ITRs. In some embodiments, a composition further comprises a pharmaceutically acceptable carrier.

The compositions of the disclosure may comprise an rAAV alone, or in combination with one or more other viruses (e.g., a second rAAV encoding having one or more different transgenes). In some embodiments, a composition comprises 1, 2, 3, 4, 5, 6, 7, 8, 9, 10, or more different rAAVs each having one or more different transgenes.

Suitable carriers may be readily selected by one of skill in the art in view of the indication for which the rAAV is directed. For example, one suitable carrier includes saline, which may be formulated with a variety of buffering solutions (e.g., phosphate buffered saline). Other exemplary carriers include sterile saline, lactose, sucrose, calcium phosphate, gelatin, dextran, agar, pectin, peanut oil, sesame oil, and water. The selection of the carrier is not a limitation of the disclosure.

Optionally, the compositions of the disclosure may contain, in addition to the rAAV and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, parachlorophenol, and poloxamers (non-ionic surfactants) such as Pluronic® F-68. Suitable chemical stabilizers include gelatin and albumin.

The rAAVs are administered in sufficient amounts to transfect the cells of a desired tissue and to provide sufficient levels of gene transfer and expression without undue adverse effects. Conventional and pharmaceutically acceptable routes of administration include, but are not limited to, direct delivery to the selected organ (e.g., intraportal delivery to the liver), intraocular injection, subretinal injection, oral, inhalation (including intranasal and intratracheal delivery), intravenous, intramuscular, subcutaneous, intradermal, intratumoral, and other parental routes of administration. Routes of administration may be combined, if desired.

The dose of rAAV virions required to achieve a particular "therapeutic effect," e.g., the units of dose in genome copies/per kilogram of body weight (GC/kg), will vary based on several factors including, but not limited to the route of rAAV virion administration, the level of gene or RNA expression required to achieve a therapeutic effect, the specific disease or disorder being treated, and the stability of the gene or RNA product. One of skill in the art can readily determine a rAAV virion dose range to treat a patient having a particular disease or disorder based on the aforementioned factors, as well as other factors that are well known in the art. In some embodiments, an rAAV as described herein is administered to a subject in a dose ranging between about 1 ml to about 100 ml of solution containing from about $10^9$ to $10^{16}$ genome copies. In some cases, a dosage between about $10^{11}$ to $10^{13}$ rAAV genome copies is administered.

An effective amount of an rAAV is an amount sufficient to target infect an animal, target a desired tissue. In some embodiments, an effective amount of an rAAV is administered to the subject during a pre-symptomatic stage of degenerative disease. In some embodiments, a subject is administered an rAAV or composition after exhibiting one or more signs or symptoms of degenerative disease.

An effective amount of an rAAV may also depend on the mode of administration. For example, targeting a muscle tissue (e.g., muscle cells) by intramuscular administration or subcutaneous injection may require different (e.g., higher or lower) doses, in some cases, than targeting muscle tissue by another method (e.g., systemic administration, topical administration, etc.). In some embodiments, intramuscular injection (IM) of rAAV having certain serotypes (e.g., AAV2, AAV6, AAV9, etc.) mediates efficient transduction of muscle cells. Thus, in some embodiments, the injection is intramuscular injection (IM). In some embodiments, the injection is systemic administration (e.g., intravenous injection). In some cases, multiple doses of a rAAV are administered. In some embodiments, the administration is systemic administration. In some embodiments, the systemic administration comprises intravenous administration. In some embodiments, the administration is local administration to the central nervous system, for example by intracerebral injection, intrathecal injection, intracranial injection, etc.

In some embodiments, rAAV compositions are formulated to reduce aggregation of AAV particles in the composition, particularly where high rAAV concentrations are present (e.g., ~$10^3$ GC/mL or more). Methods for reducing aggregation of rAAVs are well known in the art and, include, for example, addition of surfactants, pH adjustment, salt concentration adjustment, etc. (See, e.g., Wright F R, et al., Molecular Therapy (2005) 12, 171-178, the contents of which are incorporated herein by reference.)

Formulation of pharmaceutically-acceptable excipients and carrier solutions is well-known to those of skill in the art, as is the development of suitable dosing and treatment regimens for using the particular compositions described herein in a variety of treatment regimens.

Typically, these formulations may contain at least about 0.1% of the active compound or more, although the percentage of the active ingredient(s) may, of course, be varied and may conveniently be between about 1 or 2% and about 70% or 80% or more of the weight or volume of the total formulation. Naturally, the amount of active compound in each therapeutically-useful composition may be prepared is such a way that a suitable dosage will be obtained in any given unit dose of the compound. Factors such as solubility, bioavailability, biological half-life, route of administration, product shelf life, as well as other pharmacological considerations will be contemplated by one skilled in the art of preparing such pharmaceutical formulations, and as such, a variety of dosages and treatment regimens may be desirable.

In certain circumstances it will be desirable to deliver the rAAV-based therapeutic constructs in suitably formulated pharmaceutical compositions disclosed herein either intraocularly, subretinally, subcutaneously, intraopancreatically, intranasally, parenterally, intravenously, intramuscularly, intrathecally, orally, intraperitoneally, or by inhalation. In some embodiments, the administration modalities as described in U.S. Pat. Nos. 5,543,158; 5,641,515 and 5,399,363 (each specifically incorporated herein by reference in its entirety) may be used to deliver rAAVs. In some embodiments, a preferred mode of administration is by portal vein injection.

The pharmaceutical forms suitable for injectable use include sterile aqueous solutions or dispersions and sterile powders for the extemporaneous preparation of sterile injectable solutions or dispersions. Dispersions may also be prepared in glycerol, liquid polyethylene glycols, and mixtures thereof and in oils. Under ordinary conditions of storage and use, these preparations contain a preservative to prevent the growth of microorganisms. In many cases the form is sterile and fluid to the extent that easy syringeability exists. It must be stable under the conditions of manufacture and storage and must be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For administration of an injectable aqueous solution, for example, the solution may be suitably buffered, if necessary, and the liquid diluent first rendered isotonic with sufficient saline or glucose. These particular aqueous solutions are especially suitable for intravenous, intramuscular, subcutaneous and intraperitoneal administration. In this connection, a sterile aqueous medium that can be employed will be known to those of skill in the art. For example, one dosage may be dissolved in 1 mL of isotonic NaCl solution and either added to 1000 mL of hypodermoclysis fluid or injected at the proposed site of infusion, (see for example, "Remington's Pharmaceutical Sciences" 15th Edition, pages 1035-1038 and 1570-1580). Some variation in dosage will necessarily occur depending on the condition of the host. The person responsible for administration will, in any event, determine the appropriate dose for the individual host.

Sterile injectable solutions are prepared by incorporating the active rAAV in the required amount in the appropriate solvent with various of the other ingredients enumerated herein, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques which yield a powder of the active ingredient plus any additional desired ingredient from a previously sterile-filtered solution thereof.

The rAAV compositions disclosed herein may also be formulated in a neutral or salt form. Pharmaceutically-acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like. Upon formulation, solutions will be administered in a manner compatible with the dosage formulation and in such amount as is therapeutically effective. The formulations are easily administered in a variety of dosage forms such as injectable solutions, drug-release capsules, and the like.

As used herein, "carrier" includes any and all solvents, dispersion media, vehicles, coatings, diluents, antibacterial and antifungal agents, isotonic and absorption delaying agents, buffers, carrier solutions, suspensions, colloids, and the like. The use of such media and agents for pharmaceutical active substances is well known in the art. Supplementary active ingredients can also be incorporated into the compositions. The phrase "pharmaceutically-acceptable" refers to molecular entities and compositions that do not produce an allergic or similar untoward reaction when administered to a host.

Delivery vehicles such as liposomes, nanocapsules, microparticles, microspheres, lipid particles, vesicles, and the like, may be used for the introduction of the compositions of the disclosure into suitable host cells. In particular, the rAAV vector delivered transgenes may be formulated for delivery either encapsulated in a lipid particle, a liposome, a vesicle, a nanosphere, or a nanoparticle or the like.

Such formulations may be preferred for the introduction of pharmaceutically acceptable formulations of the nucleic acids or the rAAV constructs disclosed herein. The formation and use of liposomes is generally known to those of skill in the art. Recently, liposomes were developed with improved serum stability and circulation half-times (U.S. Pat. No. 5,741,516). Further, various methods of liposome and liposome like preparations as potential drug carriers have been described (U.S. Pat. Nos. 5,567,434; 5,552,157; 5,565,213; 5,738,868 and 5,795,587).

Liposomes have been used successfully with a number of cell types that are normally resistant to transfection by other procedures. In addition, liposomes are free of the DNA length constraints that are typical of viral-based delivery systems. Liposomes have been used effectively to introduce genes, drugs, radiotherapeutic agents, viruses, transcription factors and allosteric effectors into a variety of cultured cell lines and animals. In addition, several successful clinical trials examining the effectiveness of liposome-mediated drug delivery have been completed.

Liposomes are formed from phospholipids that are dispersed in an aqueous medium and spontaneously form multilamellar concentric bilayer vesicles (also termed multilamellar vesicles (MLVs). MLVs generally have diameters of from 25 nm to 4 μm. Sonication of MLVs results in the formation of small unilamellar vesicles (SUVs) with diameters in the range of 200 to 500 Å, containing an aqueous solution in the core.

Alternatively, nanocapsule formulations of the rAAV may be used. Nanocapsules can generally entrap substances in a stable and reproducible way. To avoid side effects due to intracellular polymeric overloading, such ultrafine particles (sized around 0.1 μm) should be designed using polymers able to be degraded in vivo. Biodegradable polyalkyl-cyanoacrylate nanoparticles that meet these requirements are contemplated for use.

In addition to the methods of delivery described above, the following techniques are also contemplated as alternative methods of delivering the rAAV compositions to a host. Sonophoresis (i.e., ultrasound) has been used and described in U.S. Pat. No. 5,656,016 as a device for enhancing the rate and efficacy of drug permeation into and through the circulatory system. Other drug delivery alternatives contemplated are intraosseous injection (U.S. Pat. No. 5,779,708), microchip devices (U.S. Pat. No. 5,797,898), ophthalmic formulations (Bourlais et al., 1998), transdermal matrices (U.S. Pat. Nos. 5,770,219 and 5,783,208) and feedback-controlled delivery (U.S. Pat. No. 5,697,899).

Therapeutic Methods

Aspects of the disclosure relate to compositions and methods for preventing or treating certain neurological and/or neuromuscular diseases, for example Spinal Muscular Atrophy (SMA). The disclosure is based, in part, on isolated nucleic acids, rAAVs, etc., comprising a codon-optimized nucleic acid sequence which encode a SMN1 protein. In some embodiments, the rAAV vector comprises a native (e.g., human) SMN1 promoter, for example as set forth in SEQ ID NO: 4 or 5.

The disclosure is based, in part, on increasing SMN1 protein expression using rAAVs and vectors described herein, which also result in reduced toxicity in a subject (e.g., relative to a subject that has been administered previously used rAAV-SMN1 vectors, e.g., Zolgensma). In some embodiments, the reduced toxicity is reduced hepatotoxicity. In some embodiments, the reduced toxicity is reduced dorsal root ganglion (DRG) toxicity. The amount of reduction in toxicity in a subject may vary. In some embodiments toxicity is reduced between 2-fold and 5-fold, 3-fold and 10-fold, 5-fold and 20-fold, 10-fold and 50-fold, 30-fold and 80-fold, or 50-fold to 100-fold (e.g., relative to a subject that has been administered previously used rAAV-SMN1 vectors). In some embodiments, toxicity is reduced more than 100-fold (e.g., relative to a subject that has been administered previously used rAAV-SMN1 vectors, e.g., Zolgensma). Methods of measuring toxicity in a subject are known, and include measurement of cytotoxicity (e.g., cell death), measurement of hepatotoxicity (e.g., by ALT assay), etc.

In some embodiments, the administration results in reduced complication associated with SMA. In some embodiments, the complication of SMA comprises pulmonary infections, spinal deformities (e.g., scoliosis, hip subluxations/dislocations), joint contractures, or respiratory failure.

In some embodiments, the administration results in improved survival in the subject relative to administration of an AAV vector comprising a constitutive promoter operably linked to a nucleic acid encoding human SMN1 to the subject. In some embodiments, survival of the subject is increased by at least 10%, at least 20%, at least 30%, at least 40%, at least 50%, at least 60%, at least 70%, at least 80%, at least 90%, or 100% relative to a subject that has been administered previously used rAAV-SMN1 vectors, e.g., Zolgensma. Any suitable known methods of measuring survival rate can be used by the present disclosure.

In some embodiments, a subject is a mammalian subject, for example a human subject. In some embodiments, a subject is characterized as having one or more mutations in a SMN1 or SMN2 gene, for example one or more mutations resulting in reduced (or absence) of functional SMN1 protein in the cells of the subject. Examples of SMN1 mutations are described, for example by Wirth, Hum Mutat. 2000; 15(3):228-37. In some embodiments, a subject has reduced (or no) functional SMN1 protein in their cells. In some embodiments, the subject is a non-human mammal, for example, mouse, rat, goat, sheep, pig, cow, camel, llama, or non-human primates.

In some embodiments, administering the isolated nucleic acids, the rAAVs, or the compositions described herein to a cell or subject increases SMN1 expression in the cell or subject by between 2-fold and 100-fold (e.g., 2-fold, 5-fold, 10-fold, 20-fold, 50-fold, 75-fold, 100-fold, etc.) compared to a control subject. As used herein a "control" subject refers to a subject that is not administered the isolated nucleic acids, the rAAVs, or the compositions described herein. In some embodiments, a control subject is the same subject that is administered the isolated nucleic acids, the rAAVs, or the compositions described herein (e.g., prior to the administration).

In some aspects, the disclosure relates to a method for treating SMA in a subject, the method comprising: administering to the subject an isolated nucleic acid, rAAV, or pharmaceutical composition as described herein.

As used herein, the term "preventing" refers to the application or administration of a composition comprising a transgene encoding a SMN1 protein to a subject, who has not had a symptom, or a disease associated with aberrant SMN1 activity but at a predisposition toward a disease associated with aberrant SMN1 activity, with the purpose to stop or slow down the development of one or more symptoms of the disease associated with aberrant SMN1 activity. In some embodiments, the disease is SMA. In some embodiments, "preventing" also refers to stop or slow down the development of a complication associated with aberrant SMN1 activity (e.g., SMA) as described herein.

As used herein, the term "treating" refers to the application or administration of a composition comprising a transgene encoding a SMN1 protein to a subject, who has a symptom or a disease associated with aberrant SMN1 activity, or a predisposition toward a disease associated with aberrant SMN1 activity, with the purpose to cure, heal, alleviate, relieve, alter, remedy, ameliorate, improve, or affect the disorder, the symptom of the disease, or the predisposition toward a disease associated with aberrant SMN1 activity. In some embodiments, the disease is SMA. In some embodiments, "treating" also refers to cure, heal, alleviate, relieve, alter, remedy, ameliorate, improve, or affect a complication associated with aberrant SMN1 activity (e.g., SMA) as described herein.

Alleviating a disease associated with aberrant SMN1 activity includes delaying the development or progression of the disease, or reducing disease severity. Alleviating the disease does not necessarily require curative results. As used therein, "delaying" the development of a disease (such as a disease associated with aberrant SMN1 activity, such as SMA) means to defer, hinder, slow, retard, stabilize, and/or postpone progression of the disease. This delay can be of varying lengths of time, depending on the history of the disease and/or individuals being treated. A method that "delays" or alleviates the development of a disease, or delays the onset of the disease, is a method that reduces probability of developing one or more symptoms of the disease in a given time frame and/or reduces extent of the symptoms in a given time frame, when compared to not using the method. Such comparisons are typically based on clinical studies, using a number of subjects sufficient to give a statistically significant result.

"Development" or "progression" of a disease means initial manifestations and/or ensuing progression of the disease. Development of the disease can be detectable and assessed using standard clinical techniques as well known in the art. However, development also refers to progression that may be undetectable. For purpose of this disclosure, development or progression refers to the biological course of the symptoms. "Development" includes occurrence, recurrence, and onset. As used herein "onset" or "occurrence" of a disease associated with aberrant SMN1 activity or angiogenesis includes initial onset and/or recurrence.

Compositions described herein may be administered (or a transgene expressed) in one or more target cells of a subject (e.g., a mammalian subject, such as a human). In some embodiments, a composition (e.g., isolated nucleic acid, rAAV, etc.) is administered to a cell of the central nervous system (CNS) of a subject. Examples of CNS cells include but are not limited to neurons, astrocytes, glial cells, etc.

Kits and Related Compositions

The agents described herein may, in some embodiments, be assembled into pharmaceutical or diagnostic or research kits to facilitate their use in therapeutic, diagnostic or research applications. A kit may include one or more containers housing the components of the disclosure and instructions for use. Specifically, such kits may include one or more agents described herein, along with instructions describing the intended application and the proper use of these agents. In certain embodiments agents in a kit may be in a pharmaceutical formulation and dosage suitable for a particular application and for a method of administration of the agents. Kits for research purposes may contain the components in appropriate concentrations or quantities for running various experiments.

The kit may be designed to facilitate use of the methods described herein by researchers and can take many forms. Each of the compositions of the kit, where applicable, may be provided in liquid form (e.g., in solution), or in solid form, (e.g., a dry powder). In certain cases, some of the compositions may be constitutable or otherwise processable (e.g., to an active form), for example, by the addition of a suitable solvent or other species (for example, water or a cell culture medium), which may or may not be provided with the kit. As used herein, "instructions" can define a component of instruction and/or promotion, and typically involve written instructions on or associated with packaging of the disclosure. Instructions also can include any oral or electronic instructions provided in any manner such that a user will clearly recognize that the instructions are to be associated with the kit, for example, audiovisual (e.g., videotape, DVD, etc.), Internet, and/or web-based communications, etc. The written instructions may be in a form prescribed by a governmental agency regulating the manufacture, use or sale of pharmaceuticals or biological products, which instructions can also reflect approval by the agency of manufacture, use or sale for animal administration.

The kit may contain any one or more of the components described herein in one or more containers. As an example, in one embodiment, the kit may include instructions for mixing one or more components of the kit and/or isolating and mixing a sample and applying to a subject. The kit may include a container housing agents described herein. The agents may be in the form of a liquid, gel or solid (powder). The agents may be prepared sterilely, packaged in syringe and shipped refrigerated. Alternatively it may be housed in a vial or other container for storage. A second container may have other agents prepared sterilely. Alternatively the kit may include the active agents premixed and shipped in a syringe, vial, tube, or other container. The kit may have one or more or all of the components required to administer the agents to an animal, such as a syringe, topical application devices, or intravenous needle tubing and bag, particularly in the case of the kits for producing specific somatic animal models.

The kit may have a variety of forms, such as a blister pouch, a shrink wrapped pouch, a vacuum sealable pouch, a sealable thermoformed tray, or a similar pouch or tray form, with the accessories loosely packed within the pouch, one or more tubes, containers, a box or a bag. The kit may be sterilized after the accessories are added, thereby allowing the individual accessories in the container to be otherwise unwrapped. The kits can be sterilized using any appropriate sterilization techniques, such as radiation sterilization, heat sterilization, or other sterilization methods known in the art. The kit may also include other components, depending on the specific application, for example, containers, cell media, salts, buffers, reagents, syringes, needles, a fabric, such as gauze, for applying or removing a disinfecting agent, disposable gloves, a support for the agents prior to administration etc.

The instructions included within the kit may involve methods for constructing an AAV vector as described herein. In addition, kits of the disclosure may include, instructions, a negative and/or positive control, containers, diluents and buffers for the sample, sample preparation tubes and a printed or electronic table of reference AAV sequence for sequence comparisons.

EXAMPLE

Example 1

Intravenous administration of Zolgensma in individuals under 2 years of age has shown significant clinical benefits in type 1 SMA infants but an acute elevation in liver transaminases was observed in most patients. Systemic administration of an AAV9-like SMN vector has been observed to induce toxicity in large animals, including dorsal root ganglia (DRG) neurodegeneration and inflammation. Long-term AAV9-mediated SMN overexpression in mouse models has been observed to induce dose-dependent, late-onset motor dysfunction. Altogether, the SMN1 expression beyond physiological levels delivered by AAV may be a safety concern for AAV-based SMA gene therapy.

This example describes engineering of AAV-SMN1 vectors to address potential safety concerns. First, the SMN1 coding sequence (CDS) has been codon-optimized to maximize SMN1 expression in order to reduce vector doses delivered to patients. Second, an endogenous SMN1 promoter was used to drive AAV-based SMN1 expression in patients for an increased safety profile. FIG. 1 shows a schematic representation of SMN1-encoding vectors of the disclosure. "scAAV-CB6-opt-SMN1" is a self-complementary AAV (scAAV) vector with a CB6 promoter and a codon-optimized SMN1 coding sequence. "SMNp-SMN1" is a single-stranded AAV genome with a 2.0 kb endogenous human SMN1 promoter and a codon-optimized SMN1 coding sequence (CDS). "ssAAV-opt-SMN1(MBL)" is a single-stranded AAV genome with a 2.0 kb endogenous human SMN1 promoter, a synthetic MBL intron, and a codon-optimized SMN1 coding sequence (CDS). "SMNsp-SMN1" is a self-complementary AAV vector with a 0.9 kb endogenous human SMN1 promoter and a codon-optimized SMN1 CDS. "Zolgensma" is a self-complementary AAV vector with a CMV enhancer/chicken beta-actin promoter and a wild-type human SMN1 CDS.

Figure 2A:
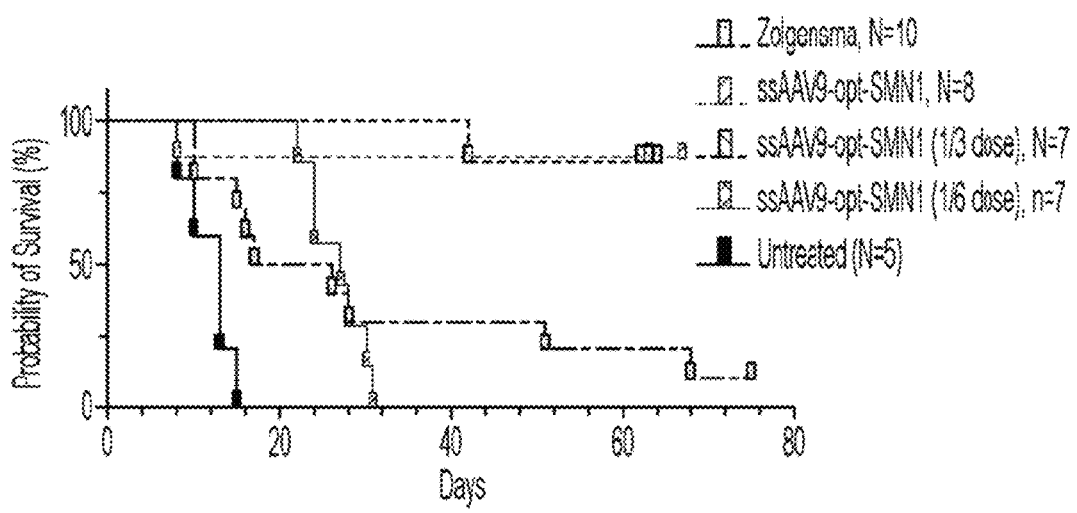
FIGS. 2A-2F show representative data for ssAAV9.opt-SMN1 and Zolgensma in SMNΔ7 mice.
Figure 2B:
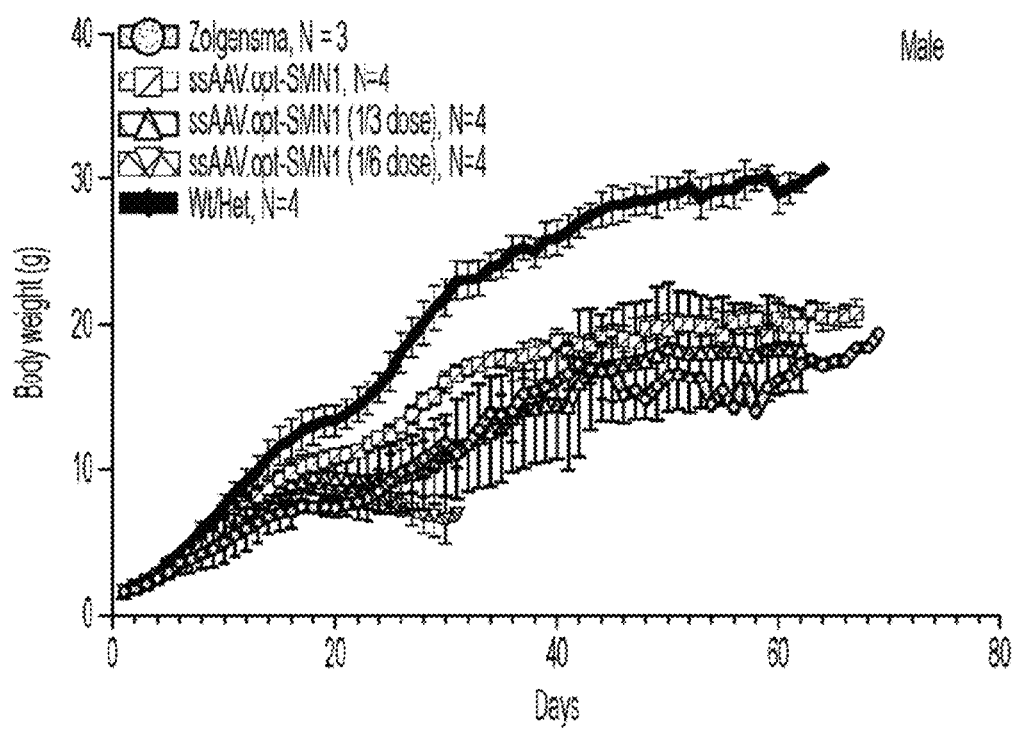
Figure 2C:
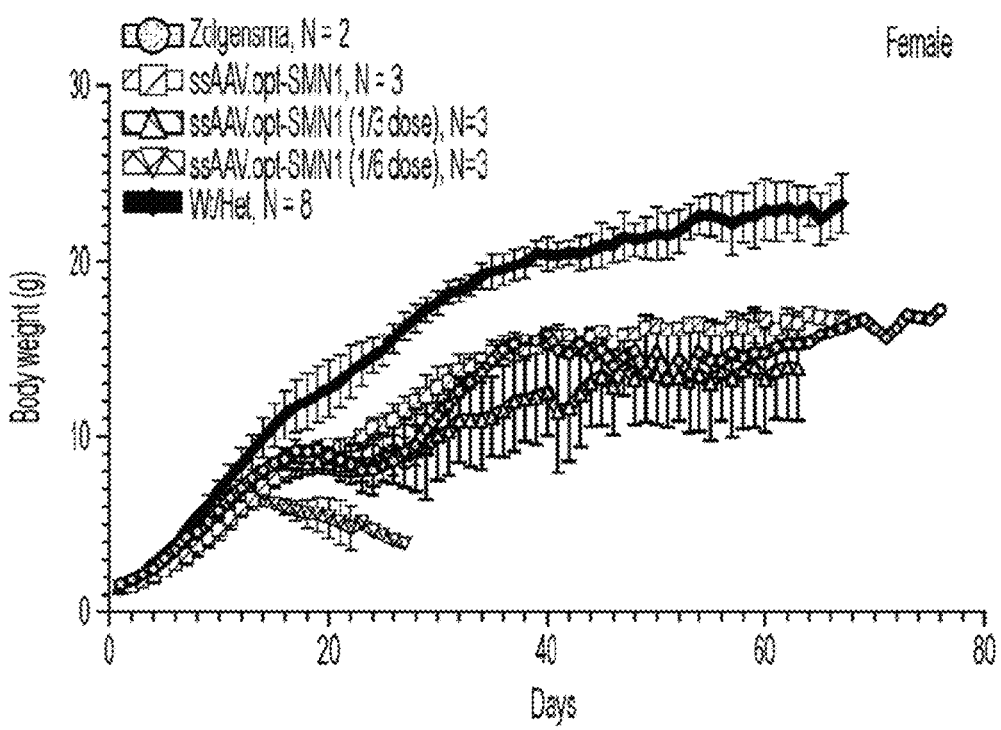
Figure 2D:
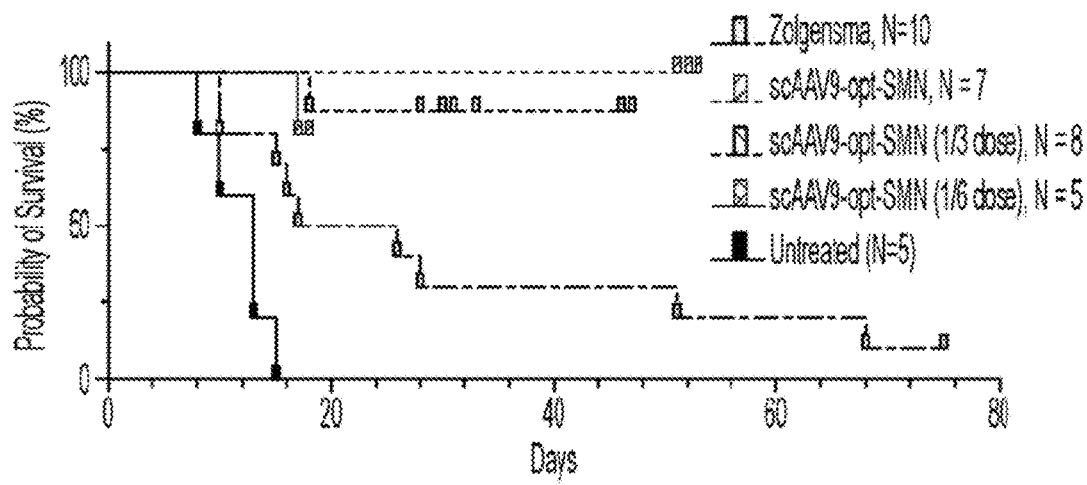
Figure 2E:
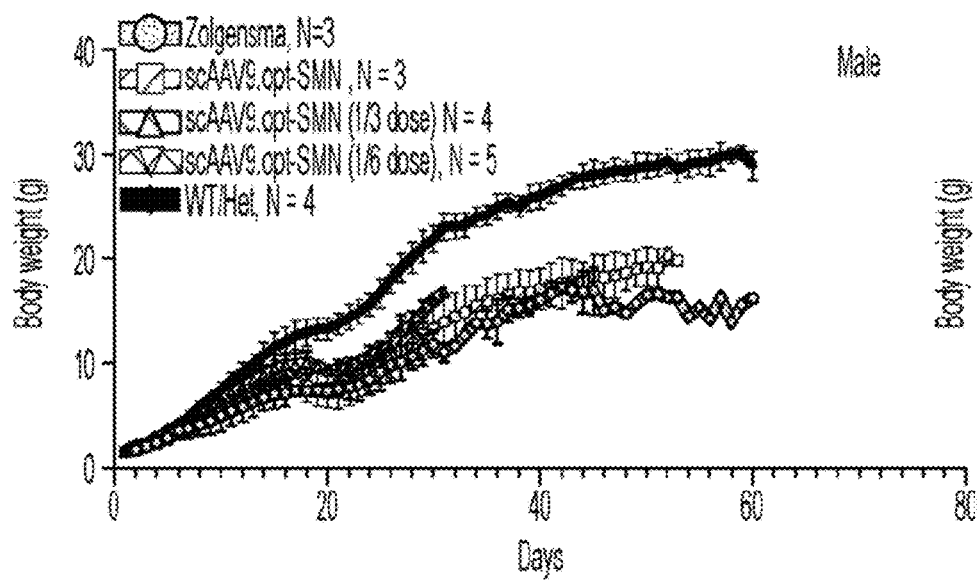
Figure 2F:
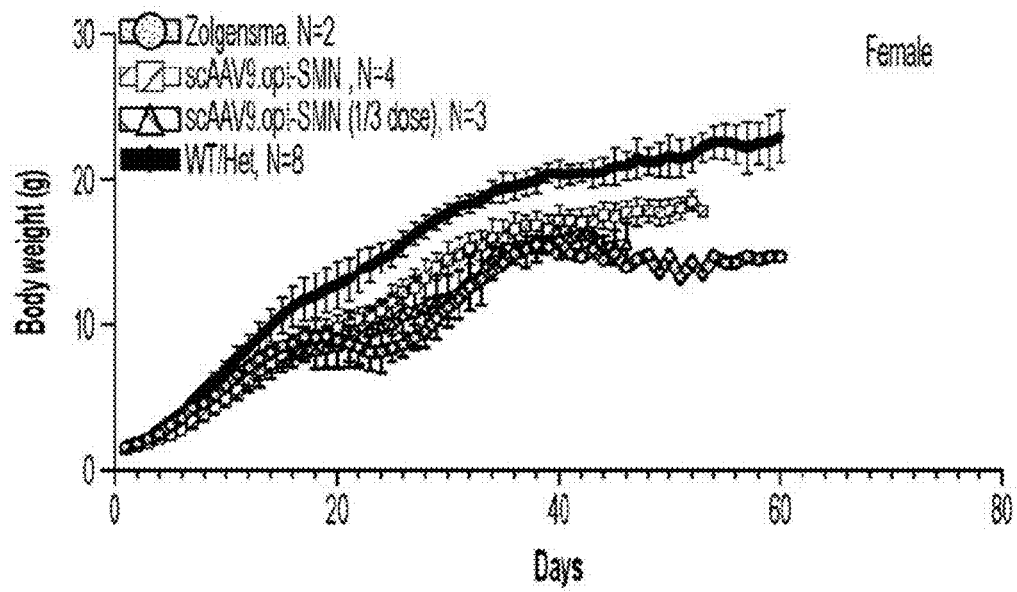

Expression of SMN1-encoding rAAV vectors was investigated in vivo. FIGS. 2A-2F show representative data for ssAAV9.opt-SMN1 and Zolgensma in SMNΔ7 mice. FIG. 2A shows a survival curve of SMNΔ7 mice treated with Zolgensma (2×E14 genome copies (GCs)/kg) or SMNp-SMN1 rAAV at three doses (2×E14 genome copies (GCs)/kg; 6.8×E13 GCs/kg, or 3.4×E13 GCs/kg); ssAAV9.opt-SMN1 treated at the same or ⅓ doses have better survival than mice treated with Zolgensma. FIGS. 2B and 2C show representative data indicating that ssAAV9.opt-SMN1 treated mice show similar body weight gain compared to Zolgensma treated mice. FIG. 2D shows a survival curve for scAAV9.opt-SMN1 and Zolgensma in SMNΔ7 mice; scAAV9.opt-SMN1 treated at the same or ⅓ doses have better survival than mice treated with Zolgensma. FIGS. 2E and 2F show representative data indicating that ssAAV9.opt-SMN1 treated mice show similar body weight gain compared to Zolgensma treated mice.

Figure 3A:
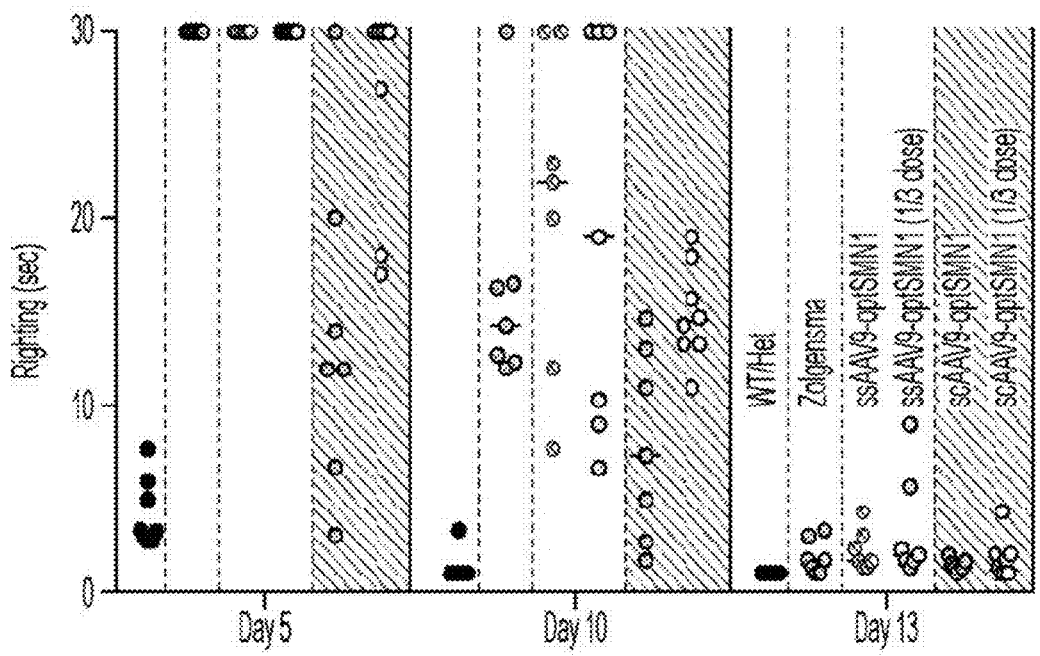
FIGS. 3A-3B show representative behavioral assay data for SMNΔ7 mice treated with scAAV9.opt-SMN1.
Figure 3B:
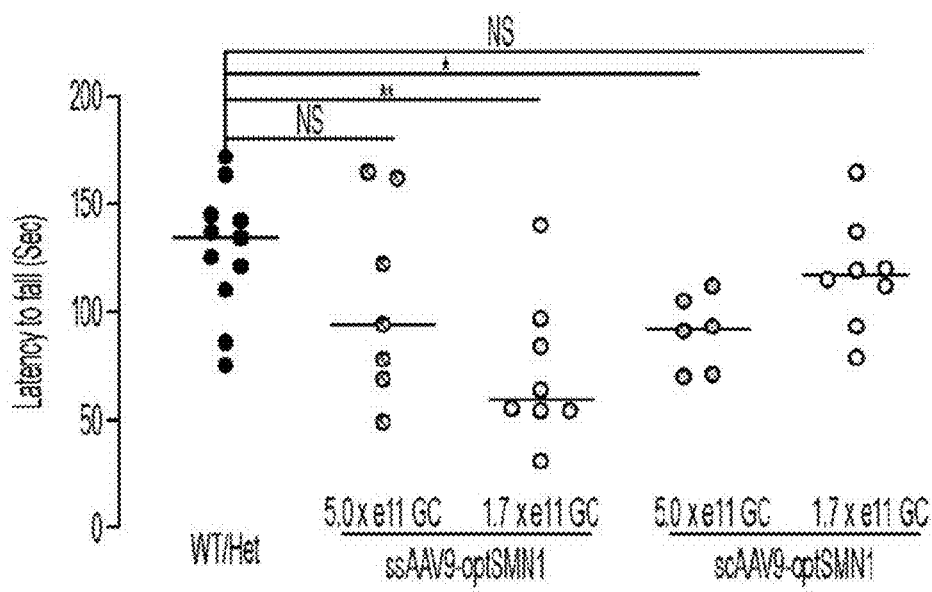

FIGS. 3A-3B show representative behavioral assay data for SMNΔ7 mice treated with scAAV9.opt-SMN1. FIG. 3A shows scAAV9.opt-SMN1 treated animals can right themselves from day 5 post-administration. FIG. 3B shows representative data indicating that all treated animals have functional muscle, as measured by rotarod test.

Figure 4A:
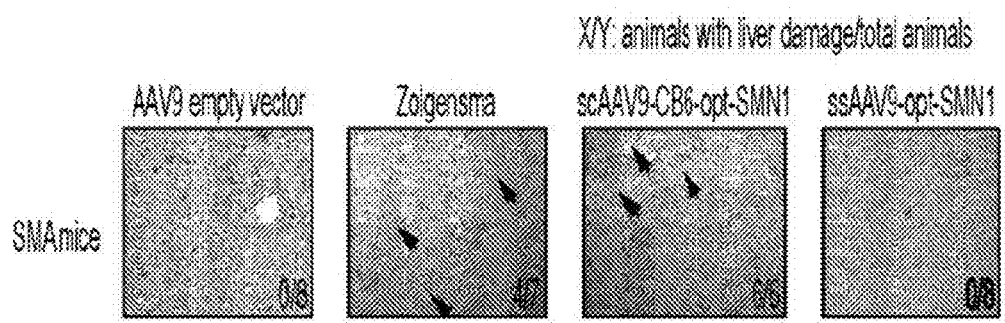
FIGS. 4A-4B show representative toxicology data.
Figure 4B:
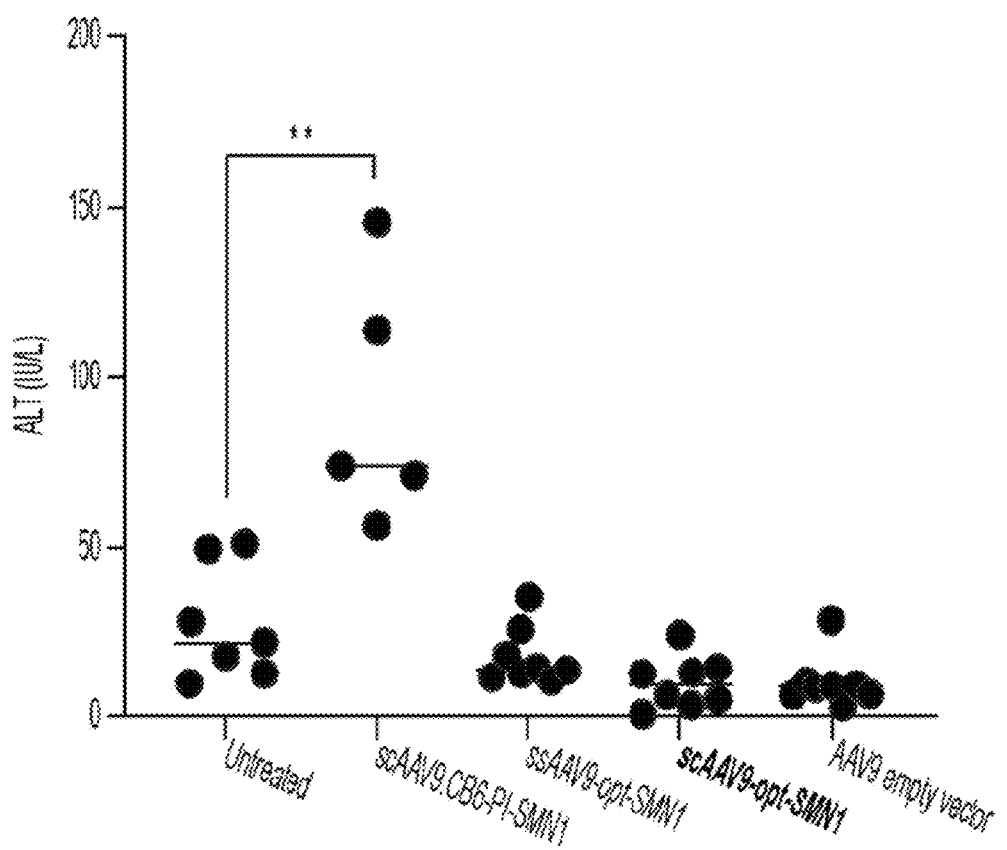

FIGS. 4A-4B show representative toxicology data. FIG. 4A shows histological data indicating that high levels of SMN1 overexpression are toxic to liver cells. Briefly, 5E+11 GC/mouse of AAV vectors were injected into animals at P0 via facial vein. Liver was collected at day 8 post injection. Liver damage was observed in AAVsc-CB6-PI-SMN1 (6/6 animals), and Zolgensma (4/7 animals) vector treated groups but not control empty AAV9 (0/8 animals) or ssAAV9-opt-SMN1 (0/8) vector treated groups. FIG. 4B shows representative alanine aminotransferase (ALT) assay test results.

Figure 5:
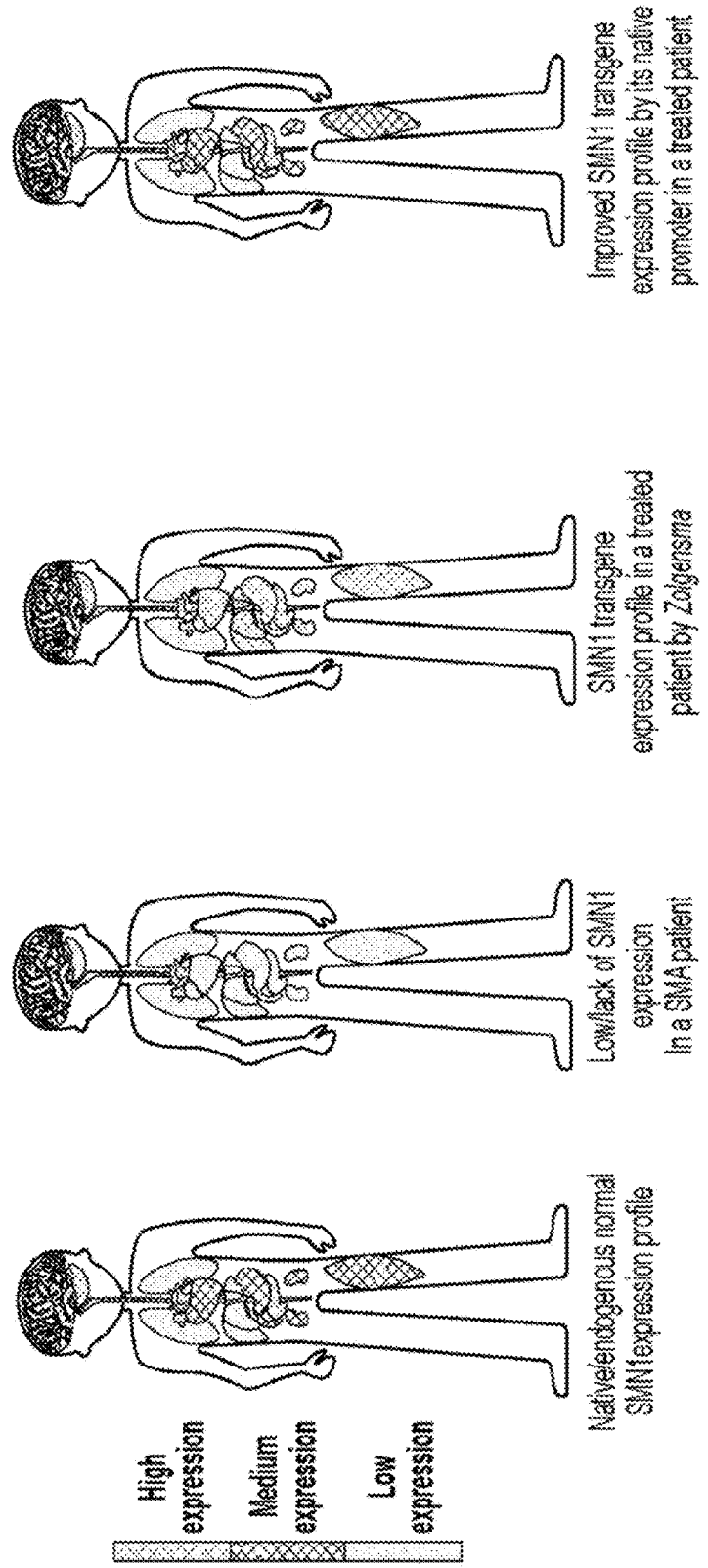
FIG. 5 shows a schematic indicating proposed expression levels for SMN1-encoding vectors.

FIG. 5 shows a schematic indicating proposed expression levels for SMN1-encoding vectors. Briefly, SMN1-encoding vectors described by the disclose allow for high levels of expression of SMN1 in central nervous system (CNS) tissue without overexpression in muscle or other non-target organs, which may cause hepatotoxicity in a subject.

Figure 6A:
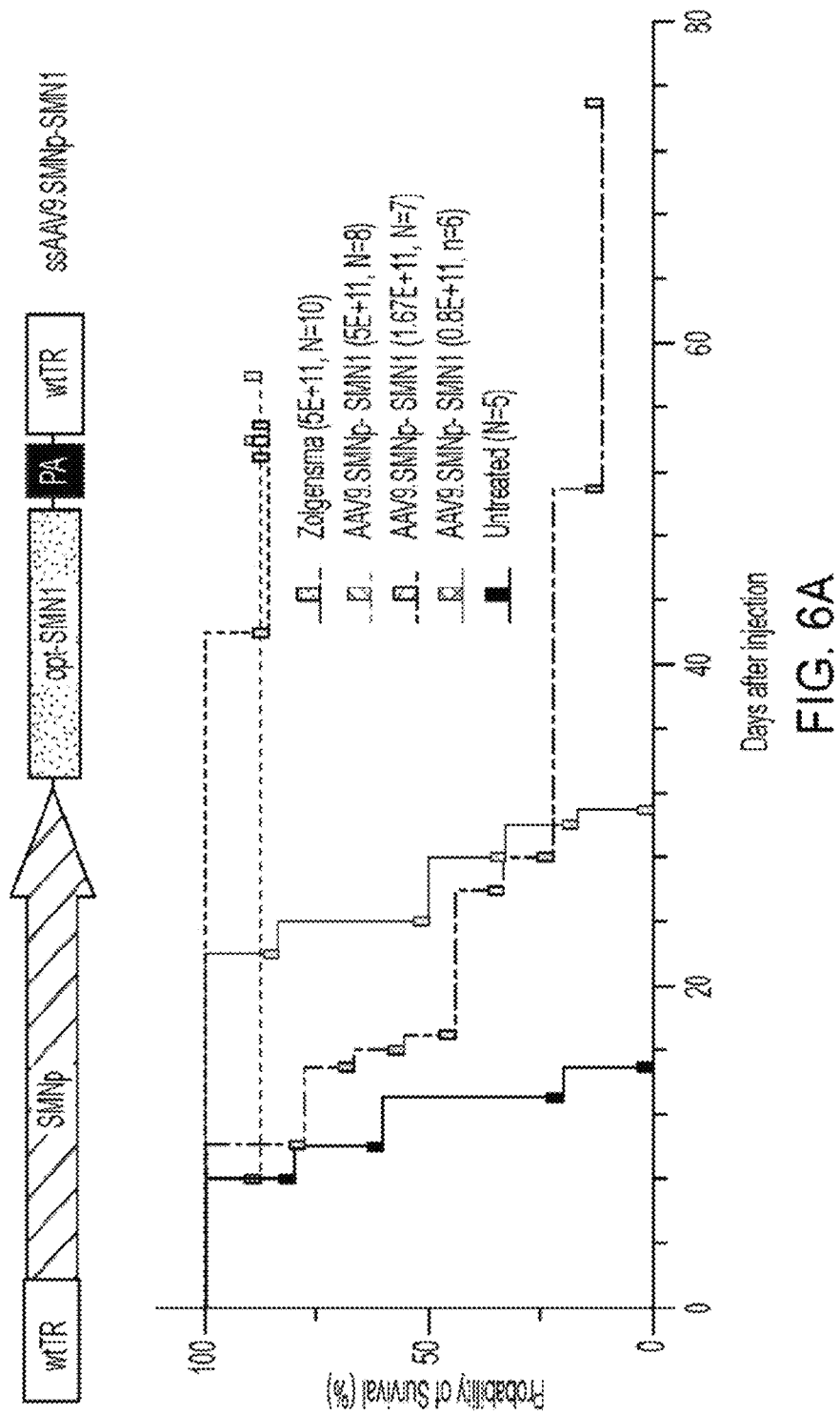
FIGS. 6A-6D show representative data for SMNΔ7 mice treated with Zolgensma, SMNp-SMN1 rAAV, or SMNsp-SMN1 rAAV.
Figure 6B:
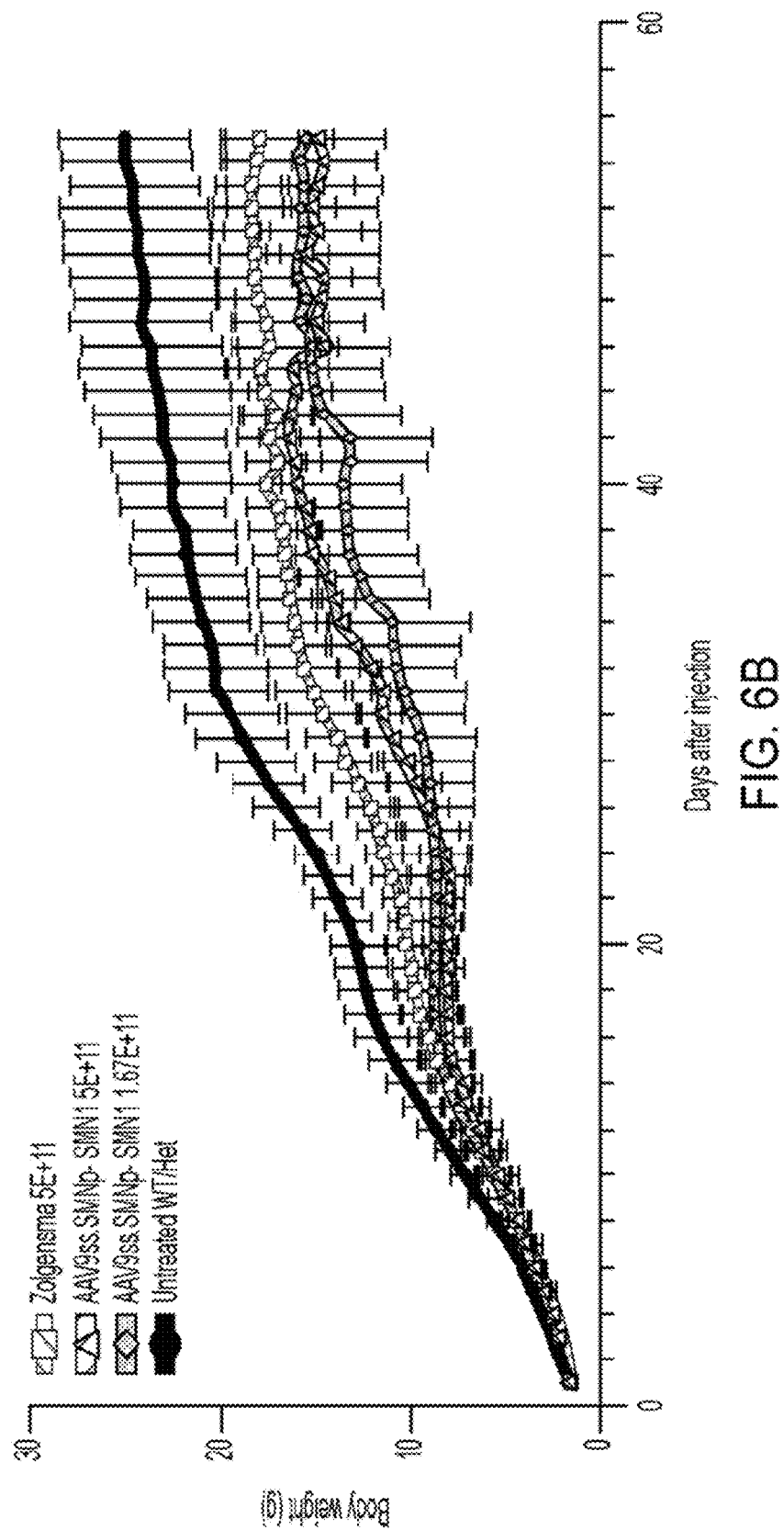
Figure 6C:
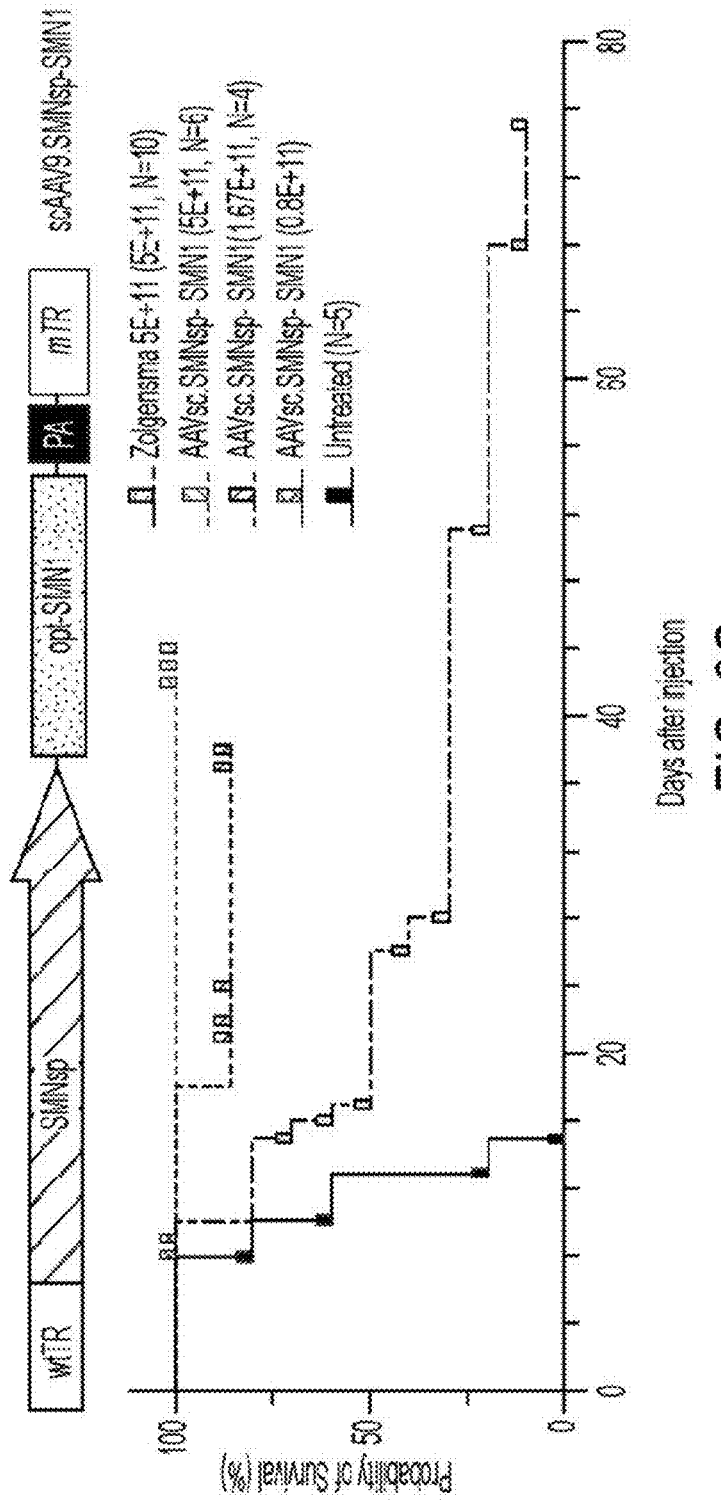
Figure 6D:
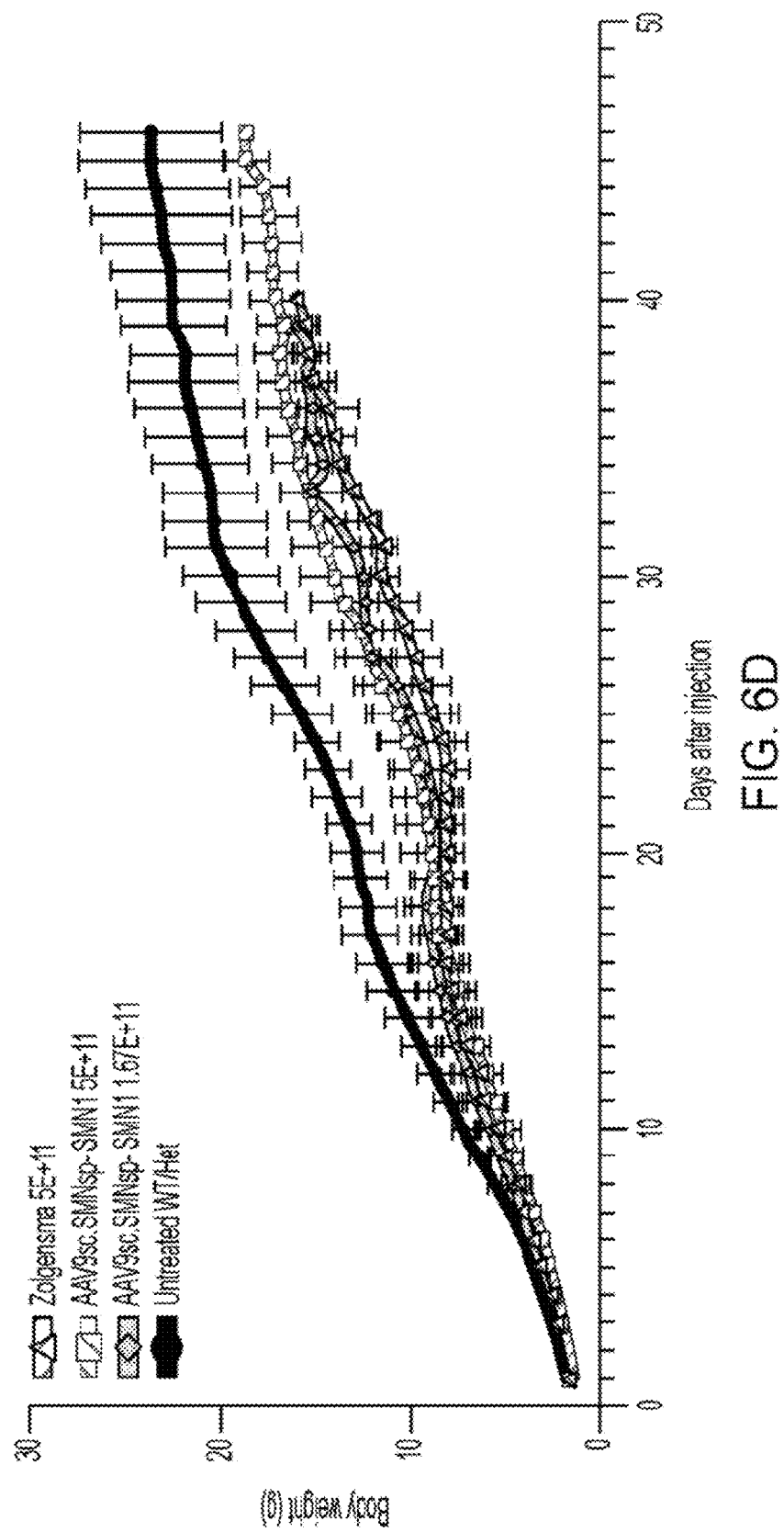

Th three improved SMN1-encoding rAAV vectors described in FIG. 1 were packaged into AAV9 capsids. The rAAVs were then injected into SMNΔ7 mice at P1, and the mice were monitored for body weight and survival. Both of the engineered AAV-SMN1 vectors (e.g., SMNp-SMN1 and SMNsp-SMN1) outperform Zolgensma in survival. A one third-dose (relative to Zolgensma) of the engineered vectors (e.g., 1.67×E11 genome copies (GC) per mouse) was observed to extend the lifespan more efficiently than Zolgensma at 5×E11 GC/per mouse (FIGS. 6A and 6C). FIG. 6B shows that SMNΔ7 mice treated with 5×E11 GC of SMNp-SMN1 gained more weight than mice treated with Zolgensma after day 17, and the dose of 1.67×E11 GC of SMNp-SMN1 achieved similar weight at day 55 compared to the Zolgensma group. The SMNsp-SMN1 vector treated mice at two different doses (5×E11 GC and 1.67×E11 GC) also showed growth superiority from ~day 23 compared to the Zolgensma group at the dose of 5×E11 GC (FIG. 6D).

Example 2

Figure 7A:
FIGS. 7A-7D show that rAAV9sc-CMVen/CB-co-hSMN1 induced liver toxicity due to overexpression of hSMN1 in the liver.
Figure 7B:
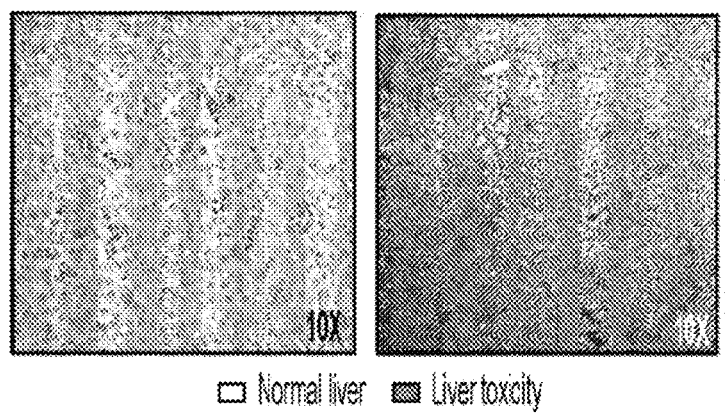
Figure 7C:
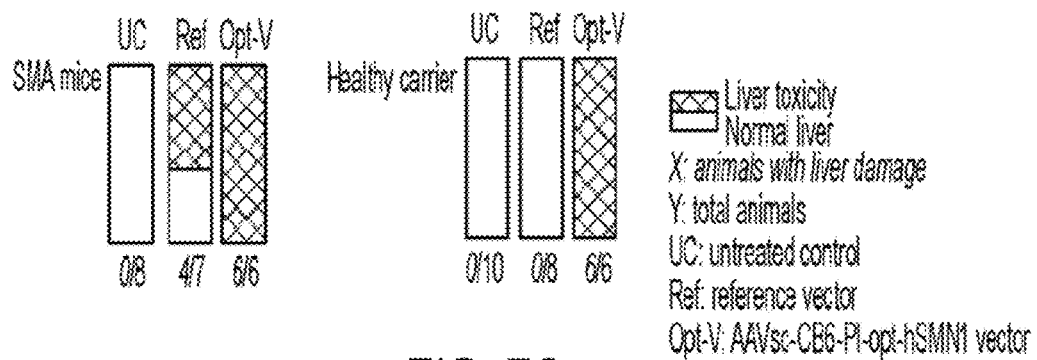
Figure 7D:
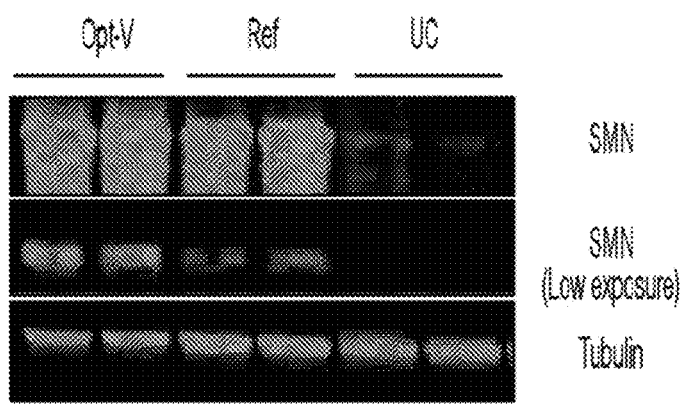

To test whether an AAV vector with codon optimized sequence of hSMN1 (co-hSMN1) under CMVen/CB promoter (CMVen/CB-co-hSMN1; SEQ ID NO: 8) would induce liver toxicity, the AAV vector was packaged into AAV9 capsid (rAAV9sc-CMVen/CB-co-hSMN1) and the rAAV was administered to postnatal day 1 SMNdelta7 mice at 3.3×10e14 GCs/kg by facial vein injection. All treated animals (n=6) died earlier than the untreated SMA mice. Yellowing skin and hepatocyte damage was found in vector treated animals at day 8 post injection (FIGS. 7A-7C). SMN1 overexpression was confirmed in the liver (FIG. 7D).

Figure 8A:
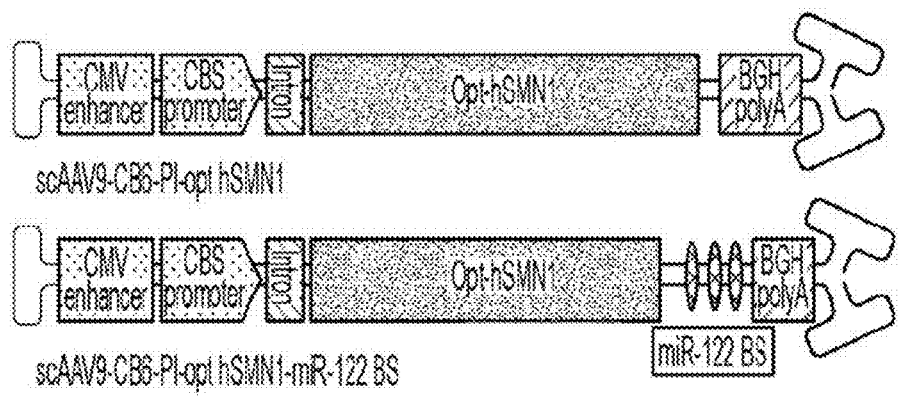
FIGS. 8A-8C show that incorporating miR-122 binding site to CMVen/CB-co-hSMN vector abrogated SMN1 expression in the liver, thereby reducing liver toxicity.
Figure 8B:
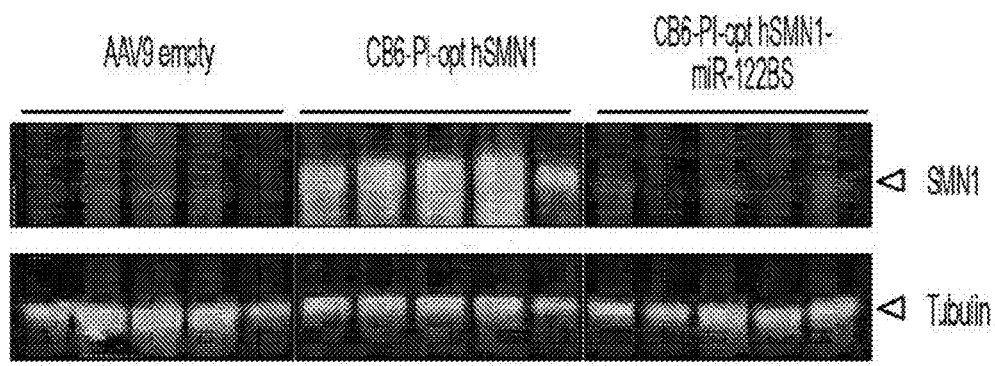
Figure 8C:
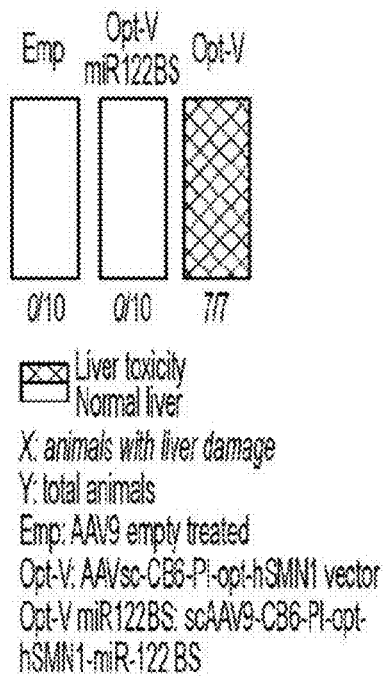

Further, whether abrogation of SMN expression in liver would alleviate liver damage was tested. In order to de-target the rAAV from the liver, miR-122 binding site was engineered into CMVen/CB-co-hSMN1 (CB6-PI-opt hSMN1-miR-122 BS; SEQ ID NO: 9) and packaged into AAV9 capsid (scAAV9-CB6-PI-opt hSMN1-miR-122 BS) (FIG. 8A). rAAV9sc-CMVen/CB-co-hSMN1 and scAAV9-CB6-PI-opt hSMN1-miR-122 BS were injected to postnatal day 1 SMNdelta7 mice, respectively. Liver expression of SMN1 and liver toxicity was evaluated. The results showed that, by using miR-122 binding site in the AAV construct, the expression of SMN was abrogated from the liver (FIG. 8B), and no liver toxicity was observed in mice treated with scAAV9-CB6-PI-opt hSMN1-miR-122 BS (FIG. 8C).

Figure 9A:
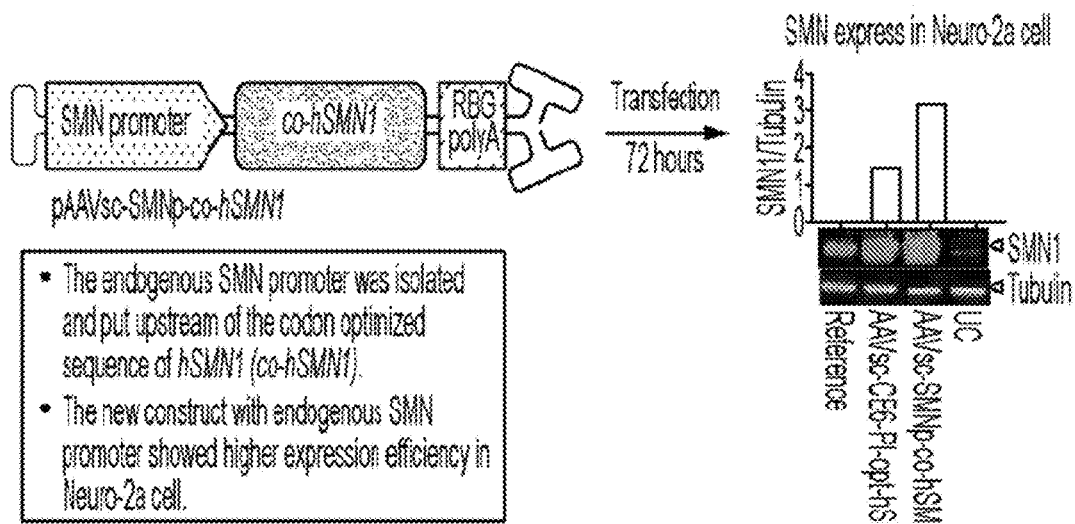
FIGS. 9A-9L show that the $2^{nd}$ generation AAV (AAVsc-SMNp-co-hSMN1) resulted in improved therapeutic outcome in a SMA animal model.

Further, it is possible that restoration of physiological levels of hSMN1 expression in the appropriate cell types with a low effective dose of rAAV can reduce liver toxicity. In order to achieve physiologically regulated hSMN1 expression, a second generation (2nd gen) scAAV9 expressing co-hSMN1 from an endogenous short hSMN1 promoter (SEQ ID NO: 5) was designed (SMN1sp-co-SMN1 (referred to as SMN1p-co-SMN1 in FIGS. 9D, 9E, and 9J); SEQ ID NO: 7). An scAAV9-CMVen/CB-opt-hSMN1 was used as a positive control. Neuro-2a cells were transfected with SMN1p-co-SMN1 or CMVen/CB-opt-hSMN1, and SMN1 expression was evaluated. The results show that the $2^{nd}$ generation construct with the endogenous SMN promoter showed higher expression efficiency in Neuro-2a cell (FIG. 9A).

Figure 9B:
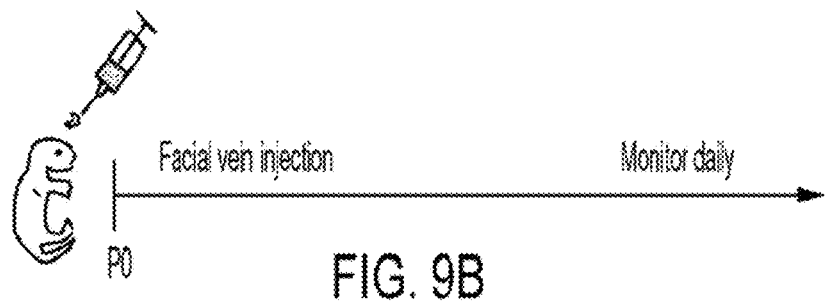
Figure 9C:
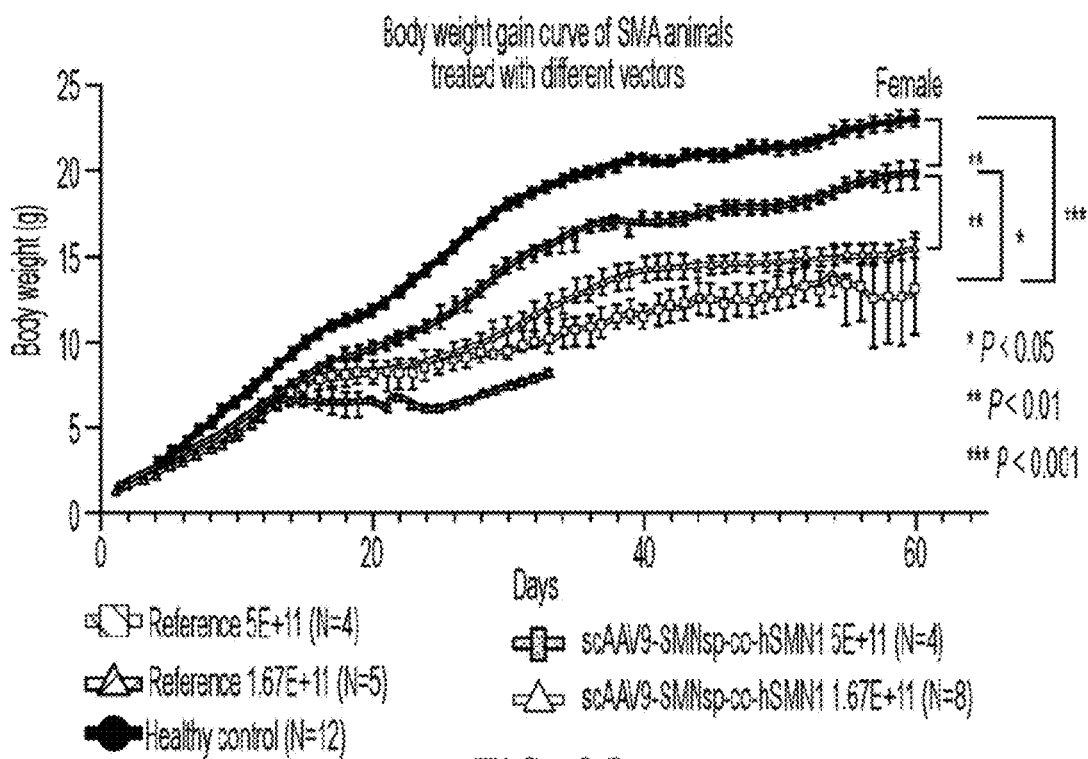
Figure 9D:
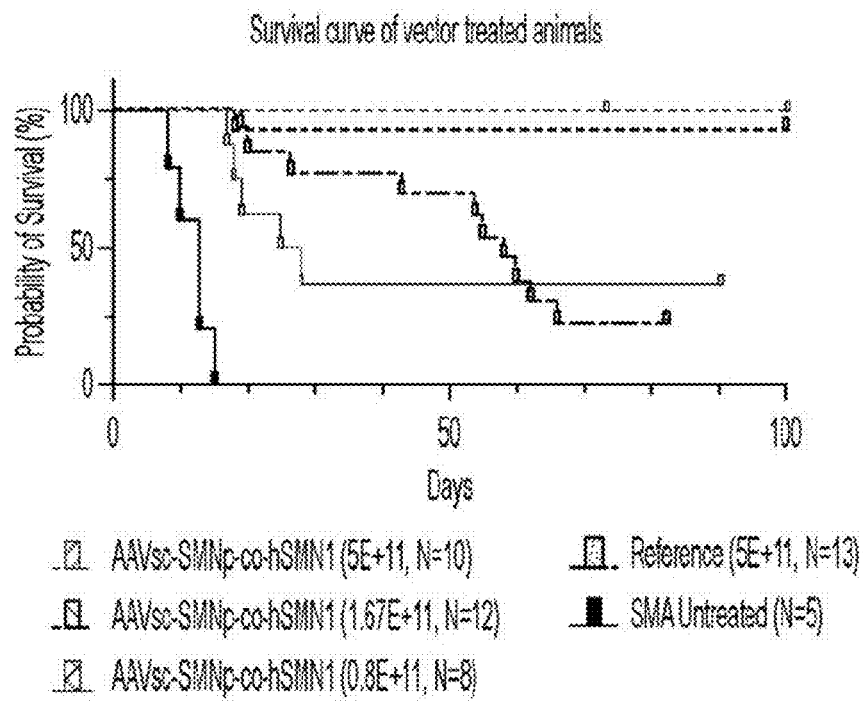
Figure 9E:
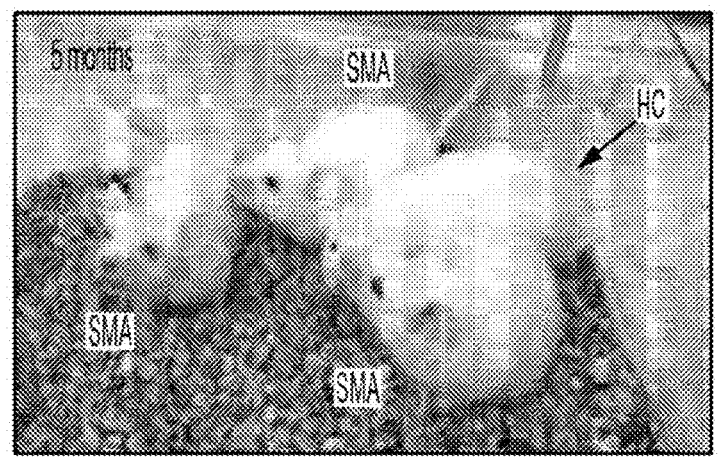
Figure 9F:
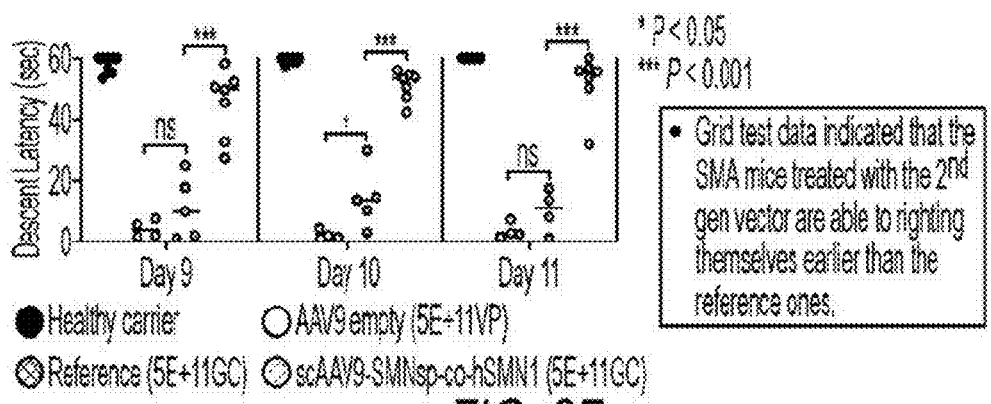
Figure 9G:
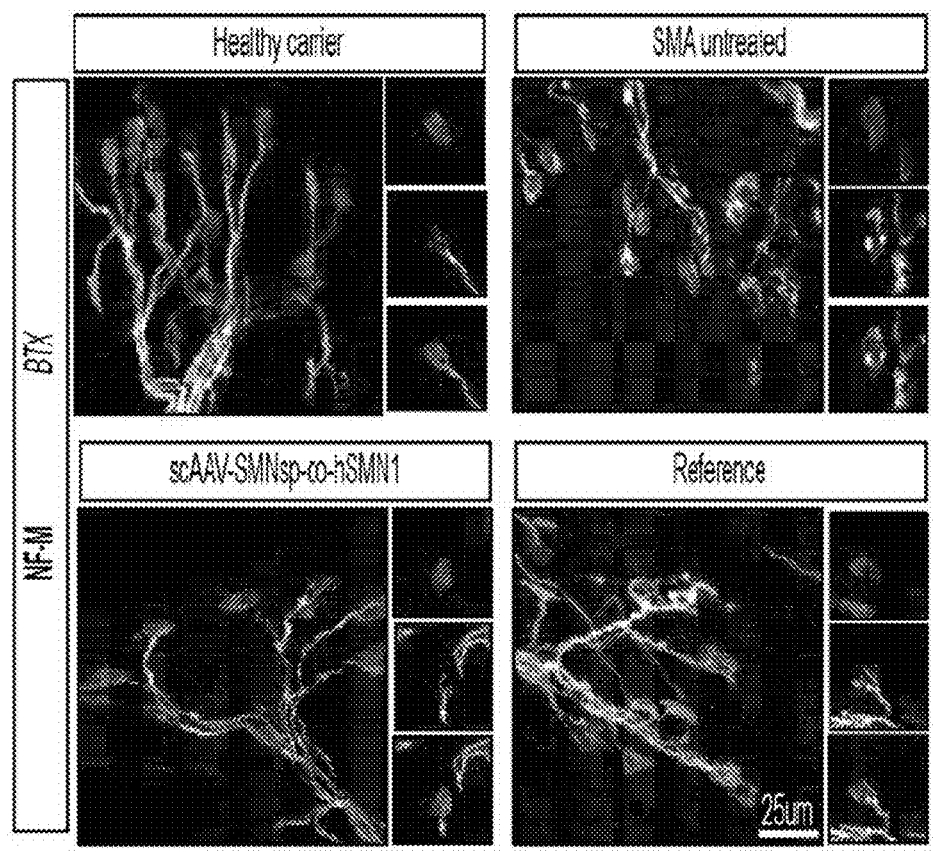
Figure 9H:
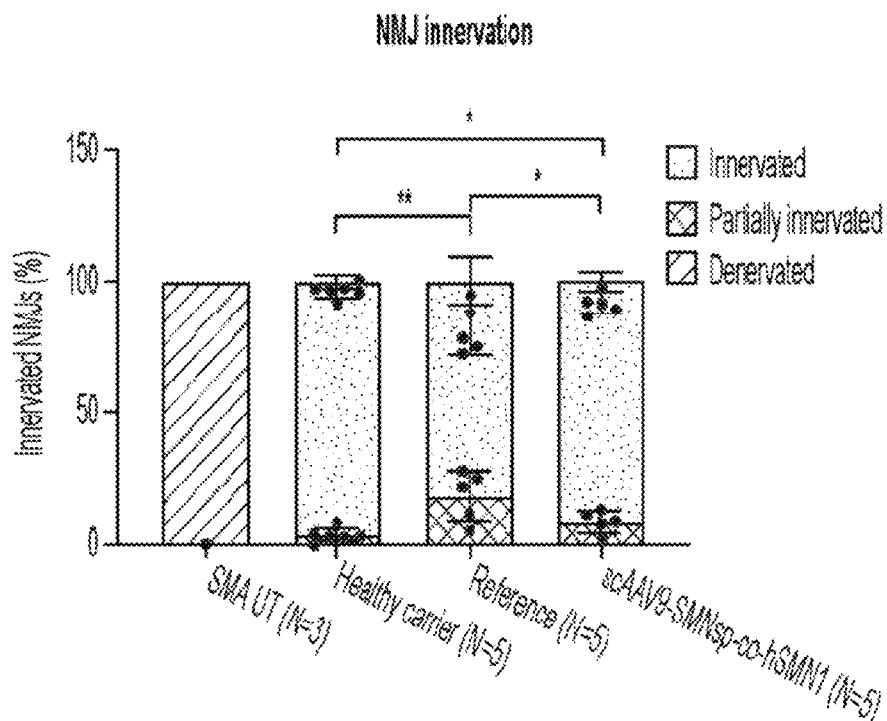

Next, SMN1p-co-hSMN1 (SEQ ID NO: 7) was packaged into AAV9 capsid (scAAV9-SMNp-co-hSMN1) and injected neonatal SMA mice via facial vein injection (FIG. 9B). Another group of SMA mice with scAAV9-CMVen/CB-hSMN1 harboring the same expression cassette as used in Zolgensma® as the reference vector. The AAVsc-SMNsp-co-hSMN1 vector or the reference vector were injected into SMA mice via facial vein at P0 to set up a side-by-side animal experiment. Mice were monitored daily for body weight (FIG. 9C) and survival rate (FIG. 9D). The mice treated with AAVsc-SMNsp-co-hSMN1 gained more body weight than the reference vector group. The administration with AAVsc-SMNsp-co-hSMN1 vector significantly improved the life span of the SMA mice. The AAVsc-SMNsp-co-hSMN1 treated animal were healthy at 5 months old (FIG. 9E). Muscle function of the mice were also assessed. The treatment with AAVsc-SMNsp-co-hSMN1 achieved better restoration of the muscle functions than the reference group. Grid test data indicated that the SMA mice treated with AAVsc-SMNsp-co-hSMN1 were able to righting themselves earlier than the reference ones (FIG. 9F). Effect of treatment at P0 on neuromuscular junction (NMJ) of young (P12) animals was also evaluated. Representative images from transverse abdominis (TVA) shows the treatment effect on the restoration of innervation in NMJs (FIG. 9G). The structures of neuromuscular junctions in the AAVsc-SMNsp-co-hSMN1-treated mice were restored close to that of wild-type mice, better than those of reference-treated SMA mice (FIG. 9H).

Figure 9I:
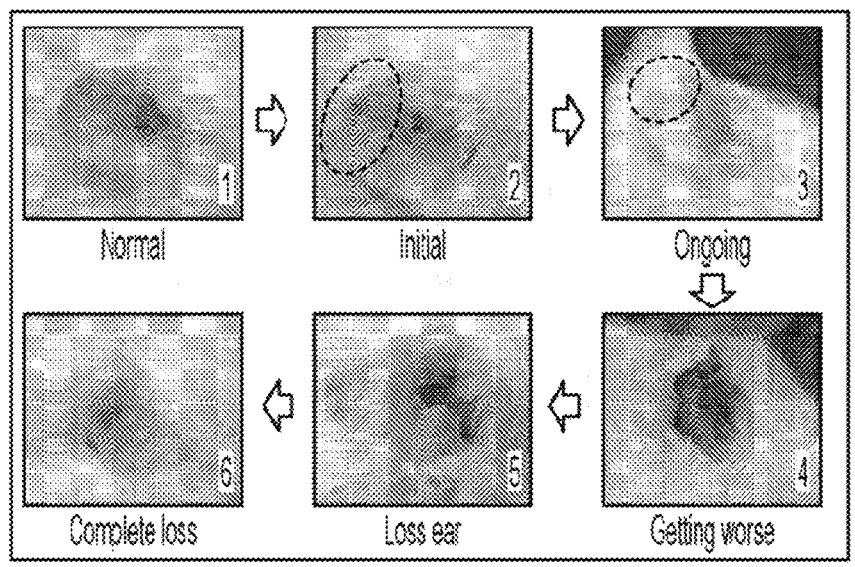
Figure 9J:
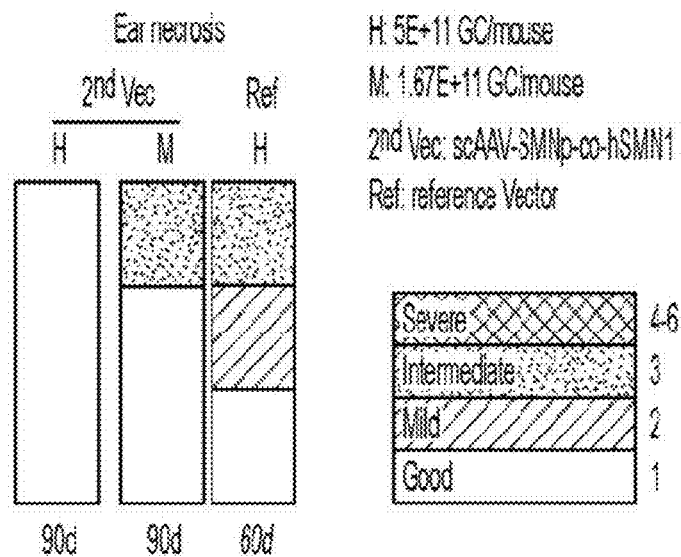

Moreover, the treatment with AAVsc-SMNsp-co-hSMN1 alleviated complication in SMA mice. Ear necrosis is one of complication usually found in this animal model. The severity of this complication was categorized into deferent disease levels (FIG. 9I). The AAVsc-SMNsp-co-hSMN1 treated animals showed less severity than the reference ones (FIG. 9J). The older of the animals the severer of the symptom. Data was collected from 90 days for the AAVsc-SMNp-co-hSMN1 treated animals, and 60 days for the reference treated animals.

Figure 9K:
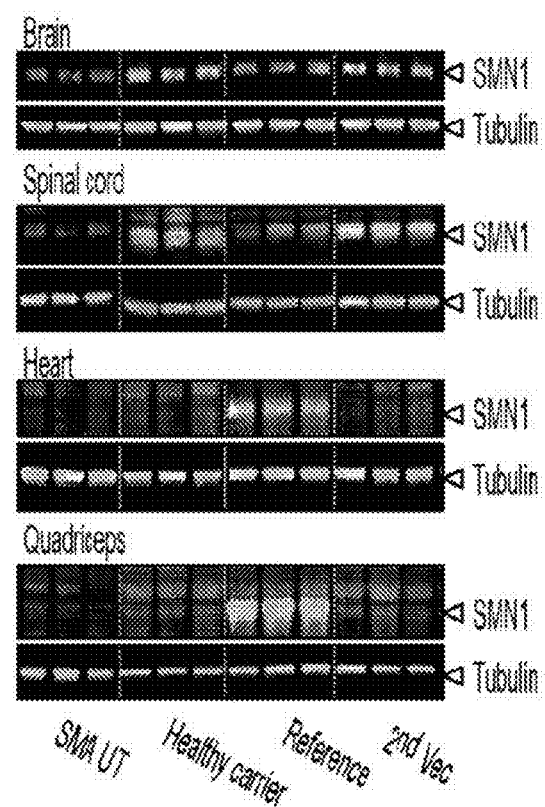
Figure 9L:
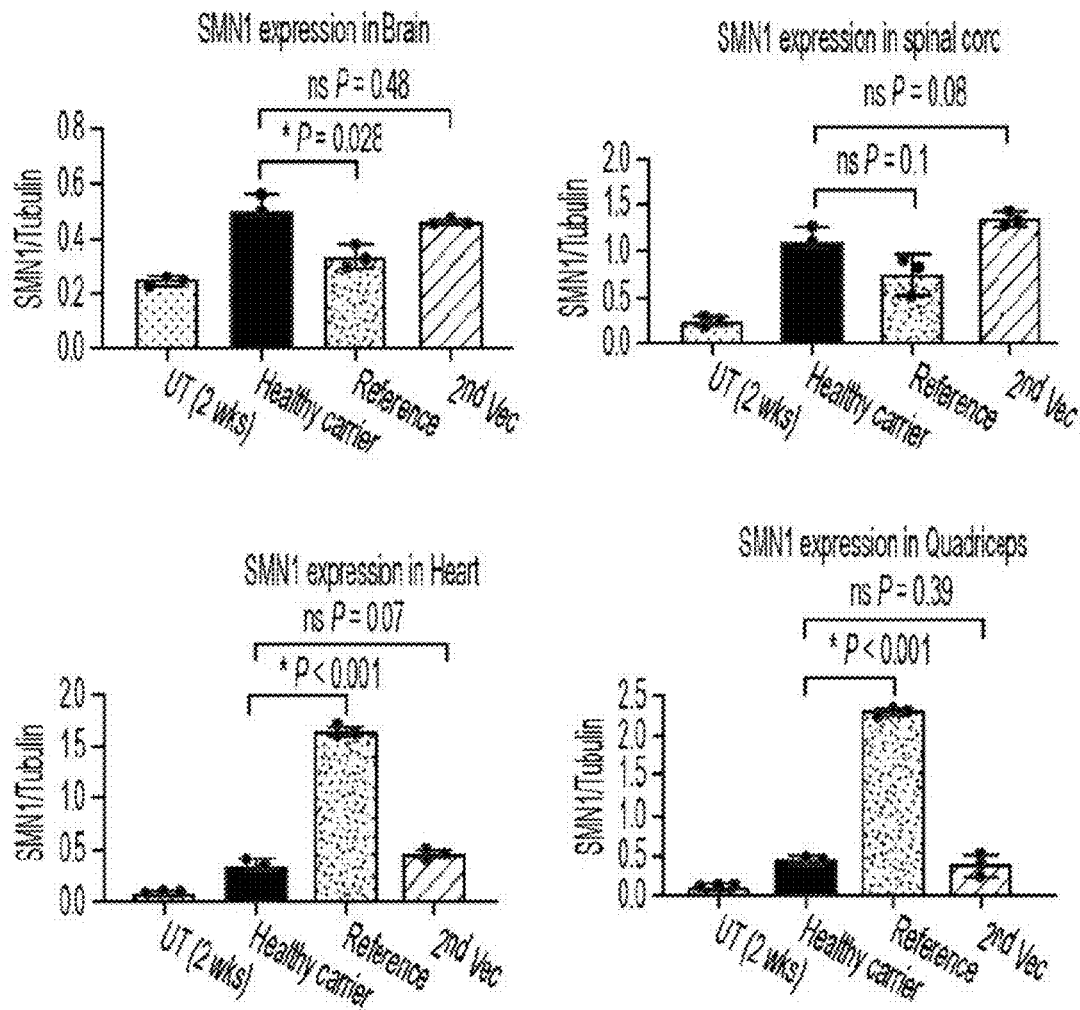

The administration of AAVsc-SMNsp-co-hSMN1 in SMA mice achieved similar organ/tissue expression pattern with healthy carrier animals. Immunoblot assay indicated that the AAVsc-SMNp-co-hSMN1 preferentially express in central nervous system other than peripheral tissues. The expression pattern of this vector is close to the nature distribution of SMN as in healthy control animals. (FIGS. 9K-9L).

Figure 10:
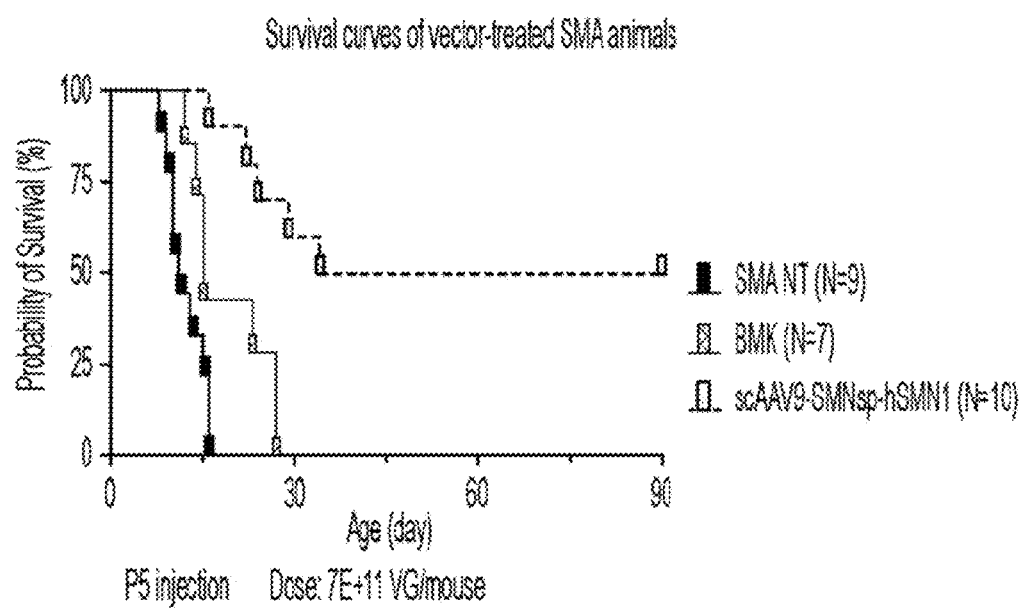
FIG. 10 shows a representative survival curve of SMA mice either not treated (NT), treated with a benchmark vector (BMK), or treated with scAAV9-SMNsp-hSMN1; scAAV9-SMNsp-hSMN1 treated have better survival than untreated mice, or mice treated with BMK.

Further, SMA mice received AAVsc-SMNsp-co-hSMN1 or benchmark rAAV (BMK) at P5 were monitored for survival. The administration with scAAV9-SMNsp-hSMN1 (7E+11 VG/mouse) vector resulted in 50% survival of SMA mice up to 90 days post injection, whereas none of the SMA mice received the benchmark rAAV survived passed 30 days after injection (FIG. 10).

```
REPRESENTATIVE SEQUENCES
>Codon-optimized human SMN1 nucleic acid
sequence
                                  (SEQ ID NO: 1)
ATGGCCATGAGCAGCGGCGGCAGTGGCGGCGGCGTGCCCGAGCAG

GAGGATTCTGTGCTGTTCCGGAGAGGAACAGGCCAGAGCGATGAC

TCCGATATCTGGGACGACACAGCCCTTATCAAGGCCTACGACAAG

GCCGTGGCCAGCTTTAAGCACGCCCTGAAGAATGGCGATATCTGC

GAGACAAGCGGAAAGCCTAAGACCACCCCTAAAAGAAAGCCCGCC

AAGAAAAACAAGTCCCAGAAAAAAAACACCGCCGCTAGCCTGCAG

CAGTGGAAGGTGGGCGACAAATGCAGCGCCATCTGGTCCGAGGAC

GGCTGCATCTACCCTGCTACCATCGCCAGCATCGACTTCAAGCGG

GAAACCTGCGTGGTGGTCTACACAGGCTATGGCAATAGGGAGGAA

CAAAATCTCTCTGATCTGCTGTCTCCTATTTGTGAAGTGGCTAAC

AACATCGAGCAGAACGCCCAGGAAAATGAGAACGAAAGCCAAGTG

TCCACCGACGAGAGCGAGAACAGCAGAAGCCCTGGAAACAAGTCT

GACAACATCAAGCCCAAGTCTGCCCCTTGGAACAGCTTCCTGCCC

CCTCCTCCTCCAATGCCTGGCCCCAGACTGGGCCCCGGCAAGCCT

GGCCTGAAGTTCAACGGCCCTCCTCCACCCCCTCCTCCTCCACCT

CCCCATCTGCTGAGCTGCTGGCTGCCTCCTTTTCCCAGCGGCCCC

CCTATCATCCCCCCACCACCTCCTATCTGTCCCGACAGCCTGGAC

GACGCCGATGCTCTGGGATCCATGCTGATCAGCTGGTACATGTCT

GGCTACCACACCGGCTACTACATGGGCTTCCGGCAGAACCAGAAG

GAAGGAAGATGCAGCCACAGCCTGAACTGA
>Wild-type SMN1 nucleic acid sequence
                                  (SEQ ID NO: 2)
ATGGCGATGAGCAGCGGCGGCAGTGGTGGCGGCGTCCCGGAGCAG

GAGGATTCCGTGCTGTTCCGGCGCGGCACAGGCCAGAGCGATGAT

TCTGACATTTGGGATGATACAGCACTGATAAAAGCATATGATAAA

GCTGTGGCTTCATTTAAGCATGCTCTAAAGAATGGTGACATTTGT

GAAACTTCGGGTAAACCAAAAACCACACCTAAAAGAAAACCTGCT

AAGAAGAATAAAAGCCAAAAGAAGAATACTGCAGCTTCCTTACAA

CAGTGGAAAGTTGGGGACAAATGTTCTGCCATTTGGTCAGAAGAC

GGTTGCATTTACCCAGCTACCATTGCTTCAATTGATTTTAAGAGA

GAAACCTGTGTTGTGGTTTACACTGGATATGGAAATAGAGAGGAG

CAAAATCTGTCCGATCTACTTTCCCCAATCTGTGAAGTAGCTAAT

AATATAGAACAGAATGCTCAAGAGAATGAAAATGAAAGCCAAGTT

TCAACAGATGAAAGTGAGAACTCCAGGTCTCCTGGAAATAAATCA

GATAACATCAAGCCCAAATCTGCTCCATGGAACTCTTTTCTCCCT

CCACCACCCCCCATGCCAGGGCCAAGACTGGGACCAGGAAAGCCA

GGTCTAAAATTCAATGGCCCACCACCGCCACCGCCACCACCACCA

CCCCACTTACTATCATGCTGGCTGCCTCCATTTCCTTCTGGACCA

CCAATAATTCCCCCACCACCTCCCATATGTCCAGATTCTCTTGAT

GATGCTGATGCTTTGGGAAGTATGTTAATTTCATGGTACATGAGT

GGCTATCATACTGGCTATTATATGGGTTTTAGACAAAATCAAAAA

GAAGGAAGGTGCTCACATTCCTTAAATTAA
>SMN1 amino acid sequence
                                  (SEQ ID NO: 3)
MAMSSGGSGGGVPEQEDSVLFRRGTGQSDDSDIWDDTALIKAYDK

AVASFKHALKNGDICETSGKPKTTPKRKPAKKNKSQKKNTAASLQ

QWKVGDKCSAIWSEDGCIYPATIASIDFKRETCVVVYTGYGNREE

QNLSDLLSPICEVANNIEQNAQENENESQVSTDESENSRSPGNKS

DNIKPKSAPWNSFLPPPPPMPGPRLGPGKPGLKFNGPPPPPPPPP

PHLLSCWLPPFPSGPPIIPPPPPICPDSLDDADALGSMLISWYMS

GYHTGYYMGFRQNQKEGRCSHSLN
>SMN1 long promoter nucleic acid sequence
                                  (SEQ ID NO: 4)
tcgaagctttataaaaacatacttttttttttactttttttttt tttctgagacacagcctcactctgtcgcccaggctggagtgcagg ttttcatgtttatctgtgagatgtacctttggcacattactttcc tgacatgagatttaaatttttttttttatcttgtgacaatttaac ttttttgacacataaaaattgtacatatttatttgtttgagatgg agtcgcactctgtcactcaggctggagtgcagtggcgtgatcttg gctcactgcaacctccgcctcccgagttcaagtgattctcctggc tcagcctcccaagcagctgtcattacaggcctgcaccaccacacc cggctgattttgtattttaggagaaacagggtttcaccatgttg ggccaggctggtcttgaagtcctgacctcaagtgatccacccacc ttggcctcccaaagtgctgggattataggcatgagccaccgtacc agaccctaaaaattgtatatatttaaggtgtaccatttgatgtt tagatatacattgtgaaatgattacattccacatattacctctac agagttaccattttgtacacttggtcaacatcatcccattctcc ccttcctccacagatatttcttgtatactatatagaagccaaggg tattttgggggaagagctcaaagttccttcgtggagttaaaaat atatatatactatgtacatataagccatttagcaacccctagatgc ttaataaagaatactggaggccggtgtggtggctcacacctgta atcccagcactttgggaggccgaggcggtcggattacgaggtcag gagttcaagaccagcctggccaacatggtgaaaccccatctttac taaaaatacaaaaattagccgggtgtggtggtgggcgcctgtaat cccagctactcgggggggctgaggcagaattgcttgaacctgggag
```

-continued gcagaggttgcagtgagctgagatcacgccactgcattccagcct
gggtgacagagcaatattctgtcgcaaaaaaaaaagaatactgg
aggctgggcgaggtggctcacacctgtaatcccagcattttggga
tgccagaggcgggcggaatntcttgagctcaggagttcgagacca
gcctacacaatatgctccaaacgccgcttntacaaaacatacaga
aactacccgggtgtggtggcgnnccccctgtggtcctagatacttg
ggaggttgaggcgggaggatcgcttgagctcgggaggtcgaggct
gcaatgagccgagatggtgccactgcattctgacgacagagcgag
attccgtttcaaaacaaacaacaaataaggttgggggatcaaata
tcttctagtgtttaaggatctgccttccttcctgccccccatgtttt
gtctttccttgtttgtctttatatagatcaagcaggttttaaatt
cctagtaggagcttacatttacttttccaaggggggaggggaata
aatatctacacacacacacacacacacacacacacacacacacac
acacacacacacaccacactggagttcgagacgaggcctaagc
aacatgccgaaaccccgtctctactaaatacaaaaaatagctgag
cttggtggcgcacgcctatagtcctagctactggggaggctgagg
tgggaggatcgcttgagcccaagaagtcgaggctgcagtgagccg
agatcgcgccgctgcactccagcctgagcgacagggcgaggctct
gtctcaaaacaaacaaacaaaaaaaaaaggaaaggaaatataac
acagtgaaatgaaaggattgagagaaatgaaaaatatacacgcca
caaatgtgggagggcgataaccactcgtagaaagcgtgagaagtt
actacaagcggtcctcccgggcaccgtactgttccgctcccagaa
gccccgggcgccggaagtcgtcactcttaagaagggacggggccc
cacgctgcgcacccgcgggtttgct >SMN1 short promoter nucleic acid sequence
(SEQ ID NO: 5)
ggatgccagaggcgggcggaatAtcttgagctcaggagttcgaga
ccagcctacacaatatgctccaaacgccgcttCtacaaaacatac
agaaaactacccgggtgtggtggcgTGccctgtggtcctagatac
ttgggaggttgaggcgggaggatcgcttgagctcgggaggtcgag
gctgcaatgagccgagatggtgccactgcattctgacgacagagc
gagattccgtttcaaaacaaacaacaaataaggttgggggatcaa
atatcttctagtgtttaaggatctgccttccttcctgccccccatg
tttgtctttccttgtttgtctttatatagatcaagcaggttttaa
attcctagtaggagcttacatttacttttccaaggggggggggaa
taaatatctacacacacacacacacacacacacacacacacacac
acacacacacacacaccacactggagttcgagacgaggcctaa
gcaacatgccgaaaccccgtctctactaaatacaaaaaatagctg
agcttggtggcgcacgcctatagtcctagctactggggaggctga
ggtgggaggatcgcttgagcccaagaagtcgaggctgcagtgagc
cgagatcgcgccgctgcactccagcctgagcgacagggcgaggct ctgtctcaaaacaaacaaacaaaaaaaaaaaggaaaggaaatata
acacagtgaaatgaaaggattgagagaaatgaaaaatatacacgc
cacaaatgtgggagggcgataaccactcgtagaaagcgtgagaag
ttactacaagcggtcctcccgggcaccgtactgttccgctcccag
aagccccgggcgccggaagtcgtcactcttaagaagggacggggc
cccacgctgcgcacccgcgggtttgct >SMN1p-co-SMN1 rAAV vector
nucleic acid sequence
(SEQ ID NO: 6)
gctgcgcgctcgctcgctcactgaggccgcccgggcaaagcccgg
gcgtcgggcgacctttggtcgcccggcctcagtgagcgagcgagc
gcgcagagagggagtggccaactccatcactagggggttccttgta
gttaatgattaacccgccatgctacttatctaccagggtaatggg
gatcctctagaactatagctagtcgacattgattattgactagtt
cgaagctttataaaaacatactttttttttttactttttttttttt
ttctgagacacagccactctgtcgcccaggctggagtgcaggt
tttcatgtttatctgtgagatgtacctttggcacattactttcct
gacatgagatttaaatttttttttttatcttgtgacaatttaact
ttttgacacataaaaattgtacatatttatttgtttgagatgga
gtcgcactctgtcactcaggctggagtgcagtggcgtgatcttgg
ctcactgcaacctccgcctcccgagttcaagtgattctcctggct
cagcctcccaagcagctgtcattacaggcctgcaccaccacccc
ggctgattttgtattttaggagaaacagggtttcaccatgttgg
gccaggctggtcttgaagtcctgacctcaagtgatccacccacct
tggcctcccaaagtgctgggattataggcatgagccaccgtacca
gacccctaaaaattgtatatatttaaggtgtaccatttgatgttt
agatatacattgtgaaatgattacattccacatattacctctaca
gagttaccattttttgtacacttggtcaacatcatcccattctccc
cttcctccacagatatttcttgtatactatatagaagccaagggt
attttgggggaagagctcaaagttcctttcgtggagttaaaaata
tatatatactatgtacatataagccatttagcaaccctagatgct
taataaagaatactggaggcccggtgtggtggctcacacctgtaa
tcccagcactttgggaggccgaggcggtcggattacgaggtcagg
agttcaagaccagcctggccaacatggtgaaaccccatctttact
aaaaatacaaaaattagccgggtgtggtggtgggcgcctgtaatc
ccagctactcggggggctgaggcagaattgcttgaacctgggagg
cagaggttgcagtgagctgagatcacgccactgcattccagcctg
ggtgacagagcaatattctgtcgcaaaaaaaaaagaatactgga
ggctgggcgaggtggctcacacctgtaatcccagcattttgggat
gccagagggcgggaatatcttgagctcaggagttcgagaccagc
ctacacaatatgctccaaacgccgcttCtacaaaacatacagaaa
ctacccgggtgtggtggcgtgccctgtggtcctagatacttggg -continued aggttgaggcgggaggatcgcttgagctcgggaggtcgaggctgc
aatgagccgagatggtgccactgcattctgacgacagagcgagat
tccgtttcaaaacaaacaacaaataaggttgggggatcaaatatc
ttctagtgtttaaggatctgccttccttcctgccccatgtttgt
ctttccttgtttgtctttatatagatcaagcaggttttaaattcc
tagtaggagcttacattttacttttccaaggggaggggaataaaa
tatctacacacacacacacacacacacacacacacacacacacac
acacacacacacaccacactggagttcgagacgaggcctaagcaa
catgccgaaacccgtctctactaaatacaaaaaatagctgagct
tggtggcgcacgcctatagtcctagctactggggaggctgaggtg
ggaggatcgcttgagcccaagaagtcgaggctgcagtgagccgag
atcgcgccgctgcactccagcctgagcgacagggcgaggctctgt
ctcaaaacaaacaaacaaaaaaaaaaaaggaaaggaaatataacac
agtgaaatgaaaggattgagagaaatgaaaaatatacacgccaca
aatgtgggagggcgataaccactcgtagaaagcgtgagaagttac
tacaagcggtcctcccgggcaccgtactgttccgctcccagaagc
cccgggcgccgaagtcgtcactcttaagaagggacggggcccca
cgctgcgcacccgcgggtttgctATGGCCATGAGCAGCGGCGGCA
GTGGCGGCGGCGTGCCCGAGCAGGAGGATTCTGTGCTGTTCCGGA
GAGGAACAGGCCAGAGCGATGACTCCGATATCTGGGACGACACAG
CCCTTATCAAGGCCTACGACAAGGCCGTGGCCAGCTTTAAGCACG
CCCTGAAGAATGGCGATATCTGCGAGACAAGCGGAAAGCCTAAGA
CCACCCCTAAAAGAAAGCCCGCCAAGAAAAACAAGTCCCAGAAAA
AAAACACCGCCGCTAGCCTGCAGCAGTGGAAGGTGGGCGACAAAT
GCAGCGCCATCTGGTCCGAGGACGGCTGCATCTACCCTGCTACCA
TCGCCAGCATCGACTTCAAGCGGGAAACCTGCGTGGTGGTCTACA
CAGGCTATGGCAATAGGGAGGAACAAAATCTCTCTGATCTGCTGT
CTCCTATTTGTGAAGTGGCTAACAACATCGAGCAGAACGCCCAGG
AAAATGAGAACGAAAGCCAAGTGTCCACCGACGAGAGCGAGAACA
GCAGAAGCCCTGGAAACAAGTCTGACAACATCAAGCCCAAGTCTG
CCCCTTGGAACAGCTTCCTGCCCCCTCCTCCTCCAATGCCTGGCC
CCAGACTGGGCCCCGGCAAGCCTGGCCTGAAGTTCAACGGCCCTC
CTCCACCCCCTCCTCCTCCACCTCCCCATCTGCTGAGCTGCTGGC
TGCCTCCTTTTCCCAGCGGCCCCCCTATCATCCCCCCACCACCTC
CTATCTGTCCCGACAGCCTGGACGACGCCGATGCTCTGGGATCCA
TGCTGATCAGCTGGTACATGTCTGGCTACCACACCGGCTACTACA
TGGGCTTCCGGCAGAACCAGAAGGAAGGAAGATGCAGCCACAGCC
TGAACTGAgcggccgcaagcttcctgaggatccgatcttttccc
tctgccaaaaattatggggacatcatgaagcccttgagcatctg
acttctggctaataaaggaaatttattttcattgcaatagtgtgt
tggaatttttttgtgtctctcactcggaagcaattcgttgatctga -continued atttcgaccaccccataatacccattaccctggtagataagtagca
tgggggttaatcattaactacaaggaacccctagtgatggagttg
gccactccctctctgcgcgctcgctcgctcactgaggccgggcga
ccaaaggtcgcccgacgcccgggctttgccggcggcctcagtg
agcgagcgagcgcgcagccttaattaacctaattcactggccgtc
gttttacaacgtcgtgactgggaaaaccctggcgttacccaactt
aatcgccttgcagcacatccccctttcgccagctggcgtaatagc
gaagagcccgcaccgatcgcccttcccaacagttgcgcagcctg
aatggcgaatgggacgcgccctgtagcggcgcattaagcgcggcg
ggtgtggtggttacgcgcagcgtgaccgctacacttgccagcgcc
ctagcgcccgctcctttcgctttcttcccttcctttctcgccacg
ttcgccggctttccccgtcaagctctaaatcggggctcccttta
gggttccgatttagtgctttacggcacctcgaccccaaaaaactt
gattagggtgatggttcacgtagtgggccatcgccctgatagacg
gtttttcgccctttgacgttggagtccacgttctttaatagtgga
ctcttgttccaaactggaacaacactcaaccctatctcggtctat
tcttttgatttataagggattttgccgatttcggcctattggtta
aaaaatgagctgatttaacaaaaatttaacgcgaattttaacaaa
atattaacgcttacaatttaggtggcacttttcggggaaatgtgc
gcggaaccccctatttgtttatttttctaaatacattcaaatatgt
atccgctcatgagacaataaccctgataaatgcttcaataatatt
gaaaaaggaagagtatgattgaacaagatggattgcacgcaggtt
ctccgccgcttgggtggagaggctattcggctatgactgggcac
aacagacaatcggctgctctgatgccgccgtgttccggctgtcag
cgcaggggcgcccggttcttttttgtcaagaccgacctgtccgtg
ccctgaatgaactgcaagacgaggcagcgcggctatcgtggctgg
ccacgacgggcgttccttgcgcagctgtgctcgacgttgtcactg
aagcgggaagggactggctgctattgggcgaagtgccggggcagg
atctcctgtcatctcaccttgctcctgccgagaaagtatccatca
tggctgatgcaatgcggcggctgcatacgcttgatccggctacct
gcccattcgaccaccaagcgaaacatcgcatcgagcgagcacgta
ctcggatggaagccggtcttgtcgatcaggatgatctggacgaag
agcatcagggctcgcgccagccgaactgttcgccaggctcaagg
cgagcatgcccgacggcgaggatctcgtcgtgacccatggcgatg
cctgcttgccgaatatcatggtggaaaatggccgcttttctggat
tcatcgactgtggccggctgggtgtggcggaccgctatcaggaca
tagcgttggctacccgtgatattgctgaagagcttggcggcgaat
gggctgaccgcttcctcgtgctttacggtatcgccgctcccgatt
cgcagcgcatcgccttctatcgccttcttgacgagttcttctgat
aactgtcagaccaagtttactcatatatactttagattgatttaa -continued aacttcatttttaatttaaaaggatctaggtgaagatcctttttg ataatctcatgaccaaaatcccttaacgtgagttttcgttccact gagcgtcagaccccgtagaaaagatcaaaggatcttcttgagatc ccttttttctgcgcgtaatctgctgcttgcaaacaaaaaaaccac cgctaccagcggtggtttgtttgccggatcaagagctaccaactc ttttccgaaggtaactggcttcagcagagcgcagataccaaata ctgttcttctagtgtagccgtagttaggccaccacttcaagaact ctgtagcaccgctacatacctcgctctgctaatcctgttaccag tggctgctgccagtggcgataagtcgtgtcttaccgggttggact caagacgatagttaccggataaggcgcagcggtcgggctgaacgg ggggttcgtgcacacagcccagcttggagcgaacgacctacaccg aactgagatacctacagcgtgagctatgagaaagcgccacgcttc ccgaagggagaaaggcggacaggtatccggtaagcggcagggtcg gaacaggagagcgcacgagggagcttccagggggaaacgcctggt atctttatagtcctgtcgggtttcgccacctctgacttgagcgtc gattttgtgatgctcgtcagggggggcggagcctatggaaaaacg ccagcaacgcggcctttttacggttcctggccttttgctggcctt ttgctcacatgttctttcctgcgttatcccctgattctgtggata accgtattaccgcctttgagtgagctgataccgctcgccgcagcc gaacgaccgagcgcagcgagtcagtgagcgaggaagcggaagagc gcccaatacgcaaaccgcctctccccgcgcgttggccgattcatt aatgcagctggcacgacaggtttcccgactggaaagcgggcagtg agcgcaacgcaattaatgtgagttagctcactcattaggcacccc aggctttacactttatgcttccggctcgtatgttgtgtggaattg tgagcggataacaatttcacacaggaaacagctatgaccatgatt acgccagatttaattaaggccttaattag >SMN1sp-co-SMN1 rAAV vector
nucleic acid sequence
                                 (SEQ ID NO: 7)
ctgcgcgctcgctcgctcactgaggccgcccgggcaaagcccggg cgtcgggcgacctttggtcgcccggcctcagtgagcgagcgagcg cgcagagagggagtgtagccatgctctaggaagatcaattcggta caattcacgcgtggatgccagaggcgggcggaatAtcttgagctc aggagttcgagaccagcctacacaatatgctccaaacgccgcttC tacaaaacatacagaaactacccggggtgtggtggcgTGccctgt ggtcctagatacttgggaggttgaggcgggaggatcgcttgagct cgggaggtcgaggctgcaatgagccgagatggtgccactgcattc tgacgacagagcgagattccgtttcaaaacaaacaacaaataagg ttgggggatcaaatatcttctagtgtttaaggatctgccttcctt cctgcccccatgtttgtctttccttgtttgtctttatatagatca agcaggttttaaattcctagtaggagcttacatttacttttccaa gggggaggggaataaatatctacacacacacacacacacacacaca -continued cacacacacacacacacacacacacacacaccacactggagttcg agacgaggcctaagcaacatgccgaaacccgtctctactaaata caaaaaatagctgagcttggtggcgcacgcctatagtcctagcta ctggggaggctgaggtgggaggatcgcttgagcccaagaagtcga ggctgcagtgagccgagatcgcgccgctgcactccagcctgagcg acagggcgaggctctgtctcaaaacaaacaaacaaaaaaaaaag gaaaggaaatataacacagtgaaatgaaaggattgagagaaatga aaaatatacacgccacaaatgtgggagggcgataaccactcgtag aaagcgtgagaagttactacaagcggtcctcccgggcaccgtact gttccgctcccagaagcccgggcgccggaagtcgtcactcttaa gaagggacggggcccacgctgcgcacccgcgggtttgctATGGC

CATGAGCAGCGGCGGCAGTGGCGGCGGCGTGCCCGAGCAGGAGGA

TTCTGTGCTGTTCCGGAGAGGAACAGGCCAGAGCGATGACTCCGA

TATCTGGGACGACACAGCCCTTATCAAGGCCTACGACAAGGCCGT

GGCCAGCTTTAAGCACGCCCTGAAGAATGGCGATATCTGCGAGAC

AAGCGGAAAGCCTAAGACCACCCCTAAAAGAAAGCCCGCCAAGAA

AAACAAGTCCCAGAAAAAAAACACCGCCGCTAGCCTGCAGCAGTG

GAAGGTGGGCGACAAATGCAGCGCCATCTGGTCCGAGGACGGCTG

CATCTACCCTGCTACCATCGCCAGCATCGACTTCAAGCGGGAAAC

CTGCGTGGTGGTCTACACAGGCTATGGCAATAGGGAGGAACAAAA

TCTCTCTGATCTGCTGTCTCCTATTTGTGAAGTGGCTAACAACAT

CGAGCAGAACGCCCAGGAAAATGAGAACGAAAGCCAAGTGTCCAC

CGACGAGAGCGAGAACAGCAGAAGCCCTGGAAACAAGTCTGACAA

CATCAAGCCCAAGTCTGCCCCTTGGAACAGCTTCCTGCCCCCTCC

TCCTCCAATGCCTGGCCCCAGACTGGGCCCCGGCAAGCCTGGCCT

GAAGTTCAACGGCCCTCCTCCACCCCCTCCTCCTCCACCTCCCCA

TCTGCTGAGCTGCTGGCTGCCTCCTTTTCCCAGCGGCCCCCCTAT

CATCCCCCCACCACCTCCTATCTGTCCCGACAGCCTGGACGACGC

CGATGCTCTGGGATCCATGCTGATCAGCTGGTACATGTCTGGCTA

CCACACCGGCTACTACATGGGCTTCCGGCAGAACCAGAAGGAAGG

AAGATGCAGCCACAGCCTGAACTGAgcggccgcaagcttatcgat accgtcgactagagctcgctgatcagcctcgactgtgccttctag ttgccagccatctgttgtttgcccctcccccgtgccttccttgac cctggaaggtgccactcccactgtcctttcctaataaaatgagga aattgcatcgcattgtctgagtaggtgtcattctattctggggg ggggtggggcaggacagcaaggggaggattgggaagacaatagc ctaggtagataagtagcatggcgggttaatcattaactacaagga accctagtgatggagttggccactccctctctgcgcgctcgctc gctcactgaggccgggcgaccaaaggtcgcccgacgcccgggctt tgcccgggcggcctcagtgagcgagcgagcgcgcagccttaatta acctaattcactggccgtcgttttacaacgtcgtgactgggaaaa

```
ccctggcgttacccaacttaatcgccttgcagcacatcccccttt
cgccagctggcgtaatagcgaagaggcccgcaccgatcgccctc
ccaacagttgcgcagcctgaatggcgaatgggacgcgccctgtag
cggcgcattaagcgcggcgggtgtggtggttacgcgcagcgtgac
cgctacacttgccagcgccctagcgcccgctcctttcgctttctt
cccttcctttctcgccacgttcgccggctttccccgtcaagctct
aaatcgggggctccctttagggttccgatttagtgctttacggca
cctcgaccccaaaaaacttgattagggtgatggttcacgtagtgg
gccatcgccctgatagacggtttttcgccctttgacgttggagtc
cacgttctttaatagtggactcttgttccaaactggaacaacact
caaccctatctcggtctattcttttgatttataagggattttgcc
gatttcggcctattggttaaaaaatgagctgatttaacaaaaatt
taacgcgaattttaacaaaatattaacgcttacaatttaggtggc
acttttcggggaaatgtgcgcggaacccctatttgtttattttc
taaatacattcaaatatgtatccgctcatgagacaataaccctga
taaatgcttcaataatattgaaaaaggaagagtatgagtattcaa
catttccgtgtcgcccttattccctttttgcggcattttgcctt
cctgttttgctcaccagaaacgctggtgaaagtaaaagatgct
gaagatcagttgggtgcacgagtgggttacatcgaactggatctc
aacagcggtaagatccttgagagttttcgccccgaagaacgtttt
ccaatgatgagcacttttaaagttctgctatgtggcgcggtatta
tcccgtattgacgccgggcaagagcaactcggtcgccgcatacac
tattctcagaatgacttggttgagtactcaccagtcacagaaaag
catcttacggatggcatgacagtaagagaattatgcagtgctgcc
ataaccatgagtgataacactgcggccaacttacttctgacaacg
atcggaggaccgaaggagctaaccgcttttttgcacaacatgggg
gatcatgtaactcgccttgatcgttgggaaccggagctgaatgaa
gccataccaaacgacgagcgtgacaccacgatgcctgtagcaatg
gcaacaacgttgcgcaaactattaactggcgaactacttactcta
gcttcccggcaacaattaatagactggatggaggcggataaagtt
gcaggaccacttctgcgctcggcccttccggctggctggtttatt
gctgataaatctggagccggtgagcgtgggtctcgcggtatcatt
gcagcactggggccagatggtaagccctcccgtatcgtagttatc
tacacgacggggagtcaggcaactatggatgaacgaaatagacag
atcgctgagataggtgcctcactgattaagcattggtaactgtca
gaccaagtttactcatatatactttagattgatttaaaacttcat
ttttaatttaaaaggatctaggtgaagatccttttttgataatctc
atgaccaaaatcccttaacgtgagttttcgttccactgagcgtca
ccccgtagaaaagatcaaaggatcttcttgagatcctttttttt
ctgcgcgtaatctgctgcttgcaaacaaaaaaaccaccgctacca
gcggtggtttgtttgccggatcaagagctaccaactcttttccg
aaggtaactggcttcagcagagcgcagataccaaatactgttctt
ctagtgtagccgtagttaggccaccacttcaagaactctgtagca
ccgcctacatacctcgctctgctaatcctgttaccagtggctgct
gccagtggcgataagtcgtgtcttaccgggttggactcaagacga
tagttaccggataaggcgcagcggtcgggctgaacggggggttcg
tgcacacagcccagcttggagcgaacgacctacaccgaactgaga
tacctacagcgtgagctatgagaaagcgccacgcttcccgaaggg
agaaaggcggacaggtatccggtaagcggcagggtcggaacagga
gagcgcacgagggagcttccaggggaaacgcctggtatctttat
agtcctgtcgggtttcgccacctctgacttgagcgtcgatttttg
tgatgctcgtcaggggggcggagcctatggaaaaacgccagcaac
gcggccttttacggttcctggccttttgctggccttttgctcac
atgttcttcctgcgttatcccctgattctgtggataaccgtatt
accgcctttgagtgagctgataccgctcgccgcagccgaacgacc
gagcgcagcgagtcagtgagcgaggaagcggaagagcgcccaata
cgcaaaccgcctctccccgcgcgttggccgattcattaatgcagc
tggcacgacaggtttcccgactggaaagcgggcagtgagcgcaac
gcaattaatgtgagttagctcactcattaggcaccccaggcttta
cactttatgcttccggctcgtatgttgtgtggaattgtgagcgga
taacaatttcacacaggaaacagctatgaccatgattacgccaga
tttaattaaggccttaattagg >CMVen/CB-co-hSMN1 rAAV vector
nucleic acid sequence
                                            (SEQ ID NO: 8)
ctgcgcgctcgctcgctcactgaggccgcccgggcaaagcccggg
cgtcgggcgacctttggtcgcccggcctcagtgagcgagcgagcg
cgcagagagggagtgtagccatgctctaggaagatcaattcaatt
cacgcgtcgacattgattattgactagttattaatagtaatcaat
tacggggtcattagttcatagcccatatatggagttccgcgttac
ataacttacggtaaatggcccgcctggctgaccgcccaacgaccc
ccgcccattgacgtcaataatgacgtatgttcccatagtaacgcc
aatagggactttccattgacgtcaatgggtggaGtatttacggta
aactgcccacttggcagtacatcaagtgtatcatatgccaagtac
gccccctattgacgtcaatgacggtaaatggcccgcctggcatta
tgcccagtacatgaccttatgggactttcctacttggcagtacat
ctacgtattagtcatcgctattaccatgtcgaggccacgttctgc
ttcactctccccatctcccccccctccccaccccaattttgtat
ttatttatttttttaattattttgtgcagcgatggggcggggggg
ggggcgcgcgccaggcggggcggggcgggcgaggggcggggg
gcgaggcggagaggtgcggcggcagccaatcagagcggcgcgctc
cgaaagtttccttttatggcgaggcggcggcggcggcggccctat
``` aaaaagcgaagcgcgcggggggggagcaagctctagcctcgagaa ttcaccggtgccaccATGGCCATGAGCAGCGGCGGCAGTGGCGGC

GGCGTGCCCGAGCAGGAGGATTCTGTGCTGTTCCGGAGAGGAACA

GGCCAGAGCGATGACTCCGATATCTGGGACGACACAGCCCTTATC

AAGGCCTACGACAAGGCCGTGGCCAGCTTTAAGCACGCCCTGAAG

AATGGCGATATCTGCGAGACAAGCGGAAAGCCTAAGACCACCCCT

AAAAGAAAGCCCGCCAAGAAAAACAAGTCCCAGAAAAAAACACC

GCCGCTAGCCTGCAGCAGTGGAAGGTGGGCGACAAATGCAGCGCC

ATCTGGTCCGAGGACGGCTGCATCTACCCTGCTACCATCGCCAGC

ATCGACTTCAAGCGGGAAACCTGCGTGGTGGTCTACACAGGCTAT

GGCAATAGGGAGGAACAAAATCTCTCTGATCTGCTGTCTCCTATT

TGTGAAGTGGCTAACAACATCGAGCAGAACGCCCAGGAAAATGAG

AACGAAAGCCAAGTGTCCACCGACGAGAGCGAGAACAGCAGAAGC

CCTGGAAACAAGTCTGACAACATCAAGCCCAAGTCTGCCCCTTGG

AACAGCTTCCTGCCCCCTCCTCCTCCAATGCCTGGCCCCAGACTG

GGCCCCGGCAAGCCTGGCCTGAAGTTCAACGGCCCTCCTCCACCC

CCTCCTCCTCCACCTCCCCATCTGCTGAGCTGCTGGCTGCCTCCT

TTTCCCAGCGGCCCCCCTATCATCCCCCCACCACCTCCTATCTGT

CCCGACAGCCTGGACGACGCCGATGCTCTGGGATCCATGCTGATC

AGCTGGTACATGTCTGGCTACCACACCGGCTACTACATGGGCTTC

CGGCAGAACCAGAAGGAAGGAAGATGCAGCCACAGCCTGAACTGA gccaagcttcctgaggatccgatcttttttccctctgccaaaaatt atggggacatcatgaagcccttgagcatctgacttctggctaat aaaggaaatttattttcattgcaatagtgtgttggaattttttgt gtctctcactcggcctaggtagataagtagcatgggggttaatca ttaactacaaggaaccctagtgatggagttggccactccctctc tgcgcgctcgctcgctcactgaggccgggcgaccaaaggtcgccc gacgcccgggctttgccccggcggcctcagtgagcgagcgagcgc gcagccttaattaacctaattcactggccgtcgttttacaacgtc gtgactgggaaaaccctggcgttacccaacttaatcgccttgcag cacatccccctttcgccagctggcgtaatagcgaagaggcccgca ccgatcgcccttcccaacagttgcgcagcctgaatggcgaatggg acgcgccctgtagcggcgcattaagcgcggcgggtgtggtggtta cgcgcagcgtgaccgctacacttgccagcgccctagcgcccgctc ctttcgctttcttcccttcctttctcgccacgttcgccggctttc cccgtcaagctctaaatcgggggctcccttttagggttccgattta gtgctttacggcacctcgaccccaaaaaacttgattagggtgatg gttcacgtagtgggccatcgccctgatagacggttttttcgccctt tgacgttggagtccacgttctttaatagtggactcttgttccaaa ctggaacaacactcaaccctatctcggtctattcttttgatttat aagggattttgccgatttcggcctattggttaaaaaatgagctga tttaacaaaaatttaacgcgaattttaacaaaatattaacgctta caatttaggtggcacttttcggggaaatgtgcgcggaaccccctat ttgtttatttttctaaatacattcaaatatgtatccgctcatgag acaataaccctgataaatgcttcaataatattgaaaaaggaagag tatgagtattcaacatttccgtgtcgcccttattccctttttttgc ggcattttgccttcctgttttttgctcacccagaaacgctggtgaa agtaaaagatgctgaagatcagttgggtgcacgagtgggttacat cgaactggatctcaacagcggtaagatccttgagagttttcgccc cgaagaacgttttccaatgatgagcacttttaaagttctgctatg tggcgcggtattatcccgtattgacgccgggcaagagcaactcgg tcgccgcatacactattctcagaatgacttggttgagtactcacc agtcacagaaaagcatcttacggatggcatgacagtaagagaatt atgcagtgctgccataaccatgagtgataacactgcggccaactt acttctgacaacgatcggaggaccgaaggagctaaccgcttttttt gcacaacatgggggatcatgtaactcgccttgatcgttgggaacc ggagctgaatgaagccataccaaacgacgagcgtgacaccacgat gcctgtagcaatggcaacaacgttgcgcaaactattaactggcga actacttactctagcttcccggcaacaattaatagactggatgga ggcggataaagttgcaggaccacttctgcgctcggcccttccggc tggctggtttattgctgataaatctggagccggtgagcgtgggtc tcgcggtatcattgcagcactggggccagatggtaagccctcccg tatcgtagttatctacacgacggggagtcaggcaactatggatga acgaaatagacagatcgctgagataggtgcctcactgattaagca ttggtaactgtcagaccaagtttactcatatatactttagattga tttaaaacttcattttttaatttaaaaggatctaggtgaagatcct ttttgataatctcatgaccaaaatcccttaacgtgagttttcgtt ccactgagcgtcagacccgctagaaaagatcaaaggatcttcttg agatcctttttttctgcgcgtaatctgctgcttgcaaacaaaaa accaccgctaccagcggtggtttgtttgccggatcaagagctacc aactctttttccgaaggtaactggcttcagcagagcgcagatacc aaatactgttcttctagtgtagccgtagttaggccaccacttcaa gaactctgtagcaccgcctacatacctcgctctgctaatcctgtt accagtggctgctgccagtggcgataagtcgtgtcttaccgggtt ggactcaagacgatagttaccggataaggcgcagcggtcgggctg aacggggggtcgtgcacacagcccagcttggagcgaacgaccta caccgaactgagatacctacagcgtgagctatgagaaagcgccac gcttcccgaagggagaaaggcggacaggtatccggtaagcggcag ggtcggaacaggagagcgcacgagggagcttccaggggaaacgc ctggtatctttatagtcctgtcgggtttcgccacctctgacttga gcgtcgatttttgtgatgctcgtcagggggggcggagcctatggaa -continued aaacgccagcaacgcggccttttacggttcctggccttttgctg gccttttgctcacatgttcttcctgcgttatccctgattctgt ggataaccgtattaccgcctttgagtgagctgataccgctcgcc cagccgaacgaccgagcgcagcgagtcagtgagcgaggaagcgga agagcgcccaatacgcaaaccgcctctccccgcgcgttggccgat tcattaatgcagctggcacgacaggtttcccgactggaaagcggg cagtgagcgcaacgcaattaatgtgagttagctcactcattaggc accccaggctttacactttatgcttccggctcgtatgttgtgtgg aattgtgagcggataacaatttcacacaggaaacagctatgacca tgattacgccagatttaattaaggccttaattagg >CMVen/CB-co-hSMN1_miR122_BS rAAV vector nucleic acid sequence (SEQ ID NO: 9)

ctgcgcgctcgctcgctcactgaggccgcccgggcaaagcccggg cgtcgggcgacctttggtcgcccggcctcagtgagcgagcgagcg cgcagagagggagtgtagccatgctctaggaagatcaattcaatt cacgcgtcgacattgattattgactagttattaatagtaatcaat tacgggtcattagttcatagcccatatatggagttccgcgttac ataacttacggtaaatggcccgcctggctgaccgcccaacgaccc ccgcccattgacgtcaataatgacgtatgttcccatagtaacgcc aatagggactttccattgacgtcaatgggtggaGtatttacggta aactgcccacttggcagtacatcaagtgtatcatatgccaagtac gccccctattgacgtcaatgacggtaaatggcccgcctggcatta tgcccagtacatgaccttatgggactttcctacttggcagtacat ctacgtattagtcatcgctattaccatgtcgaggccacgttctgc ttcactctccccatctcccccccctccccaccccaattttgtat ttatttattttttaattattttgtgcagcgatggggcgggggg gggggcgcgcgccaggcggggcggggcgggcgaggggcggggcg gggcgaggcggagaggtgcggcggcagccaatcagagcggcgcgc tccgaaagtttccttttatggcgaggcggcggcggcggcggccct ataaaaagcgaagcgcgcggggggggagcaagctctagcctcgag aattcaccggtgccaccATGGCCATGAGCAGCGGCGGCAGTGGCG

GCGGCGTGCCCGAGCAGGAGGATTCTGTGCTGTTCCGGAGAGGAA

CAGGCCAGAGCGATGACTCCGATATCTGGGACGACACAGCCCTTA

TCAAGGCCTACGACAAGGCCGTGGCCAGCTTTAAGCACGCCCTGA

AGAATGGCGATATCTGCGAGACAAGCGGAAAGCCTAAGACCACCC

CTAAAAGAAAGCCCGCCAAGAAAACAAGTCCCAGAAAAAAAACA

CCGCCGCTAGCCTGCAGCAGTGGAAGGTGGGCGACAAATGCAGCG

CCATCTGGTCCGAGGACGGCTGCATCTACCCTGCTACCATCGCCA

GCATCGACTTCAAGCGGGAAACCTGCGTGGTGGTCTACACAGGCT

ATGGCAATAGGGAGGAACAAAATCTCTCTGATCTGCTGTCTCCTA

TTTGTGAAGTGGCTAACAACATCGAGCAGAACGCCCAGGAAAATG

-continued

AGAACGAAAGCCAAGTGTCCACCGACGAGAGCGAGAACAGCAGAA

GCCCTGGAAACAAGTCTGACAACATCAAGCCCAAGTCTGCCCCTT

GGAACAGCTTCCTGCCCCCTCCTCCTCCAATGCCTGGCCCCAGAC

TGGGCCCCGGCAAGCCTGGCCTGAAGTTCAACGGCCCTCCTCCAC

CCCCTCCTCCTCCACCTCCCCATCTGCTGAGCTGCTGGCTGCCTC

CTTTTCCCAGCGGCCCCCCTATCATCCCCCCACCACCTCCTATCT

GTCCCGACAGCCTGGACGACGCCGATGCTCTGGGATCCATGCTGA

TCAGCTGGTACATGTCTGGCTACCACACCGGCTACTACATGGGCT

TCCGGCAGAACCAGAAGGAAGGAAGATGCAGCCACAGCCTGAACT

GAgcGGCCacaaacaccattgtcacactccaacaaacaccattgt cacactccaacaaacaccattgtcacactccaagcttcctgagga tccgatctttttccctctgccaaaaattatggggacatcatgaag ccccttgagcatctgacttctggctaataaaggaaatttattttc attgcaatagtgtgttggaattttttgtgtctctcactcggccta ggtagataagtagcatggggggttaatcattaactacaaggaaccc ctagtgatggagttggccactccctctctgcgcgctcgctcgctc actgaggccgggcgaccaaaggtcgcccgacgcccgggctttgcc cgggcggcctcagtgagcgagcgagcgcgcagccttaattaacct aattcactggccgtcgttttacaacgtcgtgactgggaaaaccct ggcgttacccaacttaatcgccttgcagcacatccccctttcgcc agctggcgtaatagcgaagaggcccgcaccgatcgcccttcccaa cagttgcgcagcctgaatggcgaatgggacgcgccctgtagcggc gcattaagcgcggcgggtgtggtggttacgcgcagcgtgaccgct acacttgccagcgccctagcgcccgctcctttcgctttcttccct tcctttctcgccacgttcgccggctttccccgtcaagctctaaat cgggggctccctttagggttccgatttagtgctttacggcacctc gaccccaaaaaacttgattagggtgatggttcacgtagtgggcca tcgccctgatagacggtttttcgccctttgacgttggagtccacg ttctttaatagtggactcttgttccaaactggaacaacactcaac cctatctcggtctattcttttgatttataagggattttgccgatt tcggcctattggttaaaaaatgagctgatttaacaaaaatttaac gcgaattttaacaaaatattaacgcttacaatttaggtggcactt ttcggggaaatgtgcgcggaaccccatttgtttattttctaaaa tacattcaaatatgtatccgctcatgagacaataaccctgataaa tgcttcaataatattgaaaaaggaagagtatgagtattcaacatt tccgtgtcgcccttattccctttttgcggcattttgccttcctg tttttgctcacccagaaacgctggtgaaagtaaaagatgctgaag atcagttgggtgcacgagtgggttacatcgaactggatctcaaca gcggtaagatccttgagagttttcgccccgaagaacgttttccaa tgatgagcacttttaaagttctgctatgtggcgcggtattatccc gtattgacgccgggcaagagcaactcggtcgccgcatacactatt

```
ctcagaatgacttggttgagtactcaccagtcacagaaaagcatc
ttacgatggcatgacagtaagagaattatgcagtgctgccataa
ccatgagtgataacactgcggccaacttacttctgacaacgatcg
gaggaccgaaggagctaaccgcttttttgcacaacatgggggatc
atgtaactcgccttgatcgttgggaaccggagctgaatgaagcca
taccaaacgacgagcgtgacaccacgatgcctgtagcaatggcaa
caacgttgcgcaaactattaactggcgaactacttactctagctt
cccggcaacaattaatagactggatggaggcggataaagttgcag
gaccacttctgcgctcggcccttccggctggctggtttattgctg
ataaatctggagccggtgagcgtgggtctcgcggtatcattgcag
cactggggccagatggtaagccctcccgtatcgtagttatctaca
cgacggggagtcaggcaactatggatgaacgaaatagacagatcg
ctgagataggtgcctcactgattaagcattggtaactgtcagacc
aagtttactcatatatactttagattgatttaaaacttcattttt
aatttaaaaggatctaggtgaagatcctttttgataatctcatga
ccaaaatcccttaacgtgagttttcgttccactgagcgtcagacc
ccgtagaaaagatcaaaggatcttcttgagatcctttttttctgc
gcgtaatctgctgcttgcaaacaaaaaaaccaccgctaccagcgg
tggtttgtttgccggatcaagagctaccaactctttttccgaagg
taactggcttcagcagagcgcagataccaaatactgttcttctag
tgtagccgtagttaggccaccacttcaagaactctgtagcaccgc
ctacatacctcgctctgctaatcctgttaccagtggctgctgcca
gtggcgataagtcgtgtcttaccgggttggactcaagacgatagt
taccggataaggcgcagcggtcgggctgaacggggggttcgtgca
cacagcccagcttggagcgaacgacctacaccgaactgagatacc
tacagcgtgagctatgagaaagcgccacgcttcccgaagggagaa
aggcggacaggtatccggtaagcggcagggtcggaacaggagagc
gcacgagggagcttccagggggaaacgcctggtatctttatagtc
ctgtcgggtttcgccacctctgacttgagcgtcgatttttgtgat
gctcgtcaggggggggagcctatggaaaaacgccagcaacgcggc
cttttacggttcctggccttttgctggccttttgctcacatgtt
ctttcctgcgttatcccctgattctgtggataaccgtattaccgc
ctttgagtgagctgataccgctcgccgcagccgaacgaccgagcg
cagcgagtcagtgagcgaggaagcggaagagcgcccaatacgcaa
accgcctctccccgcgcgttggccgattcattaatgcagctggca
cgacaggtttcccgactggaaagcgggcagtgagcgcaacgcaat
taatgtgagttagctcactcattaggcaccccaggctttacactt
tatgcttccggctcgtatgttgtgtggaattgtgagcggataaca
atttcacacaggaaacagctatgaccatgattacgccagatttaa
ttaaggccttaattagg
```

> SMNIp-co-SMN1_miR122_BS rAAV vector nucleic acid sequence (SEQ ID NO: 10)
```
gctgcgcgctcgctcgctcactgaggccgcccgggcaaagcccgg
gcgtcgggcgacctttggtcgcccggcctcagtgagcgagcgagc
gcgcagagagggagtggccaactccatcactaggggttccttgta
gttaatgattaacccgccatgctacttatctaccagggtaatggg
gatcctctagaactatagctagtcgacattgattattgactagtt
cgaagctttataaaacatactttttttttttactttttttttttt
ttctgagacacagcctcactctgtcgcccaggctggagtgcaggt
tttcatgtttatctgtgagatgtacctttggcacattacttttcct
gacatgagatttaaattttttttttttatcttgtgacaatttaact
ttttttgacacataaaaattgtacatatttatttgtttgagatgga
gtcgcactctgtcactcaggctggagtgcagtggcgtgatcttgg
ctcactgcaacctccgcctcccgagttcaagtgattctcctggct
cagcctcccaagcagctgtcattacaggcctgcaccaccacaccc
ggctgattttgtattttagggagaaacagggtttcaccatgttgg
gccaggctggtcttgaagtcctgacctcaagtgatccacccacct
tggcctcccaaagtgctgggattataggcatgagccaccgtacca
gacccctaaaaattgtatatatttaaggtgtaccatttgatgttt
agatatacattgtgaaatgattacattccacatattacctctaca
gagttaccattttttgtacacttggtcaacatcatcccattctccc
cttcctccacagatatttcttgtatactatatagaagccaagggt
attttgggggaagagctcaaagttcctttcgtggagttaaaaata
tatatatactatgtacatataagccatttagcaaccctagatgct
taataaagaatactggaggcccggtgtggtggctcacacctgtaa
tcccagcactttgggaggccgaggcggtcggattacgaggtcagg
agttcaagaccagcctggccaacatggtgaaacccatctttact
aaaaatacaaaaattagccgggtgtggtggtgggcgcctgtaatc
ccagctactcgggggctgaggcagaattgcttgaacctgggagg
cagaggttgcagtgagctgagatcacgccactgcattccagcctg
ggtgacagagcaatattctgtcgcaaaaaaaaaagaatactgga
ggctgggcgaggtggctcacacctgtaatcccagcatttgggat
gccagaggcgggcggaatAtcttgagctcaggagttcgagaccag
cctacacaatatgctccaaacgccgcttCtacaaaacatacgaa
actacccgggtgtggtggcgTGcccctgtggtcctagatacttgg
gaggttgaggcgggaggatcgcttgagctcggaggtcgaggctg
caatgagccgagatggtgccactgcattctgacgacagagcgaga
ttccgtttcaaaacaaacaacaaataaggttggggatcaaatat
cttctagtgtttaaggatctgccttccttcctgccccatgtttg
tctttccttgtttgtctttatatagatcaagcaggttttaaattc
ctagtaggagcttacatttacttttccaaggggagggggaataa
```

-continued

```
atatctacacacacacacacacacacacacacacacacaca
cacacacacacacaccacactggagttcgagacgaggcctaagca
acatgccgaaacccgtctctactaaatacaaaaaatagctgagc
ttggtggcgcacgcctatagtcctagctactggggaggctgaggt
gggaggatcgcttgagcccaagaagtcgaggctgcagtgagccga
gatcgcgccgctgcactccagcctgagcgacagggcgaggctctg
tctcaaacaaacaaacaaaaaaaaaaggaaaggaaatataaca
cagtgaaatgaaaggattgagagaaatgaaaaatatacacgccac
aaatgtgggagggcgataaccactcgtagaaagcgtgagaagtta
ctacaagcggtcctcccgggcaccgtactgttccgctcccagaag
ccccgggcgccggaagtcgtcactcttaagaagggacggggcccc
acgctgcgcacccgcgggtttgctATGGCCATGAGCAGCGGCGGC
AGTGGCGGCGGCGTGCCCGAGCAGGAGGATTCTGTGCTGTTCCGG
AGAGGAACAGGCCAGAGCGATGACTCCGATATCTGGGACGACACA
GCCCTTATCAAGGCCTACGACAAGGCCGTGGCCAGCTTTAAGCAC
GCCCTGAAGAATGGCGATATCTGCGAGACAAGCGGAAAGCCTAAG
ACCACCCCTAAAAGAAAGCCCGCCAAGAAAAACAAGTCCCAGAAA
AAAACACCGCCGCTAGCCTGCAGCAGTGGAAGGTGGGCGACAAA
TGCAGCGCCATCTGGTCCGAGGACGGCTGCATCTACCCTGCTACC
ATCGCCAGCATCGACTTCAAGCGGGAAACCTGCGTGGTGGTCTAC
ACAGGCTATGGCAATAGGGAGGAACAAAATCTCTCTGATCTGCTG
TCTCCTATTTGTGAAGTGGCTAACAACATCGAGCAGAACGCCCAG
GAAAATGAGAACGAAAGCCAAGTGTCCACCGACGAGAGCGAGAAC
AGCAGAAGCCCTGGAAACAAGTCTGACAACATCAAGCCCAAGTCT
GCCCCTTGGAACAGCTTCCTGCCCCCTCCTCCTCCAATGCCTGGC
CCCAGACTGGGCCCCGGCAAGCCTGGCCTGAAGTTCAACGGCCCT
CCTCCACCCCTCCTCCTCCACCTCCCCATCTGCTGAGCTGCTGG
CTGCCTCCTTTTCCCAGCGGCCCCCCTATCATCCCCCCACCACCT
CCTATCTGTCCCGACAGCCTGGACGACGCCGATGCTCTGGGATCC
ATGCTGATCAGCTGGTACATGTCTGGCTACCACACCGGCTACTAC
ATGGGCTTCCGGCAGAACCAGAAGGAAGGAAGATGCAGCCACAGC
CTGAACTGAgcGGCCacaaacaccattgtcacactccaacaaaca
ccattgtcacactccaacaaacaccattgtcacactccaAGCTTC
Ctgaggatccgatctttttccctctgccaaaaattatggggacat
catgaagcccttgagcatctgacttctggctaataaaggaaatt
tattttcattgcaatagtgtgttggaattttttgtgtctctcact
cggaagcaattcgttgatctgaatttcgaccacccataataccca
ttaccctggtagataagtagcatgggggttaatcattaactacaa
ggaaccccctagtgatggagttggccactccctctctgcgcgctcg
ctcgctcactgaggccgggcgaccaaaggtcgcccgacgcccggg
cttgcccgggcggcctcagtgagcgagcgagcgcgcagccttaa
```

-continued

```
ttaacctaattcactggccgtcgttttacaacgtcgtgactgggga
aaaccctggcgttacccaacttaatcgccttgcagcacatccccc
tttcgccagctggcgtaatagcgaagaggcccgcaccgatcgccc
ttcccaacagttgcgcagcctgaatggcgaatgggacgcgccctg
tagcggcgcattaagcgcggcgggtgtggtggttacgcgcagcgt
gaccgctacacttgccagcgccctagcgcccgctcctttcgcttt
cttccctttccttttctcgccacgttcgccggctttccccgtcaagc
tctaaatcggggggctcccttaggggttccgatttagtgcttttacg
gcacctcgaccccaaaaaacttgattagggtgatggttcacgtag
tgggccatcgccctgatagacggttttttcgccctttgacgttgga
gtccacgttctttaatagtggactcttgttccaaactggaacaac
actcaaccctatctcggtctattcttttgatttataagggatttt
gccgatttcggcctattggttaaaaaatgagctgatttaacaaaa
atttaacgcgaattttaacaaaatattaacgcttacaatttaggt
ggcacttttcggggaaatgtgcgcggaacccctatttgtttattt
ttctaaatacattcaaatatgtatccgctcatgagacaataaccc
tgataaatgcttcaataatattgaaaaaggaagagtatgattgaa
caagatggattgcacgcaggttctccggccgcttgggtggagagg
ctattcggctatgactgggcacaacagacaatcggctgctctgat
gccgccgtgttccggctgtcagcgcaggggcgcccggttcttttt
gtcaagaccgacctgtccggtgccctgaatgaactgcaagacgag
gcagcgcggctatcgtggctggccacgacgggcgttccttgcgca
gctgtgctcgacgttgtcactgaagcgggaagggactggctgcta
ttgggcgaagtgccggggcaggatctcctgtcatctcaccttgct
cctgccgagaaagtatccatcatggctgatgcaatgcggcggctg
catacgcttgatccggctacctgcccattcgaccaccaagcgaaa
catcgcatcgagcgagcacgtactcggatggaagccggtcttgtc
gatcaggatgatctggacgaagagcatcaggggctcgcgccagcc
gaactgttcgccaggctcaaggcgagcatgcccgacgcgaggat
ctcgtcgtgacccatggcgatgcctgcttgccgaatatcatggtg
gaaaatggccgcttttctggattcatcgactgtggccggctgggt
gtggcggaccgctatcaggacatagcgttggctacccgtgatatt
gctgaagagcttggcggcgaatgggctgaccgcttcctcgtgctt
tacggtatcgccgctcccgattcgcagcgcatcgccttctatcgc
cttcttgacgagttcttctgataactgtcagaccaagtttactca
tatatactttagattgatttaaaacttcattttttaatttaaaagg
atctaggtgaagatccttttttgataatctcatgaccaaaatccct
taacgtgagttttcgttccactgagcgtcagaccccgtagaaaag
atcaaaggatcttcttgagatccttttttttctgcgcgtaatctgc
tgcttgcaaacaaaaaaaccaccgctaccagcggtggtttgtttg
```

-continued ccggatcaagagctaccaactcttttccgaaggtaactggcttc agcagagcgcagataccaaatactgttcttctagtgtagccgtag ttaggccaccacttcaagaactctgtagcaccgcctacatacctc gctctgctaatcctgttaccagtggctgctgccagtggcgataag tcgtgtcttaccgggttggactcaagacgatagttaccggataag gcgcagcggtcgggctgaacgggggttcgtgcacacagcccagc ttggagcgaacgacctacaccgaactgagatacctacagcgtgag ctatgagaaagcgccacgcttcccgaagggagaaaggcggacagg tatccggtaagcggcagggtcggaacaggagagcgcacgagggag cttccaggggggaaacgcctggtatctttatagtcctgtcgggttt cgccacctctgacttgagcgtcgatttttgtgatgctcgtcaggg gggcggagcctatggaaaaacgccagcaacgcggccttttttacgg ttcctggccttttgctggccttttgctcacatgttcttcctgcg ttatcccctgattctgtggataaccgtattaccgccttgagtga gctgataccgctcgccgcagccgaacgaccgagcgcagcgagtca gtgagcgaggaagcggaagagcgcccaatacgcaaaccgcctctc cccgcgcgttggccgattcattaatgcagctggcacgacaggttt cccgactggaaagcgggcagtgagcgcaacgcaattaatgtgagt tagctcactcattaggcaccccaggctttacactttatgcttccg gctcgtatgttgtgtggaattgtgagcggataacaatttcacaca ggaaacagctatgaccatgattacgccagatttaattaaggcctt aattag > SMNsp-co-SMN1_miR122_BS rAAV vector
nucleic acid sequence (SEQ ID NO: 11)

ctgcgcgctcgctcgctcactgaggccgcccgggcaaagcccggg cgtcgggcgacctttggtcgcccggcctcagtgagcgagcgagcg cgcagagagggagtgtagccatgctctaggaagatcaattcggta caattcacgcgtggatgccagaggcgggcggaatAtcttgagctc aggagttcgagaccagcctacacaatatgctccaaacgccgcttC tacaaaacatacagaaactacccgggtgtggtggcgTGccctgt ggtcctagatacttgggaggttgaggcgggaggatcgcttgagct cgggaggtcgaggctgcaatgagccgagatggtgccactgcattc tgacgacagagcgagattccgtttcaaaacaaacaacaaataagg ttggggatcaaatatcttctagtgtttaaggatctgccttcctt cctgcccccatgtttgtctttccttgtttgtctttatatagatca agcaggttttaaattcctagtaggagcttacatttacttttccaa ggggagggggaataaatatctacacacacacacacacacacaca cacacacacacacacacacacacacacaccacactggagttcg agacgaggcctaagcaacatgccgaaacccgtctctactaaata caaaaaatagctgagcttggtggcgcacgcctatagtcctagcta ctggggaggctgaggtggaggatcgcttgagcccaagaagtcga ggctgcagtgagccgagatcgcgccgctgcactccagcctgagcg acagggcgaggctctgtctcaaaacaaacaaacaaaaaaaaaaag gaaaggaaatataacacagtgaaatgaaaggattgagagaaatga aaaatatacacgccacaaatgtgggagggcgataaccactcgtag aaagcgtgagaagttactacaagcggtcctcccgggcaccgtact gttccgctcccagaagccccgggcgccggaagtcgtcactcttaa gaagggacggggccccacgctgcgcacccgcgggtttgctATGGC

CATGAGCAGCGGCGGCAGTGGCGGCGGCGTGCCCGAGCAGGAGGA

TTCTGTGCTGTTCCGGAGAGGAACAGGCCAGAGCGATGACTCCGA

TATCTGGGACGACACAGCCCTTATCAAGGCCTACGACAAGGCCGT

GGCCAGCTTTAAGCACGCCCTGAAGAATGGCGATATCTGCGAGAC

AAGCGGAAAGCCTAAGACCACCCCTAAAAGAAAGCCCGCCAAGAA

AAACAAGTCCCAGAAAAAAAACACCGCCGCTAGCCTGCAGCAGTG

GAAGGTGGGCGACAAATGCAGCGCCATCTGGTCCGAGGACGGCTG

CATCTACCCTGCTACCATCGCCAGCATCGACTTCAAGCGGGAAAC

CTGCGTGGTGGTCTACACAGGCTATGGCAATAGGGAGGAACAAAA

TCTCTCTGATCTGCTGTCTCCTATTTGTGAAGTGGCTAACAACAT

CGAGCAGAACGCCCAGGAAAATGAGAACGAAAGCCAAGTGTCCAC

CGACGAGAGCGAGAACAGCAGAAGCCCTGGAAACAAGTCTGACAA

CATCAAGCCCAAGTCTGCCCCTTGGAACAGCTTCCTGCCCCCTCC

TCCTCCAATGCCTGGCCCCAGACTGGGCCCCGGCAAGCCTGGCCT

GAAGTTCAACGGCCCTCCTCCACCCCCTCCTCCTCCACCTCCCCA

TCTGCTGAGCTGCTGGCTGCCTCCTTTTCCCAGCGGCCCCCCTAT

CATCCCCCCACCACCTCCTATCTGTCCCGACAGCCTGGACGACGC

CGATGCTCTGGGATCCATGCTGATCAGCTGGTACATGTCTGGCTA

CCACACCGGCTACTACATGGGCTTCGGCAGAACCAGAAGGAAGG

AAGATGCAGCCACAGCCTGAACTGAGcGGCCacaaacaccattgt cacactccaacaaacaccattgtcacactccaacaaacaccattg tcacactccaagcttatcgataccgtcgactagagctcgctgatc agcctcgactgtgccttctagttgccagccatctgttgtttgccc ctcccccgtgccttccttgaccctggaaggtgccactcccactgt ccttttcctaataaaatgaggaaattgcatcgcattgtctgagtag gtgtcattctattctgggggtggggggggcaggacagcaagggg gaggattgggaagacaatAGCCtaggtagataagtagcatggggg ttaatcattaactacaaggaaccccctagtgatggagttggccact ccctctctgcgcgctcgctcgctcactgaggccgggcgaccaaag gtcgcccgacgcccgggctttgcccggcggcctcagtgagcgag cgagcgcgcagccttaattaacctaattcactggccgtcgttttta caacgtcgtgactgggaaaaccctggcgttacccaacttaatcgc cttgcagcacatcccctttcgccagctggcgtaatagcgaagag gcccgcaccgatcgcccttcccaacagttgcgcagcctgaatggc

```
gaatgggacgcgccctgtagcggcgcattaagcgcggcgggtgtg
gtggttacgcgcagcgtgaccgctacacttgccagcgccctagcg
cccgctcctttcgctttcttcccttcctttctcgccacgttcgcc
ggctttccccgtcaagctctaaatcgggggctcccttaggggttc
cgatttagtgctttacggcacctcgaccccaaaaaacttgattag
ggtgatggttcacgtagtgggccatcgccctgatagacggttttt
cgcccttgacgttggagtccacgttctttaatagtggactcttg
ttccaaactggaacaacactcaaccctatctcggtctattcttt
gatttataagggattttgccgatttcggcctattggttaaaaaat
gagctgatttaacaaaaatttaacgcgaattttaacaaaatatta
acgcttacaatttaggtggcacttttcggggaaatgtgcgcggaa
cccctatttgtttattttctaaatacattcaaatatgtatccgc
tcatgagacaataaccctgataaatgcttcaataatattgaaaaa
ggaagagtatgagtattcaacatttccgtgtcgcccttattccct
tttttgcggcattttgccttcctgtttttgctcacccagaaacgc
tggtgaaagtaaaagatgctgaagatcagttgggtgcacgagtgg
gttacatcgaactggatctcaacagcggtaagatccttgagagtt
ttcgccccgaagaacgttttccaatgatgagcacttttaaagttc
tgctatgtggcgcggtattatcccgtattgacgccgggcaagagc
aactcggtcgccgcatacactattctcagaatgacttggttgagt
actcaccagtcacagaaaagcatcttacggatggcatgacagtaa
gagaattatgcagtgctgccataaccatgagtgataacactgcgg
ccaacttacttctgacaacgatcggaggaccgaaggagctaaccg
cttttttgcacaacatgggggatcatgtaactcgccttgatcgtt
gggaaccggagctgaatgaagccataccaaacgacgagcgtgaca
ccacgatgcctgtagcaatggcaacaacgttgcgcaaactattaa
ctggcgaactacttactctagcttcccggcaacaattaatagact
ggatggaggcggataaagttgcaggaccacttctgcgctcggccc
ttccggctggctggtttattgctgataaatctggagccggtgagc gtgggtctcgcggtatcattgcagcactggggccagatggtaagc
cctcccgtatcgtagttatctacacgacggggagtcaggcaacta
tggatgaacgaaatagacagatcgctgagataggtgcctcactga
ttaagcattggtaactgtcagaccaagtttactcatatatacttt
agattgatttaaaacttcattttaatttaaaaggatctaggtga
agatcctttttgataatctcatgaccaaaatcccttaacgtgagt
tttcgttccactgagcgtcagaccccgtagaaaagatcaaaggat
cttcttgagatcctttttttctgcgcgtaatctgctgcttgcaaa
caaaaaaaccaccgctaccagcggtggtttgtttgccggatcaag
agctaccaactctttttccgaaggtaactggcttcagcagagcgc
agataccaaatactgttcttctagtgtagccgtagttaggccacc
acttcaagaactctgtagcaccgcctacatacctcgctctgctaa
tcctgttaccagtggctgctgccagtggcgataagtcgtgtctta
ccgggttggactcaagacgatagttaccggataaggcgcagcggt
cgggctgaacggggggttcgtgcacacagcccagcttggagcgaa
cgacctacaccgaactgagataccacagcgtgagctatgagaaa
gcgccacgcttcccgaagggagaaaggcggacaggtatccggtaa
gcggcagggtcggaacaggagagcgcacgagggagcttccagggg
gaaacgcctggtatctttatagtcctgtcgggtttcgccacctct
gacttgagcgtcgatttttgtgatgctcgtcaggggggcggagcc
tatggaaaaacgccagcaacgcggcctttttacggttcctggcct
tttgctggccttttgctcacatgttctttcctgcgttatcccctg
attctgtggataaccgtattaccgcctttgagtgagctgataccg
ctcgccgcagccgaacgaccgagcgcagcgagtcagtgagcgagg
aagcggaagagcgcccaatacgcaaaccgcctctccccgcgcgtt
ggccgattcattaatgcagctggcacgacaggtttcccgactgga
aagcgggcagtgagcgcaacgcaattaatgtgagttagctcactc
attaggcaccccaggctttacactttatgcttccggctcgtatgt
tgtgtggaattgtgagcggataacaatttcacacaggaaacagct
atgaccatgattacgccagatttaattaaggccttaattagg
```

What is claimed is:

1. A recombinant adeno-associated virus (rAAV) vector comprising a transgene flanked by AAV inverted terminal repeats (ITRs), the transgene comprising:
a promoter comprising the nucleotide sequence set forth in SEQ ID NO: 5 operably linked to a nucleotide sequence encoding a human SMN1 protein having the nucleotide sequence set forth in SEQ ID NO: 1.

2. The rAAV vector of claim 1, wherein the transgene further comprises a poly A tail.

3. The rAAV vector of claim 2, wherein the poly A tail is a rabbit globin poly A or a BGH poly A tail.

4. The rAAV vector of claim 1, wherein the transgene further comprises one or more miR-122 binding sites.

5. The rAAV vector of claim 4, wherein the one or more miR-122 binding sites are placed between the nucleic acid sequence encoding the human SMN1 and one of the AAV ITRs.

6. The rAAV vector of claim 1, wherein the AAV ITRs are AAV2 ITRs.

7. The rAAV vector of claim 1, wherein the rAAV vector comprises a nucleic acid sequence of SEQ ID NO: 7.

8. A recombinant adeno-associated virus (rAAV) comprising:
   (i) the rAAV vector of claim 1; and
   (ii) an AAV capsid protein.

9. The rAAV of claim 8, wherein the AAV capsid protein is an AAV9 capsid protein.

10. The rAAV of claim 8, wherein the rAAV is a self-complementary rAAV.

11. A pharmaceutical composition comprising the rAAV of claim 8, and a pharmaceutically acceptable excipient.

12. A pharmaceutical composition comprising the rAAV vector of claim 1, and a pharmaceutically acceptable excipient.

13. An isolated host cell comprising the rAAV vector of claim 1.

* * * * *